(12) United States Patent
Ranca et al.

(10) Patent No.: US 12,136,068 B2
(45) Date of Patent: Nov. 5, 2024

(54) PAINT REFINISH DETERMINATION

(71) Applicant: Tractable Ltd, London (GB)

(72) Inventors: Razvan Ranca, London (GB); Marcel Horstmann, London (GB); Bjorn Mattsson, London (GB); Janto Oellrich, London (GB); Yih Kai Teh, London (GB); Ken Chatfield, London (GB); Franziska Kirschner, London (GB); Rusen Aktas, London (GB); Laurent Decamp, London (GB); Mathieu Ayel, London (GB); Julia Peyre, London (GB); Shaun Trill, London (GB); Crystal Van Oosterom, London (GB)

(73) Assignee: Tractable Ltd, London (GB)

( * ) Notice: Subject to any disclaimer, the term of this patent is extended or adjusted under 35 U.S.C. 154(b) by 0 days.

(21) Appl. No.: 17/303,064

(22) Filed: May 19, 2021

(65) Prior Publication Data
US 2021/0272168 A1 Sep. 2, 2021

Related U.S. Application Data

(63) Continuation of application No. PCT/GB2021/050012, filed on Jan. 4, 2021.
(Continued)

(30) Foreign Application Priority Data

Jan. 3, 2020 (GB) ...................................... 2000076
Jan. 3, 2020 (GB) ...................................... 2000077
(Continued)

(51) Int. Cl.
G06Q 10/20 (2023.01)
G06F 16/2457 (2019.01)
(Continued)

(52) U.S. Cl.
CPC ....... *G06Q 10/20* (2013.01); *G06F 16/24578* (2019.01); *G06F 18/214* (2023.01);
(Continued)

(58) Field of Classification Search
None
See application file for complete search history.

(56) References Cited

U.S. PATENT DOCUMENTS 6,650,889 B1 * 11/2003 Evans .................. G06F 16/986
455/418
8,972,100 B2 * 3/2015 Mullen ................ G07C 5/0808
701/31.4
(Continued)

FOREIGN PATENT DOCUMENTS

CN 106022929 10/2016
CN 109410218 3/2019
(Continued)

OTHER PUBLICATIONS

Nguyen et al., "Active Learning Using Pre-clustering", Proceedings of the 21st International Conference on Machine Learning, Banff, Canada, 2004, 8 sheets.
(Continued)

*Primary Examiner* — Fateh M Obaid
(74) *Attorney, Agent, or Firm* — Fay Kaplun & Marcin, LLP

(57) ABSTRACT

A method, system and apparatus for determining requirements for painting a vehicle, including receiving images of the vehicle, determining, using classifiers, one or more classifications for parts of the vehicle based on the images, wherein each classifier processes the same images and is trained to identify damage to only one part of the parts of the vehicle, wherein each classifier is trained to identify a different part of the vehicle and be generic with respect to a
(Continued)

make and model and year of the vehicle, determining, for at least one of the parts of the vehicle, one or more paint areas, wherein each paint area is an area of damage to the vehicle requiring painting, determining one or more operations and materials required to paint at least one of the one or more paint areas and outputting the determined one or more operations and materials required.

14 Claims, 37 Drawing Sheets

Related U.S. Application Data

(60) Provisional application No. 63/198,628, filed on Oct. 30, 2020.

(30) Foreign Application Priority Data

| May 19, 2020 | (GB) | 2007465 |
|---|---|---|
| Oct. 21, 2020 | (GB) | 2016723 |
| Nov. 4, 2020 | (GB) | 2017464 |

(51) Int. Cl.

| G06F 18/20 | (2023.01) |
|---|---|
| G06F 18/214 | (2023.01) |
| G06F 18/231 | (2023.01) |
| G06F 18/24 | (2023.01) |
| G06F 18/2415 | (2023.01) |
| G06F 18/243 | (2023.01) |
| G06F 18/2431 | (2023.01) |
| G06F 40/20 | (2020.01) |
| G06N 3/04 | (2023.01) |
| G06N 3/045 | (2023.01) |
| G06N 3/049 | (2023.01) |
| G06N 3/08 | (2023.01) |
| G06N 20/00 | (2019.01) |
| G06N 20/20 | (2019.01) |
| G06Q 10/0631 | (2023.01) |
| G06Q 10/0875 | (2023.01) |
| G06Q 30/0283 | (2023.01) |
| G06T 7/00 | (2017.01) |
| G06T 7/11 | (2017.01) |
| G06V 10/20 | (2022.01) |
| G06V 10/22 | (2022.01) |
| G06V 10/25 | (2022.01) |
| G06V 10/44 | (2022.01) |
| G06V 10/764 | (2022.01) |
| G06V 10/82 | (2022.01) |
| G06V 20/10 | (2022.01) |
| G06Q 30/016 | (2023.01) |
| G06Q 40/08 | (2012.01) |

(52) U.S. Cl.
CPC ........ *G06F 18/2148* (2023.01); *G06F 18/231* (2023.01); *G06F 18/24* (2023.01); *G06F 18/2415* (2023.01); *G06F 18/2431* (2023.01); *G06F 18/24317* (2023.01); *G06F 18/285* (2023.01); *G06F 40/20* (2020.01); *G06N 3/04* (2013.01); *G06N 3/045* (2023.01); *G06N 3/049* (2013.01); *G06N 3/08* (2013.01); *G06N 20/00* (2019.01); *G06N 20/20* (2019.01); *G06Q 10/06313* (2013.01); *G06Q 10/0875* (2013.01); *G06Q 30/0283* (2013.01); *G06T 7/0002* (2013.01); *G06T 7/0004* (2013.01); *G06T 7/11* (2017.01); *G06V 10/22* (2022.01); *G06V 10/225* (2022.01); *G06V 10/25* (2022.01); *G06V 10/255* (2022.01); *G06V 10/454* (2022.01); *G06V 10/764* (2022.01); *G06V 10/82* (2022.01); *G06V 20/10* (2022.01); *G06Q 30/016* (2013.01); *G06Q 40/08* (2013.01); *G06T 2207/20081* (2013.01); *G06T 2207/20084* (2013.01); *G06T 2207/20132* (2013.01); *G06T 2207/30156* (2013.01); *G06T 2207/30164* (2013.01); *G06T 2207/30248* (2013.01); *G06T 2207/30252* (2013.01); *G06V 2201/08* (2022.01); *G06V 2201/10* (2022.01)

(56) References Cited

U.S. PATENT DOCUMENTS

| 9,208,526 | B1* | 12/2015 | Leise | G06Q 30/0185 |
|---|---|---|---|---|
| 9,799,010 | B1* | 10/2017 | Leise | G07C 5/0825 |
| 10,319,094 | B1 | 6/2019 | Chen et al. | |
| 10,360,601 | B1* | 7/2019 | Adegan | G06Q 30/0611 |
| 10,373,260 | B1* | 8/2019 | Haller, Jr. | G06T 15/205 |
| 10,692,050 | B2 | 6/2020 | Taliwal et al. | |
| 10,740,891 | B1 | 8/2020 | Chen et al. | |
| 10,783,796 | B2* | 9/2020 | Mellinger, III | G08G 5/04 |
| 10,789,786 | B2 | 9/2020 | Zhang et al. | |
| 10,791,265 | B1* | 9/2020 | Lambert | G06N 3/0454 |
| 10,853,882 | B1* | 12/2020 | Leise | G06T 5/50 |
| 10,949,814 | B1* | 3/2021 | Nelson | G06N 5/048 |
| 11,017,479 | B2* | 5/2021 | Thompson | G06N 7/005 |
| 11,049,334 | B2 | 6/2021 | Zhang et al. | |
| 2004/0243423 | A1 | 12/2004 | Rix et al. | |
| 2005/0251427 | A1 | 11/2005 | Dorai et al. | |
| 2007/0012304 | A1* | 1/2007 | van Dorsser | F41B 11/53 124/51.1 |
| 2009/0290813 | A1 | 11/2009 | He | |
| 2012/0020526 | A1 | 1/2012 | Teti et al. | |
| 2014/0081675 | A1 | 3/2014 | Ives et al. | |
| 2014/0247978 | A1 | 9/2014 | Devin et al. | |
| 2014/0277916 | A1* | 9/2014 | Mullen | G07C 5/008 701/31.4 |
| 2014/0316825 | A1* | 10/2014 | van Dijk | G06Q 40/08 705/4 |
| 2016/0171622 | A1 | 6/2016 | Perkins et al. | |
| 2017/0089710 | A1 | 3/2017 | Slusar | |
| 2017/0293894 | A1* | 10/2017 | Taliwal | G06K 9/00671 |
| 2018/0240194 | A1* | 8/2018 | Dong | G06Q 30/0185 |
| 2018/0240243 | A1 | 8/2018 | Kim et al. | |
| 2018/0260793 | A1* | 9/2018 | Li | G06N 3/08 |
| 2018/0293552 | A1* | 10/2018 | Zhang | G06K 9/3233 |
| 2018/0293806 | A1* | 10/2018 | Zhang | G06T 7/0008 |
| 2019/0051046 | A1* | 2/2019 | Jin | G08G 5/0034 |
| 2019/0066225 | A1* | 2/2019 | Thompson | G06N 7/005 |
| 2019/0073641 | A1* | 3/2019 | Utke | G06T 7/0004 |
| 2019/0073912 | A1* | 3/2019 | Mellinger, III | G08G 5/0069 |
| 2019/0084151 | A1 | 3/2019 | Bai et al. | |
| 2019/0089710 | A1* | 3/2019 | Weinert | G06F 21/31 |
| 2019/0095877 | A1* | 3/2019 | Li | G06Q 10/20 |
| 2019/0213563 | A1 | 7/2019 | Zhang et al. | |
| 2019/0213804 | A1 | 7/2019 | Zhang et al. | |
| 2019/0293894 | A1* | 9/2019 | Benjamin | G02B 6/4488 |
| 2019/0294878 | A1* | 9/2019 | Endras | G06T 7/0004 |
| 2019/0304065 | A1 | 10/2019 | Bousmalis et al. | |
| 2020/0034958 | A1* | 1/2020 | Campbell | G06Q 10/10 |
| 2020/0050867 | A1* | 2/2020 | Zhang | G06Q 40/08 |
| 2020/0065632 | A1* | 2/2020 | Guo | G06N 3/0454 |
| 2020/0074560 | A1 | 3/2020 | Xu | |
| 2020/0075148 | A1 | 3/2020 | Nguyen et al. | |
| 2020/0090321 | A1 | 3/2020 | Xu | |
| 2020/0111061 | A1* | 4/2020 | Stucki | G06Q 10/20 |
| 2020/0111201 | A1* | 4/2020 | Kuruvilla | G06T 7/001 |
| 2020/0111203 | A1* | 4/2020 | Tan | G06V 20/20 |
| 2020/0151509 | A1 | 5/2020 | Sunkavalli et al. | |
| 2020/0210786 | A1* | 7/2020 | Xu | G06K 9/6292 |
| 2020/0327743 | A1* | 10/2020 | Cannarsa | H04M 1/6041 |
| 2020/0334928 | A1* | 10/2020 | Bourke | G06Q 30/0283 |
| 2021/0012198 | A1 | 1/2021 | Zhang et al. | |

(56) References Cited

U.S. PATENT DOCUMENTS

| | | | |
|---|---|---|---|
| 2021/0073955 A1 | | 3/2021 | Zhang et al. |
| 2021/0150691 A1* | | 5/2021 | Xu .................... G06T 7/194 |
| 2021/0192343 A1 | | 6/2021 | Hwang et al. |
| 2021/0201159 A1 | | 7/2021 | Song et al. |
| 2021/0272213 A1* | | 9/2021 | Ranca ............... G06K 9/00664 |
| 2021/0287080 A1 | | 9/2021 | Moloney |
| 2021/0327042 A1* | | 10/2021 | Kim .................... G06V 10/454 |
| 2021/0342997 A1* | | 11/2021 | Malreddy ............ G06T 7/0004 |
| 2022/0129860 A1* | | 4/2022 | Nvs ..................... G06T 7/0002 |
| 2022/0164942 A1* | | 5/2022 | Dev ..................... G06T 5/002 |

FOREIGN PATENT DOCUMENTS

| | | |
|---|---|---|
| CN | 109684956 | 4/2019 |
| CN | 110136009 | 8/2019 |
| CN | 110287768 | 9/2019 |
| EP | 3605386 | 2/2020 |
| JP | 2007-108927 | 4/2007 |
| JP | 2013/161295 | 8/2013 |
| JP | 2016-033806 | 3/2016 |
| JP | 2018-045492 | 3/2018 |
| JP | 2019114059 | 7/2019 |
| KR | 102109882 | 5/2020 |
| WO | 2008/156473 | 12/2008 |
| WO | 2014/103061 | 7/2014 |
| WO | 2014/124407 | 8/2014 |
| WO | 2017/055878 | 4/2017 |
| WO | 2018/055340 | 3/2018 |
| WO | 2020/071559 | 4/2020 |

OTHER PUBLICATIONS

Thonglek Kundjanasith et al, "IVAA; Intelligent Vehicle Accident Analysis System", pp. 85-90, Jul. 10, 2019.

Unel F. Ozge et al., "The Power of Tiling for Small Object Detection", pp. 582-590, Jun. 16, 2019.

Singh Ranjodh et al., "Automating Car Insurance Claims Using Deep Learning Techniques", pp. 199-207, Sep. 11, 2019.

Aggarwal, "Semi-Supervised Learning, Data Classification: Algorithms and Applications", XP055337650, Jan. 2015, 25 sheets.

Aggarwal, "Semisupervised Clustering, Data Clustering: Algorithms and Applications", XP055337399, Jan. 2014, 29 sheets.

Cohn, "Active Learning", In: Encyclopedia of Machine Learning, Eds, Sammut et al., XP055337704, p. 10, Para 'Definition', 1-h col. Jan. 2011, 1 sheet.

Liu et al., "Feature Subset Selection Problem in Statistical Pattern Recognition", Feature Extraction Construction and Selection A Data Mining Perspective, XP055337763, Chap. 7.2: 103, Jan. 1998, 1 sheet.

Meng et al., "A Damage Assessment System for Aero-engine Borscopic Inspection Based on Support Vector Machines", 2009 Ninth International Conference on Hybrid Intelligent Systems, IEEE Computer Society, 2009, 6 sheets.

Jayawardena, "Image based automatic vehicle detection", A thesis submitted for the degree of Doctor of Philosophy at The Australian National University, Nov. 18, 2013, 199 sheets.

\* cited by examiner

Jurisdiction Specific Rules 2300

| AI Decision | A | B | C | D | E |
|---|---|---|---|---|---|
| Spot | 1/5 | Spot | Spot | Spot | 30% Damaged |
| Minor | 1/2 | Less than 50% | 20% or less | 50% reduction in cost | 60% Damaged |
| Major | 1 | More than 50% | More than 20% | 20% reduction in cost | 90% Damaged |

- Decision on Paint Coverage Required 2310
- Rules Specific to Country A 2322
- Rules Specific to Country B 2324
- Rules Specific to Country C 2326
- Rules Specific to Country D 2328
- Rules Specific to Country E 2330
- Jurisdiction Specific Rules 2320
- Permitted Paint Coverage Amounts 2330

Figure 23

PAINT REFINISH DETERMINATION

FIELD

The present invention relates to the determination of painting requirements for damaged vehicles. More particularly, the present invention relates to determining paint materials and/or operations required to repair a damaged vehicle using images of the damaged vehicle.

BACKGROUND

Typically, and as shown in FIG. 1, when a vehicle is involved in an accident (or is damaged) 105, the vehicle or its driver will be insured, and the driver will contact the relevant insurance company 110 to make a claim following a typical claim procedure 100.

The insurance company's estimation team 135 will then need to assess the damage to the vehicle and approve any claim, and the driver or insurer will then arrange for the vehicle to be repaired 145. Alternatively, the insurance company may make a cash settlement 150 in place of arranging or paying for repairs or may make a decision that the vehicle is a total loss 140 and compensate the insured party accordingly or arrange for a replacement vehicle to be procured.

As shown in FIG. 1, the claim procedure 100 following an accident 105 requires the driver or insured party to call their insurer 110, and personnel at the insurer will follow a script 115 to receive and process the claim.

As part of the script 115, the insurer will obtain from the driver or insured party some information about the accident 105. Typically, the insurer will be provided with information about the insured person 120 (which may also include details of the vehicle and its condition etc that are provided during the call, or which are stored in the insurer's database and retrieved following receipt of the details of the insured person); details of the crash or accident 125, for example the circumstances and extent of the damage; and photos of the damage 130.

The photos of the damage 130 are typically taken by the driver or the insured party and can be of varying quality and comprehensiveness. Typically, photos are taken using phones equipped with cameras. Various problems can arise from this approach, including that too few photos are taken and provided to the insurer. Also, the photos taken may not be sufficiently well composed or may be of low quality due to the quality of the camera used to take the photos or the skill of the user.

The photos of the damage 130 can be provided to the insurer either via e-mail, facsimile or post, for example. This means there is typically a delay in the receipt of the photos 130 by the insurer, thus delaying the processing of the claim by the insurer and slowing down the decision-making process as to whether the damage is a total loss 140, or whether a cash settlement 150 can be offered, or whether to arrange or allow the driver or insured part to arrange for repairs to the vehicle 145.

As part of the claim procedure, and more specifically the claim review procedure which is carried out by the insurer to verify the costs of the proposed repair work by manually assessing data provided by the client and any proposed repairer, the insurer may request further information or claim data to be provided from the driver or insured party regarding the accident. This may include details of the vehicle and its condition prior to any damage etc. These are typically provided during a telephone call or are obtained having been stored in the insurer's database, but sometimes requires the insurer to contact the insured party in a follow up telephone call, letter or e-mail requesting the further details. Further, the insurer will require sufficient details of the accident to be provided, along with sufficient photographs of the damage for example, so this must be obtained during the first and any subsequent contact with the insured party. The process of obtaining sufficient information can be slow, especially if further requests for information are made in separate subsequent contacts with the insured party, and thus can significantly delay the processing of an insurance claim. Further, the proposed repairer may be required to send details of the proposed repairs, including for example the labour tasks as well as any parts or materials costs, to the insurer for approval prior to commencing work. The insurer can then assess whether the claim is covered by the relevant policy under which the claim is made and determine whether the estimated costs of repair can be verified and/or approved as may be appropriate.

Various tools and processes have been developed to assist vehicle repair businesses and vehicle insurers respectively to prepare and approve repair proposals for damaged vehicles, for example as a result of the vehicle being involved in an accident.

Vehicle repair businesses need to be able to itemise both the labour required and the specific parts required in order to repair the vehicle, and then submit this for approval to an insurer where the repair is covered by an insurance policy. Due to the large number of different possible makes and models that might require repair, and the optional extras that might have been fitted to the vehicle to be repaired, vehicle repair businesses typically have to use a commercial database to identify the correct make, model, year of manufacture and options fitted in order to correctly identify the parts that would need to be ordered if any need replacement.

Insurers typically require vehicle repair businesses to submit evidence of the damage to each vehicle and a detailed repair proposal that itemises the parts to be ordered and the respective costs of each part along with detailed itemisation of the labour tasks and time that will be required to carry out any repairs or replacement of parts. Preparing such detailed repair proposals manually typically takes vehicle repair businesses a significant amount of time.

In different jurisdictions, different approaches are taken by both vehicle repair businesses (in respect of how repairs are carried out, what labour is deemed to be required, and preferences as to whether to repair or replace parts, for example) and insurers (in respect of what policies are applied when approving or rejecting proposed repairs, for example), depending on a variety of factors such as commercial pressures, regulation, consumer preference and typical insurance coverage. Thus, detailed repair proposals will differ between jurisdictions and what insurers are prepared to approve in a detailed repair proposal will also differ between jurisdictions.

Insurers, however, typically perform manual reviews on proposed repairs that are submitted for approval by vehicle repair businesses. As a result, the manual review process either requires a large workforce to perform the task of reviewing each submitted repair proposal or becomes a bottleneck in the repair approval process. For vehicle repair businesses, manual review can result in several disadvantages including delay in being able to begin repair work; further delays if the repair proposal is rejected by the insurer; and having to store customer vehicles for longer periods than necessary resulting in both higher storage space requirements and a higher probability of dissatisfied customers.

Across all jurisdictions, a variety of the above-described problems can result from manual preparation of proposed vehicle repairs and manual review of the proposed vehicle repairs by insurers.

Improvements to the claim procedure would enable repairs to be completed sooner and for insurers to reach decisions faster and more efficiently.

SUMMARY OF INVENTION

Aspects and/or embodiments seek to provide a computer-implemented method of generating one or more estimates for painting required to a damaged vehicle from one or more photos of a damaged vehicle, including paint operations and/or materials required.

According to a first aspect, there is provided a method for determining requirements for painting a damaged vehicle, comprising the steps of: receiving a plurality of images of the damaged vehicle; determining one or more paint areas of the vehicle from each of the images of the damaged vehicle, wherein each paint area is an area of the damaged vehicle requiring painting; determining one or more operations and/or materials required to paint at least one of the one or more paint areas; and outputting the determined one or more operations and/or materials required.

Determining the painting requirements of a damaged vehicle by determining the operations and/or materials required to paint the damaged portions from images of the damaged vehicle can allow for a more accurate assessment of the materials and/or operations required in an objective and substantially accurate and repeatable way.

Optionally, there is performed the further step of receiving proposed vehicle repair estimate data, wherein the vehicle repair estimate data comprises one or more proposed vehicle repairs operations and/or materials.

By providing additional data pertaining to the vehicle repairs, determining the paint materials and/or operations required to paint the damaged portions of a vehicle can be improved.

Optionally, the proposed vehicle repair estimate data comprises data in relation to a vehicle. Optionally, the data in relation to a vehicle comprises cost data in relation to one or more vehicle parts and/or vehicle materials and/or labour operations.

The proposed vehicle estimate data can comprise data prepared by a repair shop (or similar) proposing repairs to a damaged vehicle, for example a list of parts required to be replaced, a list of materials required such as paint, and a list of labour operations required to repair parts, replace parts and/or paint parts of the damaged vehicle.

Optionally, the step of determining one or more paint areas from each of the images of the damaged vehicle comprises analysing the plurality of images of the damaged vehicle with one or more machine learning algorithms, wherein the one or more machine learning algorithms comprise one or more of: a neural network; a convolutional neural network; and/or a recurrent neural network.

Using machine learning algorithms to determine paint requirements and/or paint areas of a damaged vehicle that requires repairs/repainting/painting can allow for a method of making this determination using image data provided of the damaged vehicle, and can also allow for a more accurate assessment of the materials and/or operations required in an objective and substantially accurate and repeatable way.

Optionally, determining one or more operations and/or materials required to paint at least one of the one or more paint areas comprises determining whether one or more pre-painted vehicle parts should be used. Optionally, determining whether one or more pre-painted vehicle parts should be used comprises determining any of: replace paint time for a pre-painted part; additional cost for a pre-painted part; and/or total paint time for a pre-painted part.

Determining if a pre-painted part should be used can allow for a more accurate assessment of the materials and/or operations required to re-paint/paint a damaged vehicle when performing repairs to that vehicle, as pre-painted parts do not require any paint to re-paint nor any labour operations to perform painting, but instead require labour operations to replace the damaged part(s) with the pre-painted part(s).

Optionally, determining one or more operations and/or materials required to paint at least one of the one or more paint areas comprises determining any of: paint labour cost; material cost; and/or total paint cost. Optionally, determining one or more operations and/or materials required to paint at least one of the one or more paint areas comprises any of: a replacement of the one or more paint areas using one or more pre-painted vehicle parts; a replacement of the one or more paint areas using one or more vehicle parts which require painting and/or repainting the one or more paint areas.

Determining the operations and/or materials required to paint a damaged vehicle when performing repairs can include determining the labour cost of performing the painting and/or the material costs of any paint required and any ancillary materials required and/or a total itemisations and/or cost of all labour, materials and parts required for painting a damaged vehicle that is being repaired or to be repaired.

Optionally, there is performed a further step of querying one or more databases to determine any of: pre-painted vehicle part costs; additional cost for a pre-painted part; total paint time for a pre-painted part; paint labour cost; material cost; and/or total paint cost.

As there are multiple third party databased that can generated accurate data per make, model and year of many types of vehicle, it can be more efficient and/or accurate to use established databases in order to quickly receive accurate data for labour, materials and/or parts of specific vehicles in order to substantially accurately determine the labour hours, materials, parts and resulting financial costs of any repairs required to a damaged vehicle.

Optionally, there is performed a further step of determining a plurality of parts of the damaged vehicle that are represented in the plurality of images of the damaged vehicle comprising the use of a plurality of classifiers. Optionally, each one of the plurality of classifiers is operable to detect each of the parts of the damaged vehicle, optionally wherein each one of the plurality of classifiers is further operable to determine a damage classification. Optionally, there is performed a further step of determining the relevant images showing the paint areas.

Determining which parts are shown in each image of the damaged vehicle can allow each image to be used to contribute to a determination of what damage is present for each part of the damaged vehicle, which in turn can allow for an assessment and/or classification and/or determination of the damage to each part of the vehicle and the resulting painting requirements of each part of the vehicle. Determining for each part which images are relevant can allow for more efficient and/or comprehensive and/or combined processing of each collection of relevant images per part, which in turn can result in a substantially optimal determination being made per part as to the damage and/or painting requirements per part of the damaged vehicle.

Optionally, the step of outputting the determined one or more operations and/or materials required comprises one or more jurisdictional constraints.

As different jurisdictions can have different customs, expectations, requirements, laws, allowances, rules, etc in relation to what should be fixed when repairing a damaged vehicle, including in line with normal practice in relation to where repairs are paid for under insurance policies, the method can take these differences between jurisdictions into account using different rules and/or training data and/or model architecture and/or weights.

Optionally, the paint area comprises any or any combination of: normalised parts of the vehicle; normalised regions of the vehicle; normalised zones of the vehicle; standardised parts of the vehicle; standardised regions of the vehicle; standardised zones of the vehicle. Using normalised and/or standardised parts of a vehicle can allow for a generic assessment of most it not all vehicles that are damaged, rather than providing an approach that is limited to only the vehicles for which training data and/or trained models are available.

Optionally, there is performed the further step of determining whether any of the proposed vehicle repairs in the proposed vehicle repairs operations and/or materials are unnecessary based on the determined one or more operations and/or materials required.

By assessing the proposed repairs and the paint requirements/repairs generated from an assessment of the images of the damaged vehicle, it is possible to correlate the repairs such that any proposed repairs for which no correlating generated repairs/paint requirements have been generated could indicate that some of the proposed repairs may be superfluous to those required to perform a repair to the damaged vehicle.

According to another aspect, there is provided a computer-implemented method of training a neural network for classifying paint requirements for repairing damaged vehicles, including neurons, each neuron being associated with weights, wherein the method comprises: obtaining training inputs, the training inputs comprising images of vehicles, images of damage to vehicles and classifications of damage to vehicles; for each training input, selecting one or more neurons based on their respective probability; adjusting the weights of the selected neurons such that the selected neurons are substantially operable to classify, per normalised part of the vehicles, whether one or more normalised parts of the vehicles requires one or more painting operations and/or materials; processing the training input with the neural network to generate a predicted output; adjusting the weights based on the predicted output.

By training a model to determine and/or classify any paint requirements for repairing damaged vehicles, optionally on a per-normalised-part basis, a more accurate assessment of the materials and/or operations required in an objective and substantially accurate and repeatable way can be provided.

BRIEF DESCRIPTION OF DRAWINGS

Embodiments will now be described, by way of example only and with reference to the accompanying drawings having like-reference numerals, in which:

FIG. 23 shows different example rules for a variety of jurisdictions as to what repairs would be permitted and categorise these alongside the respective decision made by the automated system;

SPECIFIC DESCRIPTION

Figure 1:
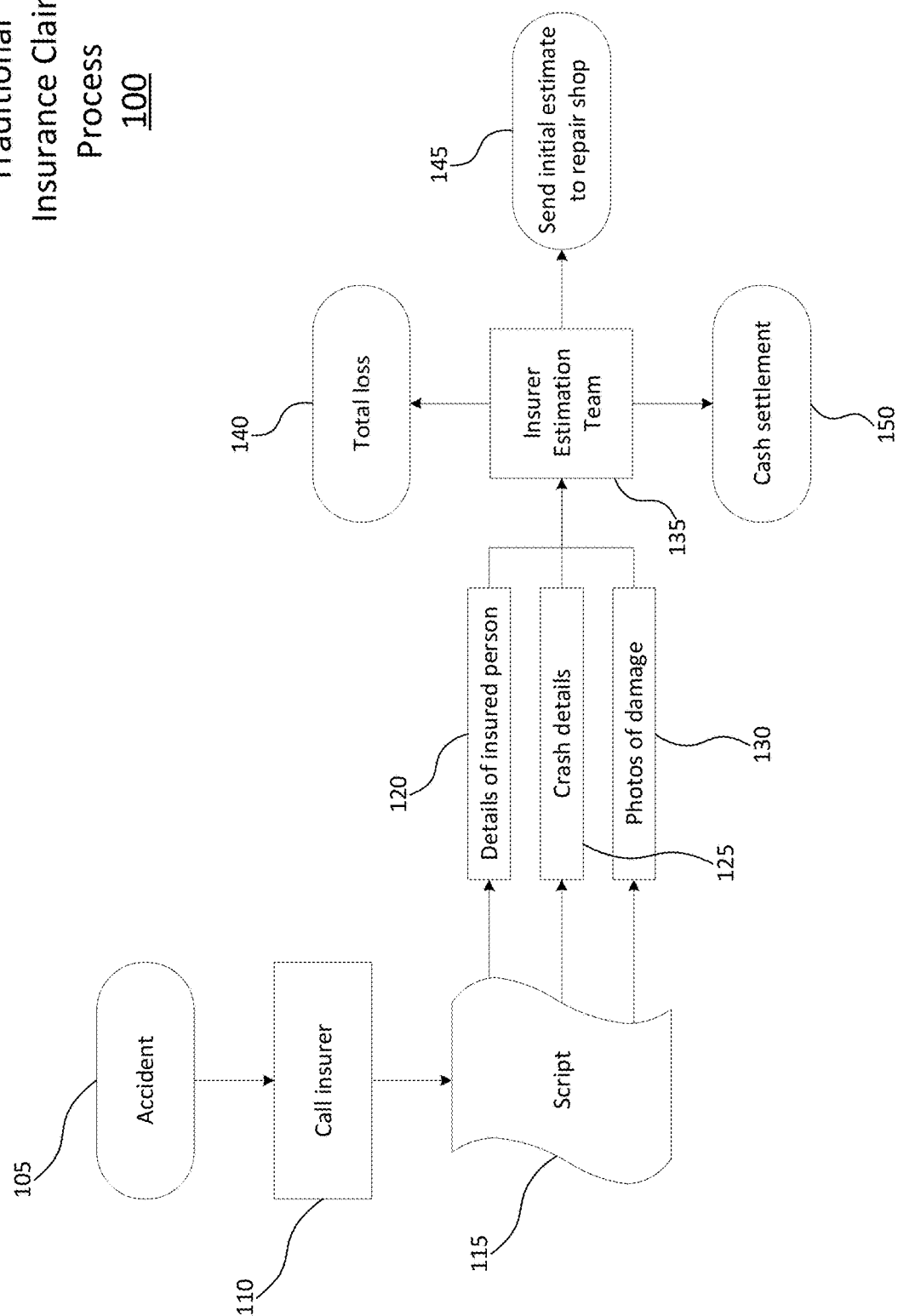
FIG. 1 shows a traditional insurance claim process according to the prior art.
Figure 2:
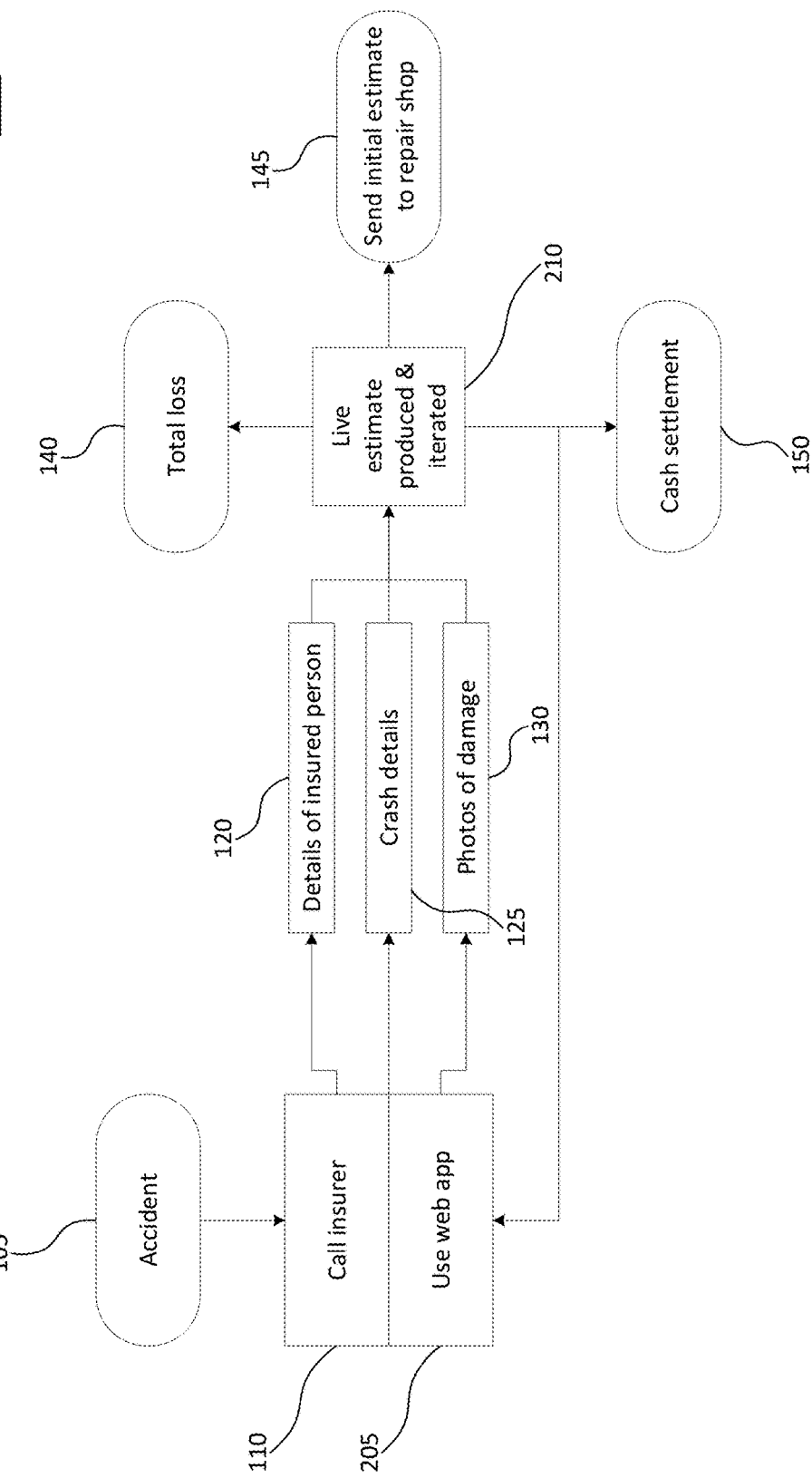
FIG. 2 shows a near real-time insurance estimation process according to an embodiment.

Referring to FIG. 2, an example embodiment within a process for an insurer to handle an insurance claim for an accident will now be described.

In the following embodiments, and in the aspects and/or embodiments described above, the term "part" can be used interchangeably to refer to a specific part of a vehicle (i.e. a specific part of a specific make, model and year of vehicle) or a generic part of a vehicle as well as to a "normalised" or "standardised" part generic to most and/or all vehicles or to a region or zone of a generic vehicle or class of vehicle. Further details are provided in relation to embodiments of this concept in FIGS. 19 and 21 and in the associated description for these figures set out below.

The insurance claim process is outlined in a flowchart 200 and begins with an accident 105 (or damage being discovered) involving a vehicle that is insured.

The party that is insured, or a party contacting an insurer on behalf of an insured entity or in respect of an insured vehicle, will then contact the insurer 110. The representative taking the telephone call on behalf of the insurer will run through a standard set of questions, or a decision tree of questions, to obtain a standard required set of information about the accident 120, 125, 130 (e.g. the name of the insured person/vehicle; details of the vehicle including make, model and condition; details of any insurance policy; standard security questions; details of what happened to cause the accident; etc).

The phone call 110 and the party phoning the insurer providing the information requested by the insurer representative following the script 115 will mean that details of the insured person 120 (or insured party/vehicle) will be provided to the insurer as well as crash details 125 providing information about the damage/accident.

During the call, the representative will ask the person phoning the insurer to provide photographs of the accident (and specifically photos of the damaged vehicle) 130 using the web app 205. If the person does not already have access to the web app 205, this can be provided by the representative by reading out a shortened URL or by sending a text message or email or other notification to a device of the person phoning the insurer. Once the web app 205 has been loaded on the person's device, it can be used to take photographs using the device imaging function (e.g. a camera in a smart phone) to provide photos 130 to the insurer. The photos 130 will appear to the representative on their computer display shortly after these arrive at the insurer computer systems, and the representative can then guide the person on the 'phone to take further photos.

In alternative embodiments, other means of providing photos to the insurer in parallel to the communication with the insurer can be used, so for example a chat interface can be used to communicate between the insured party and the insurer and this can be adapted to allow photographs to be taken and/or uploaded via the chat interface.

In this embodiment, the insurer provides a web application 205 that can be used by the person phoning the insurer 110 by accessing the web application 205 using a URL in a standard browser and taking photos 130 which are uploaded via the web application 205 and transmitted via the Internet to the insurer.

As the details of the insured person 120, crash details 125 and photos of the damage 130 are provided by the party phoning the insurer representative, the computer system used by the representative is configured to display a dynamic live estimate of the repair cost of the damage to the vehicle which is updated periodically as each item of new information is received and processed by the insurer computer system (either by the representative entering 350 it into the computer system as they follow the script for such calls or by receiving information from the insurer database about the relevant policy or by receiving photos of the damage via the web application 205).

The insurer representative can see a live damage estimate 210 displayed on the screen, which is determined using the method described in the following embodiments based on the provided accident/damage photos 130, and in some embodiments may also be presented with a level of certainty for that estimate 210 and whether any further photos of any damage are required to increase the level of certainty in the estimate. In some embodiments, a required/threshold level of certainty is required in order for the representative to authorise one or more of the possible solutions for the insured party (i.e. total loss 140, repair 145 or a cash settlement 150).

Once there is an acceptable level of certainty in the estimate 210, or the representative has concluded their script 115, the three options typically available to the representative are able to be chosen or offered by the representative if permitted (i.e. total loss 140, repair 145 or a cash settlement 150).

On the representative display, a total loss calculation 140 is made by a trained model which indicates whether, based on the information 120, 125, 130 provided by the party calling the representative 110, it appears that the value of the likely repairs to the vehicle indicate that the vehicle is a total loss. The output of this total loss calculation 140 is a yes/no indication to the representative. The output can be presented to the representative while they are still on the telephone call with the person phoning the insurer, and the verification of the calculation 370 can be performed by the representative or other insurer personnel during the telephone call. In some embodiments, an initial decision can be provided over the phone call but confirmation will be made in some or all such decisions by insurance loss adjusters.

On the representative display, a cash settlement calculation 150 is made by a trained 375 computer model and displayed to the representative which indicates whether, on the information 120, 125, 130 provided by the party calling 110 the representative, an amount has been determined according to the rules of the insurer that can be offered to the party calling the representative as a cash settlement amount. The output of this cash settlement calculation 150 is a monetary amount that can be offered by the representative for immediate payment in 380 settlement of the claim in lieu of arranging and paying for repairs to the vehicle. The output can be presented to the representative while they are still on the telephone call with the person phoning the insurer, and the verification of the calculation can be performed by the representative or other insurer personnel during the telephone call, and the offer can be made by the representative or other insurer personnel during the telephone call and accepted by the 385 caller during the telephone call. In other embodiments, the offer can be presented as an initial decision and the offer finalised by the insurer following the call and issued in writing to the insured party to accept in writing.

On the representative display, the option to submit the information provided 120, 125, 130 (optionally along with the estimated and/or an authorised damage repair cost) to a repair shop or body shop and to authorise the repair of the vehicle 105 is also presented. In some embodiments, the estimated repair cost is provided to the repair shop or body shop. In some embodiments, the estimated repair cost, or a figure based on the estimated repair cost, is provided to the repair shop or body shop as the authorised damage repair cost (i.e. repair costs in excess of the authorised amount requires further approval from the insurer before the 395 repair shop or body shop can proceed with making any repairs).

The representative can offer a total loss option if permitted (i.e. if the system determines that the vehicle is a total loss), a cash settlement option if permitted (i.e. if permitted by the insurer rules), or authorise the repair if permitted (i.e. if the vehicle is not a total loss and the claim is valid and enough information has been provided).

The web app 205 in this embodiment can be provided as a computer application that is executed within a standard browser and accessible using a web URL, which allows anyone with a browser capable computing device (e.g. a smartphone, tablet computer, laptop or desktop computer) to access the web app while on a call with the insurer 110. Alternatively, it can be provided as or via a native application for a smartphone, tablet computer or a laptop/desktop computer.

Figure 3:
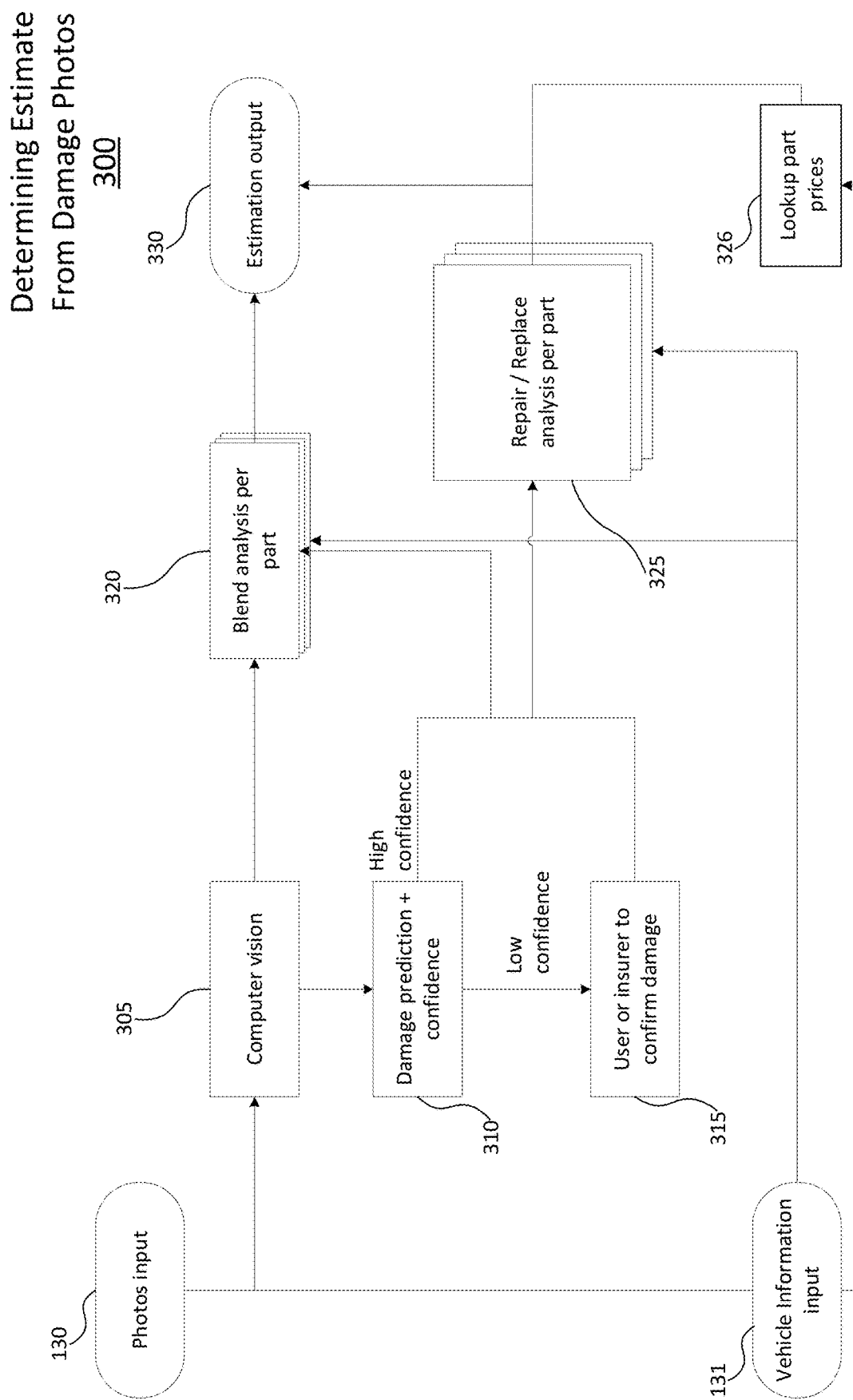
FIG. 3 shows the process of determining an estimate for repair cost of a damaged vehicle from photos of the damaged vehicle and vehicle information according to an embodiment.

Referring to FIG. 3, an example embodiment is shown of a method of processing photos of a damaged vehicle in order to predict damage to a vehicle and estimate the repair cost for the damaged vehicle 300 and this method will now be described.

One or more photos of a damaged vehicle 130, typically in the region of ten to twenty photos, are provided by the caller to the insurer. These photos 130 are provided to the damage estimation process shown in this embodiment. The photos 130 will be of the damaged area of the vehicle primarily, but perhaps from a few angles and from different distances (for example, to show a close-up photo of any damage as well as a more contextual photo showing the damaged area and the surrounding undamaged portions of the vehicle).

In addition, vehicle information 131 is provided to the damage estimation process shown in this embodiment. Vehicle information can include model information, specifics of the vehicle (including condition, colour, optional features chosen when manufactured, modifications made to the vehicle compared to the standard). Images captures of this vehicle in this embodiment (and other embodiments) would include images showing the overall vehicle (for example, images taken from at least roughly all four corners of the vehicle) as well 420 as images showing any damage to the vehicle.

The damage estimation process uses the photos 130 and vehicle information 131 in a computer vision analysis process 305, using a trained computer vision model. The computer vision analysis process 305 identifies the parts of the vehicle shown in the photos 130, optionally using the vehicle information 131, using a set of multiple trained models, each of which trained models having been trained to recognise a specific and/or generalised vehicle part (e.g. a front bumper, or a hood, or left hand front door). The output of each of these models is combined by the computer vision analysis process 305 into a damage vector. The damage vector combines the prediction output by each trained model for each part, indicating a prediction of whether each part is damaged, and/or an indication for each part of how damaged that part is and/or in what way it is damaged, and/or along with a confidence value for each part representing the certainty of the prediction made for each part. In this embodiment, the damage vector 310 comprises the combined predictions output by the trained models 305 along with a confidence value. In other embodiments the damage vector 310 can include additional or alternative outputs from the computer vision process 305 and/or other trained models processing the input photos 130 and/or vehicle information input 131.

The damage vector 310 is output by the computer vision process 305 into (a) a representative/caller confirmation process 315 and (b) a blend analysis process 320 and (c) a repair/replace analysis process 325.

In some embodiments, where portions or all of the damage vector 310 indicate a low confidence prediction, the representative/caller confirmation process 315 displays to the representative if there are any low confidence predictions (for example, having confidence values below a predetermined threshold) for whether a part is damaged to allow the representative to guide the caller to take additional photos 130 of the one or more parts/regions of the damaged vehicle for which there are low confidence predictions. Alternatively, or in addition, the representative can be prompted during the representative/caller confirmation process 315 to ask certain questions, depending on which part has a low confidence prediction, and the representative can input the answers to the representative/caller confirmation process 315 in order to increase the prediction confidence 450 above an acceptable threshold by augmenting the input data, allowing a revised prediction to be generated by the one or more trained models. The questions that are provided to the representative by the representative/caller confirmation process 315 can be obtained from a database (not shown) of questions that can be asked per part/region/normalised part of the damaged vehicle and/or from additional photos of the damaged vehicle.

The blend analysis process 320 includes a set of multiple trained models, each trained to perform blend analysis per part of the vehicle using the damage vector 310 and the photos 130 and the vehicle information 131, along with any further information from the representative/caller confirmation process 315. Specifically, for each part of interest the blend analysis process 320 assesses whether any neighbouring parts are damaged and will be 460 repainted, or replaced with a pre-painted part, in order to determine whether the part under consideration will need to have a paint blending operation performed in order to blend the paint on the part under consideration with the paint applied to the repaired or replaced part(s) neighbouring the part under consideration. In some embodiments, all parts will be considered, whereas in other embodiments only selected or determined parts will be considered by the 465 blend analysis process.

The repair/replace analysis process 325 similarly uses a set of multiple trained models, each model trained to perform an assessment of a specific part of a vehicle (be this a specific part, or region, of normalised part of the damaged vehicle). Specifically, each model assesses, based on the input damage vector 310 and the photos 130 and the vehicle information 131, along with any further information from the representative/caller confirmation process 315, whether the part under consideration needs to be replaced or repaired.

To produce an output estimation of damage and the predicted repair cost for the vehicle, the outputs of the blend analysis process 320 and the repair/replace analysis process 325 are combined with data obtained by a part lookup process 326 by the output estimation 475 process 330. The part lookup process 326 uses the input vehicle information 131 to determine the current market prices for each part for the vehicle under consideration and provides this to the output estimation process 330. The output estimation process 330 combines the predictions for damage to each part of the vehicle, whether each damaged part needs to be repaired or replaced, the current prices for parts to be replaced, and any painting/blending 480 cost. The output of the output estimation process 330 is a prediction for the repair cost for the damaged vehicle. In alternative embodiments, the output is a prediction of the repairs necessary, optionally broken down into materials and/or repair operations required.

The photos 130 may be all of the photos provided to the insurer by a caller or may be a selection of those images either selected automatically (e.g. based on quality of image, image content, image metadata, a provided image description or caption from the representative or caller, or insurer rules) or manually (i.e. selected for use by the representative or other personnel of the insurer, or highlighted by the representative or user as relevant).

The vehicle information 130 may sometimes be only a very limited amount of information such as the make and model of the vehicle, its age and government registration details, and its paint colour, or it can be a richer dataset including comprehensive details about the vehicle specification and condition as well as caller-provided and insurer-collected information about the vehicle. Different embodiments have different minimum input data requirements in respect of the vehicle information 130.

Different trained models and trained model arrangements can be used in the computer vision analysis process 305 and/or the blend analysis 320 and or the repair/replace analysis 325, and different arrangements for these models can be implemented such as to train one or a plurality of models that can recognise two or more parts rather than just one specific part as per the above described embodiment.

During the representative/caller confirmation process 315, the information on low confidence predictions from the damage vector 310 can be presented to either the representative or directly to the caller via the web app in order to obtain either further photos from the caller or information to increase the confidence of the predictions for which there is low confidence output from the computer vision process 305.

In alternative embodiments, there is optionally an additional paint estimation process included as part of the method of processing photos of a damaged vehicle in order to predict damage to a vehicle and estimate the repair cost for the damaged vehicle. The inputs can include some of the outputs from other processes. The paint estimation process can use multiple trained models to assess, per part, whether any painting is required for each part of the damaged vehicle or can obtain this data from a third-party database. The output of these models is provided to the output estimation process 330 which uses this additional information to output the prediction for the repair cost for the damaged vehicle.

In alternative embodiments, there is optionally an additional labour estimation process as part of the method of processing photos of a damaged vehicle in order to predict damage to a vehicle and estimate the repair cost for the damaged vehicle. The labour estimation process can use multiple trained models to determine, per part, the extend of the damage and whether any labour is required to perform repairs and/or replace any parts. A lookup can then be performed to produce an output value by using the determination to obtain this output data from a third-party database, for example to determine an output value by submitting a query for a time value for one or more labour tasks to repair and/or replace partsalong with some or all of the vehicle information input 131 and receiving in return from the third-party database repair information determined for that job for the specific make, model and year (MMY) of the damaged vehicle. Some of the outputs from other estimation processes can be used as inputs to the labour estimation process. The output of these models is provided to the output estimation process 330 which uses this additional information to output the prediction for the repair cost for the damaged vehicle.

In alternative embodiments, there is optionally an additional paint labour estimation process as part of the method of processing photos of a damaged vehicle in order to predict damage to a vehicle and estimate the repair cost for the damaged vehicle. The paint labour estimation process can use multiple trained models to determine, per part, whether no paint is needed, a "spot" paint job is needed, or more or less than 50% of the part needs to be painted. A lookup can then be performed to produce an output value by using the determination to obtain this output data from a third-party database, for example to determine an output value by submitting a query for a "spot" paint job along with some or all of the vehicle information input 131 and receiving in return from the third-party database repair information determined for that job for the specific make, model and year (MMY) of the damaged vehicle. Some of the outputs from other estimation processes can be used as inputs to the labour estimation process. The output of these models is provided to the output estimation process 330 which uses this additional information to output the prediction for the repair cost for the damaged vehicle.

In some embodiments, there is optionally an additional remove and installation estimation process as part of the process of estimating a repair cost for the damaged vehicle. This estimation process estimates the amount of time that is necessary to perform all of the tasks required for replacing a damaged part of a vehicle. These estimates are obtained from a rule set for each part or group of parts/type of part that has been built up by an expert based on knowledge of repairs to vehicles, or are obtained from a third party data provider to which a query specifying the part in question and the vehicle information and some damage information is transmitted and an estimate returned by the data provider. Optionally, this process receives one or more outputs from other modules that are included in its output. The output from the rule set or the returned estimate from the data provider is then used as the output from the remove and installation process.

In other embodiments, there is optionally an additional overlap calculation performed. The overlap that can be identified is the overlap in repair work to be performed when considering repairs to neighbouring parts that are damaged, as repairs to multiple neighbouring parts will involve common components that only need to be replaced/handled or tasks that can be performed once and thus do not need to be repeated for each part. In some embodiment, this overlap is determined from a query to a third-party data provider. Thus, a modifier can be determined based on the number and degree of overlap between repair tasks and components to take into account the overlap between repairs to neighbouring damaged parts of a vehicle.

Figure 4:
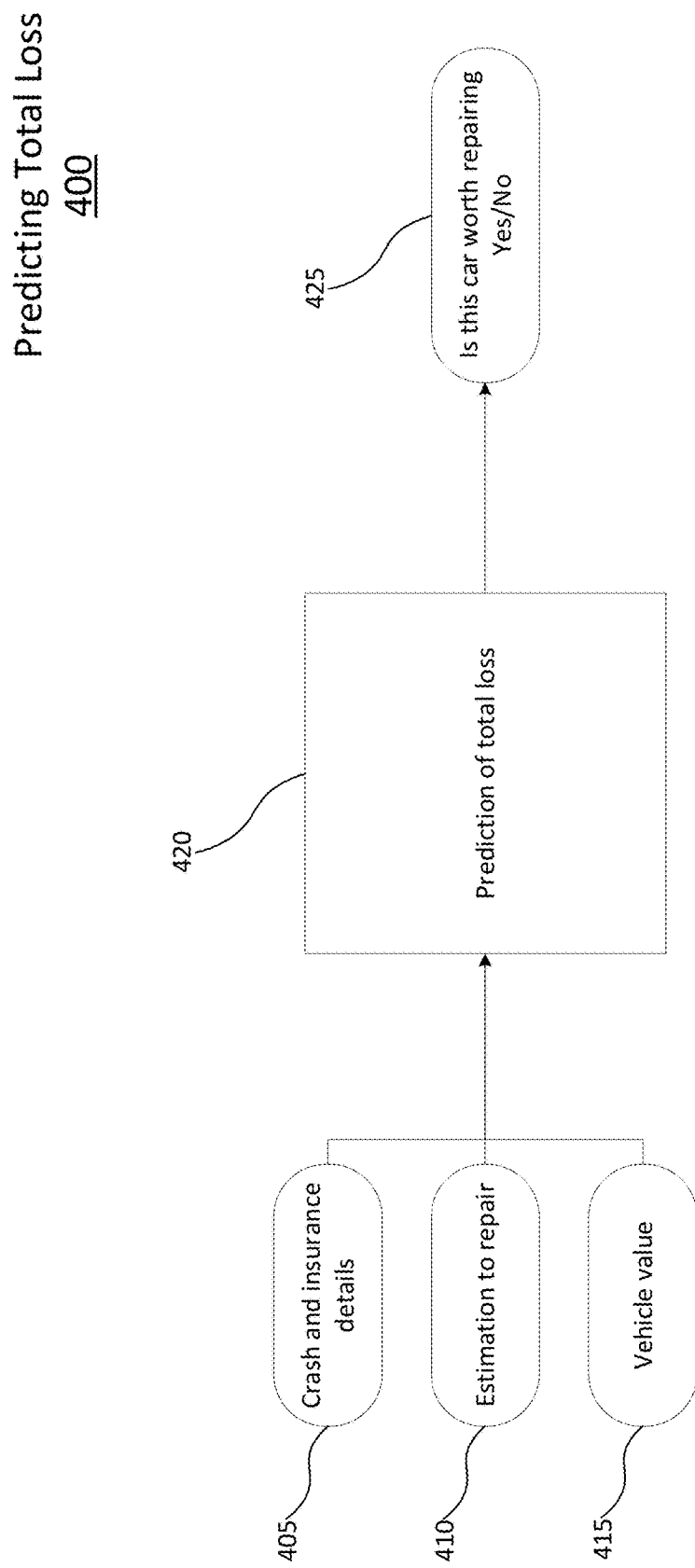
FIG. 4 shows a flowchart outlining a process of predicting whether the damage to the vehicle is a total loss according to an embodiment.

Referring to FIG. 4, an example embodiment 400 of a method of predicting total loss based on the input information and photos provided by a caller to the insurer and the representative will now be described.

In this embodiment, a method 400 of predicting total loss is described that can be used with any of the other described embodiments or alternative embodiments, or with the aforementioned aspects described in this specification.

According to this embodiment, the method 400 takes as input data the crash and insurance details 405 and the repair estimate 410 output by the damage prediction model of one of the embodiments described herein and the vehicle value 415.

The crash and insurance details 405 will be provided by the caller to the insurer's representative when calling or contacting the insurer to report the accident/damage to the damaged vehicle as described in relation to the other described embodiments herein.

The estimate for repair costs for the damaged vehicle 410 is determined using the damage repair estimation process described in the embodiments and alternative embodiments that have been described herein. This estimate 410 may comprise any combination of: the operations required to repair the damaged vehicle; the parts and/or materials required to repair the damage vehicle; and the associated financial costs of repairing the damaged vehicle.

The vehicle value 415 may be estimated, and/or have been provided by the insured party, and/or be determined by the insurer using rules or other guidelines, and/or is provided by a third party.

The prediction of total loss 420 is then determined, using a trained model, from a variety of factors including whether the crash details 405 indicate a class of accident that typically results in significant structural damage to a car making it unsafe. In other embodiment, other factors/combinations of factors can be used to make this determination. If it is determined that there has been significant structural damage, for example, the assumption can be made that the accident is a total loss. In alternative embodiments, the details of the accident can be assessed using a database of classes of accident (the database can be generated using knowledge from experts, or using data from insurers, or accessed through the use of a third part data provider) and/or the damage assessment that forms part of the repair estimate 410 to determine whether there is a high likelihood of a total loss or whether there is likely to be significant non-visible damage to the vehicle. In other embodiments, the repair estimate is generated (including an estimate of the financial costs of the repair) as per the described embodiments and if the total value of the repair is above a certain value, for example the replacement value or insured value of the vehicle, or a substantial fraction thereof, then it is determined that the accident has resulted in a total loss. The determination of total loss 420 also considers the damage repair estimate 410 against the vehicle value 415 using the insurer's own rules, policies and/or procedures to determine whether the cost of the repairs 410 is likely to exceed the vehicle value 415 or a significant proportion of the vehicle value 415.

Figure 5:
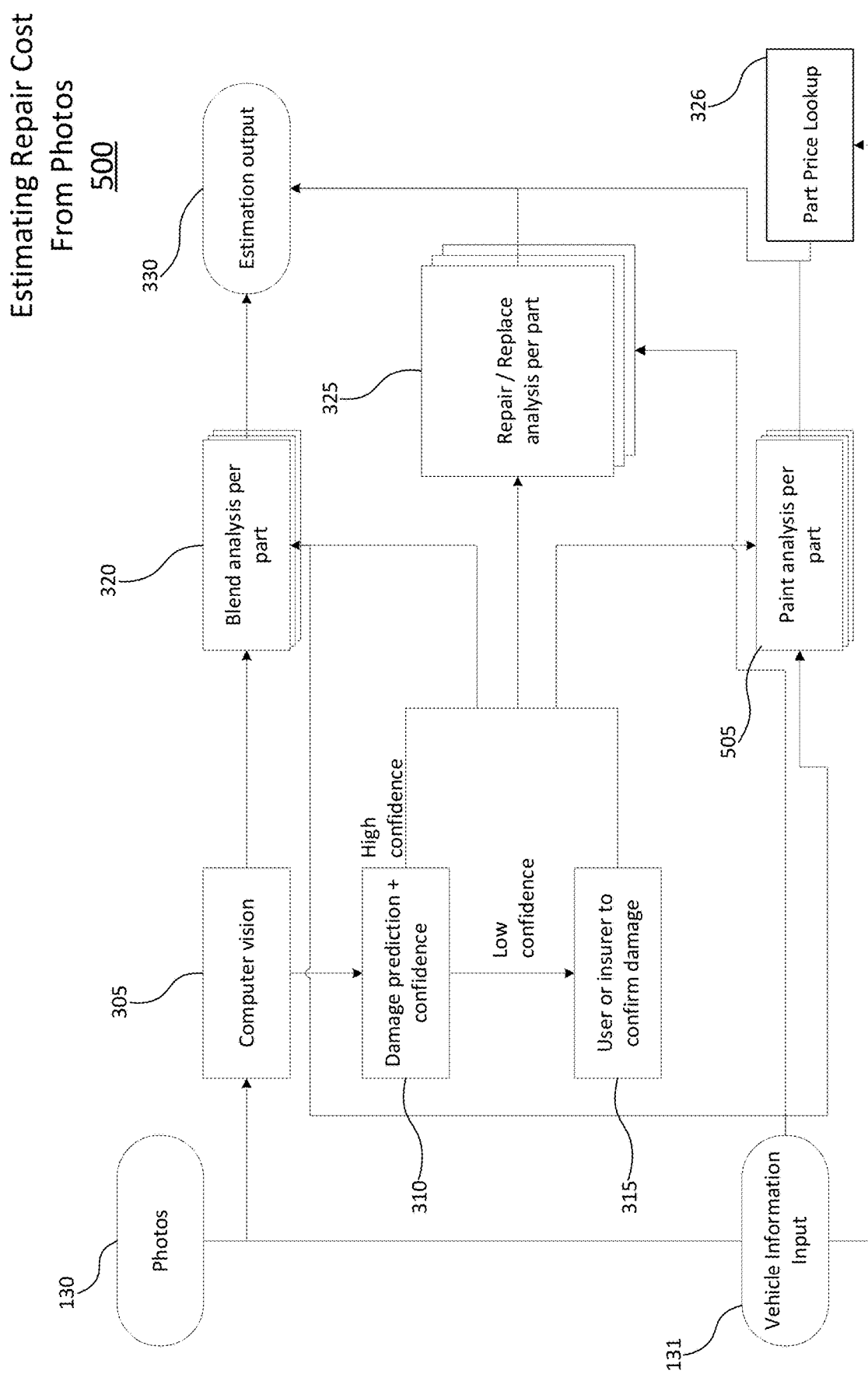
FIG. 5 shows a flowchart outlining a process of estimating the repair cost of a damaged vehicle from photos of the damaged vehicle and vehicle information according to an embodiment.

Referring to FIG. 5, another example embodiment is shown of a method 500 of processing photos of a damaged vehicle in order to predict damage to a vehicle and estimate the repair cost for the damaged vehicle, and this method 500 will now be described.

One or more photos of a damaged vehicle 130, typically in the region of ten to twenty photos, are provided by the caller to the insurer representative. These are provided to the damage estimation process 500 shown in this embodiment. The photos 130 will be of the damaged area of the vehicle primarily, but typically from a few different viewing angles and from different distances (for example, to show a close-up photo of any damage as well as a more contextual photo showing the damaged area and the surrounding undamaged portions of the vehicle).

In addition, vehicle information 131 is provided to the damage estimation process shown in this embodiment. Vehicle information 131 can include model information, specifics of the vehicle (including condition, colour, optional features chosen when manufactured, modifications made to the vehicle compared to the standard).

The damage estimation process uses the photos 130 and the vehicle information 131 in a computer vision analysis process 305. The computer vision 305 identifies the parts of the vehicle shown in the photos 130, optionally using the vehicle information 131, and uses of a set of multiple trained models, each of which trained models has been trained to recognise a specific generic vehicle part or region (e.g. a front bumper, or a hood, or left hand front door). The output of each of these per part/region models is combined by the computer vision analysis process 305 into a damage vector 310. The damage vector 310 combines the prediction output by each trained model for each part/region indicating a prediction of whether each part/region is damaged, and an indication for each part/region how damaged that part/region is, along with a confidence value for each part/region representing the certainty of the prediction made for each part/region. In other embodiments, specific parts for a specific make, model and year (MMY) of a vehicle are recognised instead of regions/generalised parts/normalised parts/ generic regions, optionally by using both the photos 130 and the vehicle information 131 rather than just the photos 130.

The damage vector 310 is output by the computer vision process 305 into (a) a representative/caller confirmation process 315 and to (b) a blend analysis process 320 and (c)

a repair/replace analysis process 325 and (d) a paint analysis process 505. Alternatively, the paint analysis process 505 can have its input as one or more of the outputs from one or more of the other processes 320, 325.

The representative/caller confirmation process 315 displays to the representative if there are any low confidence predictions (i.e. under a predefined threshold confidence value) for whether a part/region is damaged, to allow the representative to guide the caller to take additional photos 130 of the one or more parts/regions for which there are low confidence predictions. Alternatively, or in addition, the representative can be prompted during the representative/caller confirmation process 315 to ask certain questions, depending on which part/region has a low confidence prediction, and the representative can input the answers to the representative/caller confirmation process 315, which information is provided to the model 305 in order for the model to recalculate any low-confidence predictions, in order to increase the prediction confidence above an acceptable threshold. The questions that are provided to the representative by the representative/caller confirmation process 315 can be obtained from a database (not shown) of questions that can be asked per part/region of interest.

The blend analysis process 320 includes a set of multiple trained models, each trained to perform blend analysis per part/region of the vehicle using the damage vector 310 and the photos 130, along with any further information obtained from the representative/caller confirmation process 315. Specifically, the blend analysis process 320 assesses whether any neighbouring parts/regions are damaged, and thus will be repainted or replaced with a pre-painted part, in order to determine whether the part/region under consideration will need to have a paint blending operation performed in order to blend the paint on the part/region under consideration with the paint applied to the repaired or replaced part/regions(s) neighbouring the part/region under consideration.

The paint estimation process 505 uses multiple trained models to assess, per part/region, whether any painting is required for each part/region of the damaged vehicle. The input to the paint estimation process 505 is the damage vector 310 (and, in some embodiments, the photos 130), along with any further information obtained from the representative/caller confirmation process 315. The output of these models is provided to the 660 output estimation process 330.

The repair/replace analysis process 325 again includes a set of multiple trained models, each trained to perform an assessment of a specific part/region of a vehicle. Specifically, each model assesses, based on the input damage vector 310 and the photos 130, along with any further information obtained from the representative/caller confirmation process 315, whether the part/region under consideration needs to be replaced or repaired.

To produce an output estimation of damage and the predicted repair cost for the vehicle, the outputs of the blend analysis process 320 and the repair/replace analysis process 325 and the paint analysis process 505 are combined with data obtained by a part lookup process 326 by the output estimation process 330. The part lookup process 326 uses the input 670 vehicle information 131 to determine the current market prices for each part, or associated parts for the region, for the vehicle under consideration and provides this to the output estimation process 330. The output estimation process 330 combines the predictions for damage to each part/region of the vehicle, whether each damaged part/region needs to be repaired or replaced, the current prices for parts to be replaced, and any painting/blending 675 cost. The output of the output estimation process 330 is the prediction for the repair cost for the damaged vehicle.

The photos 130 may be all of the photos provided to the insurer by a caller or may be a selection of some of those images, either selected automatically (e.g. based on quality of image, image content, image metadata, a provided image description or caption from the representative or caller, or insurer rules) or manually (i.e. selected for use by the representative or other personnel of the insurer, or highlighted by the representative or user as relevant).

The vehicle information 130 can be only a very limited amount of information such as the make and model of the vehicle, its age and government registration details, and its paint colour, or it can be a richer dataset including comprehensive details about the vehicle specification and condition as well as caller-provided and insurer-collected information about the vehicle.

Different trained models and trained model arrangements can be used in the computer vision analysis process 305, and different arrangements for these models can be implemented such as to train one or a plurality of models that can recognise a generalised part/region, or two or more parts, rather than just one specific part in the above described embodiments.

During the representative/caller confirmation process, the information on low confidence predictions from the damage vector 310 can be presented to either the representative or directly to the caller via the web app in order to obtain either further photos 695 from the caller or information to increase the confidence of the predictions for which there is low confidence output from the computer vision process 305.

Alternatively, a further labour estimation process (not shown) can optionally also be included in embodiments and used as part of the output estimation process 330 to determine a prediction for the repair cost for the damaged vehicle.

In some embodiments, there is also a remove and installation estimation process (not shown) optionally included as part of the process of estimating a repair cost for the damaged vehicle. This estimation process estimates the amount of time that is necessary to perform all of the tasks required for replacing a damaged part of a vehicle. These estimates are obtained from a rule set for each part or group of parts/type of part that has been built up by an expert based on knowledge of repairs to vehicles, or are obtained from a third party data provider to which a query specifying the part in question and the vehicle information and some damage information is transmitted and an estimate returned by the data provider. The output from the rule set or the returned estimate from the data provider is then used as the output from the remove and installation process.

In other embodiments, there is optionally also an overlap calculation performed (not shown). The overlap that can be identified is the overlap in repair work to be performed when considering repairs to neighbouring parts that are damaged, as repairs to multiple neighbouring parts will involve common components that only need to be replaced/handled or tasks that can be performed once and do not need to be repeated for each part. Thus, a modifier can be determined based on the number of, and degree of overlap between, repair tasks and components to take into account the overlap between repairs to neighbouring damaged parts/regions of a vehicle.

Figure 6:
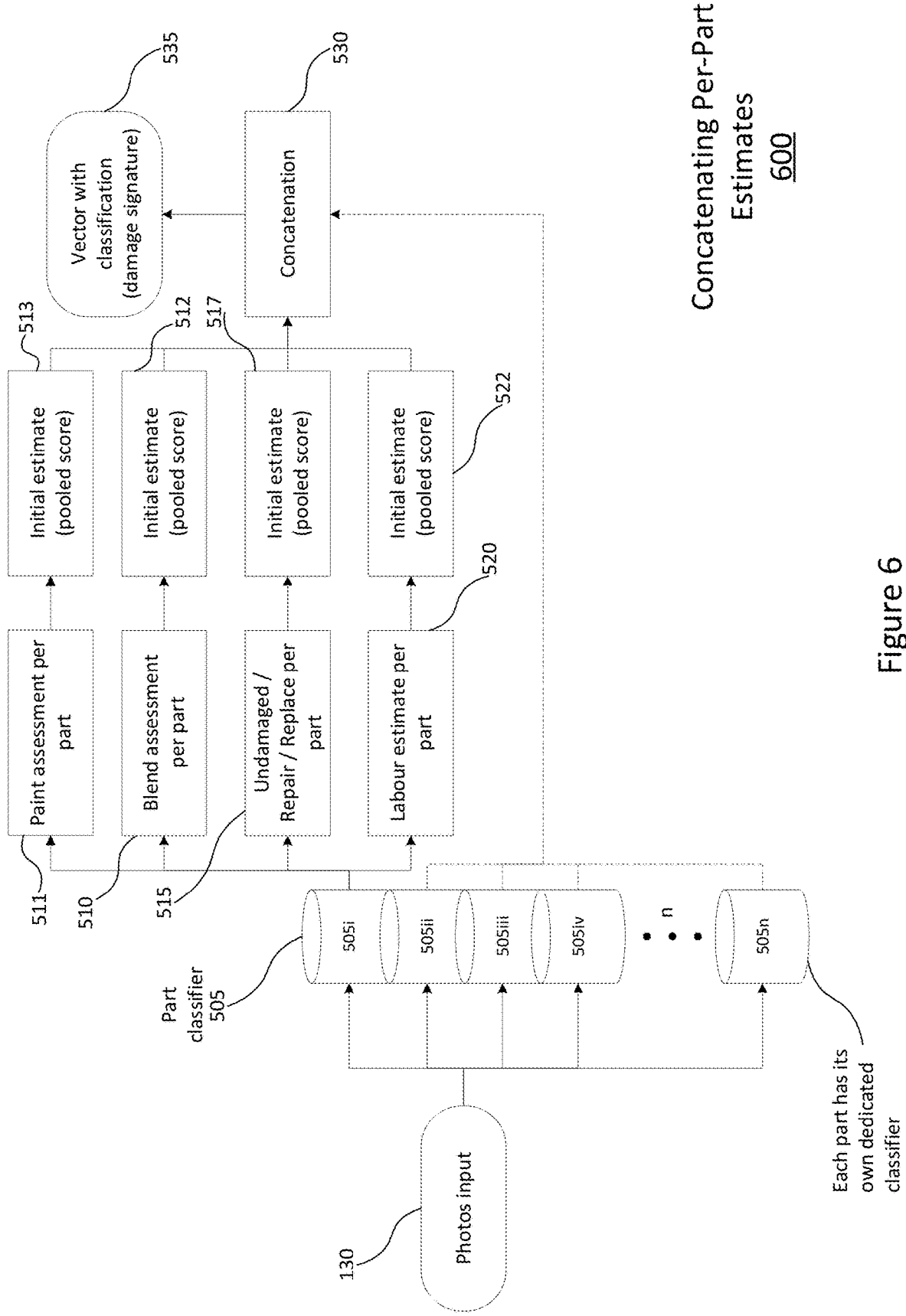
FIG. 6 shows a flowchart illustrating in one embodiment that each part has a dedicated classifier and that the photos for each part are provided to a set of models for each part to produce initial estimates/pooled scores per part per model and then that the results are concatenated into a damage signature vector according to an embodiment.

Referring to FIG. 6, an example embodiment of a process 600 of taking the photos 130 provided by the caller and processing these to output a damage signature vector 535 will now be described.

As in the other described embodiments, the caller provides photos 130 of the damaged vehicle. Typically these might number in the region of 10 to 20 images, but fewer photographs may be supplied (for example where only minor damage is visible) or conversely more photographs may be supplied (for example where there is extensive damage that requires many photographs to document and/or the caller provides a comprehensive selection of close up and distant/further removed photos of the damaged vehicle).

The part classifier 505 is a set of multiple models 505*i*, 505*ii*, 505*iii*, 505*iv* to 505*n* (n being the number of models) each of which runs in parallel on each of the photos 130 and each of which models 505*i*, 505*ii*, 505*iii*, 505*iv* to 505*n* is trained to determine whether a photograph contains a specific part/region of a vehicle. The output of each of the models 505*i*, 505*ii*, 505*iii*, 505*iv* to 505*n* are the determinations whether each part/region (for which each model is trained to detect) is present in each of the photos and some metadata, for example optionally indicating the damage predicted for that part and/or an associated confidence value.

The output from each of the multiple models 505*i*, 505*ii*, 505*iii*, 505*iv* to 505*n* of the part classifier 505 is fed into each of a set of further assessment models per part along with the photos 130. To illustrate the next stages in the process/method, only the output from one model 505*i* will be described here but the reader will understand that each of the multiple models 505*i*, 505*ii*, 505*iii*, 505*iv* to 505*n* of the part classifier 505 creates an output that is fed to a like group of assessment models per part in parallel with the described process in relation to the output from one model 505*i* that will now be described.

The output from the first models 505*i* of the part classifier 505 and the photos 130 is fed into multiple further assessment models, specifically a paint assessment model 511, a blend assessment model 510, a repair or replace determination model 515 and a labour estimation model 520.

The paint assessment model 511 receives the photos 130 and determines which of the photos 130 are deemed relevant by the part classifier model 505*i* (i.e. show the part of interest) along with the output metadata indicating the damage predicted for that part and an associated confidence value. The paint assessment model 511, for each relevant photo of the input photos 130, then predicts whether and the extent to which painting is required for each photo of the damaged part. This prediction is then output for each relevant photo of the damaged part and an initial estimate is determined 513 based on a pooled score of all of the predictions output by the paint assessment model 511 for all of the photos of the damaged part provided as an input to the paint assessment model 511 by the part classifier model 505*i*. Alternatively, the paint assessment model 511 can receive the outputs from other models and the paint assessment process submits queries to one or more third party databases to obtain information on what paint costs and tasks are required.

The blend assessment model 510 receives the photos 130 and determines which of the photos 130 are deemed relevant by the part classifier model 505*i* along with the output metadata indicating any damage predicted for that part and neighbouring parts and an associated confidence value. The blend assessment model 510, for each relevant photo of the input photos 130, then predicts whether and the extent to which blending is required for each photo of the part being considered based on the damage predicted for that or any neighbouring parts. This prediction is then output for each relevant photo of the part being considered and an initial estimate is determined 512 based on a pooled score of all of the predictions output by the blend assessment model 510 for all of photos of the part being considered provided as an input to the blend assessment model 510 by the part classifier model 505*i*.

The repair or replace determination model 515 receives the photos 130 and determines which of the photos 130 are deemed relevant by the part classifier model 505*i* along with the output metadata indicating the damage predicted for that part and an associated confidence value. The repair or replace determination model 515, for each relevant photo of the input photos 130, then predicts whether repair is possible or whether replacement is necessary for each photo of the damaged part based on the damage predicted by the part classifier model 505*i* for that photo. This prediction is then output for each relevant photo of the damaged part and an initial estimate is determined 517 based on a pooled score of all of the predictions output by the repair or replace determination model 515 for all of the photos of the damaged part provided as an input to the repair or replace determination model 515 by the part classifier model 505*i*.

The labour estimation model 520 receives the photos 130 and determines which of the photos 130 are deemed relevant by the part classifier model 505*i* along with the output metadata indicating the damage predicted for that part and an associated confidence value. The labour estimation model 520, for each relevant photo of the input photos 130, then predicts what labour for repair or replacement or painting of the part under consideration for each photo of the part under consideration based on the damage predicted by the part classifier model 505*i* for that photo and any neighbouring parts. This prediction is then output for each relevant photo of the part under consideration and an initial estimate is determined 522 based on a pooled score of all of the predictions output by the labour estimation model 520 for all of the photos of the part under consideration provided as an input to labour estimation model 520 by the part classifier model 505*i*. Alternatively, based on the output of one or more of the other processes, the labour estimation model 520 submits queries to one or more third party databases to obtain labour task and price estimates.

The output initial estimates 513, 512, 517, 522 are then concatenated 530, along with any other initial estimates produced for painting, blending, repair, replacement or labour for each of the other parts processed by the multiple models 505*i*, 505*ii*, 505*iii*, 505*iv* to 505*n* of the part classifier 505. The output of the concatenation 530 is a vector with classification 535 (otherwise known as a damage signature).

Figure 7:
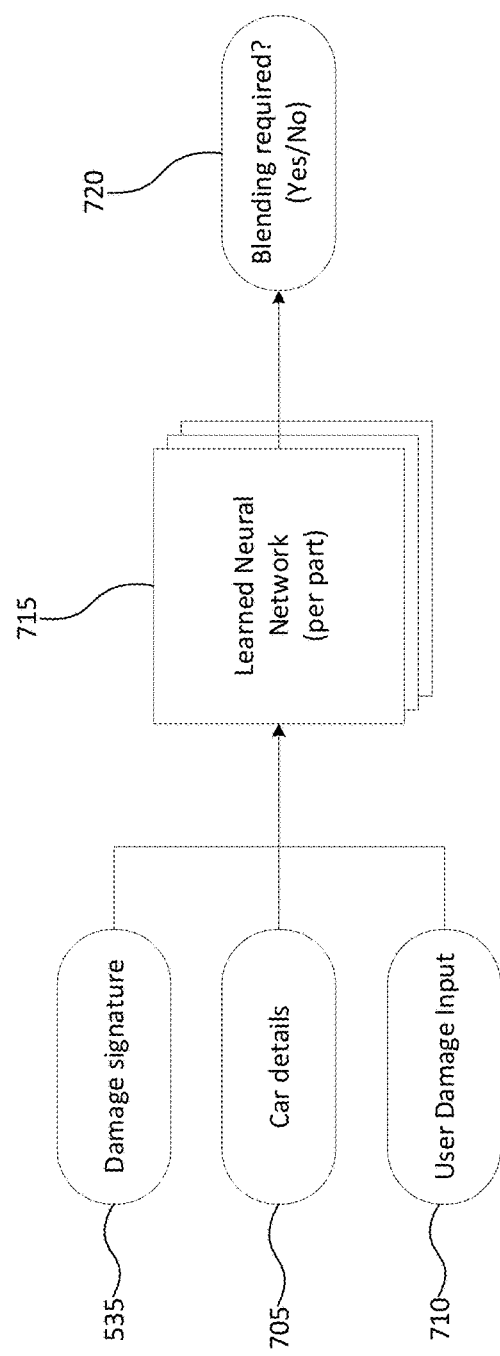
FIG. 7 shows a flowchart outlining a process of determining whether paint blending is required according to an embodiment.

Referring to FIG. 7, an example embodiment of a blending assessment model 700 will now be described.

The inputs to the blending assessment model 715 are the damage signature output from the computer vision or part detection model 535 along with the car details 705 and the information about the damage to the vehicle 710 provided by the caller to the insurer representative.

The blending assessment model 715 works on a per part basis, so is trained to assess whether blending is required for a specific part/region of a vehicle and uses information in the 805 damage signature 535 on what damage there is to neighbouring parts to assess whether an undamaged part/region requires blending with the new paint applied to either a repaired part or a replaced part that is painted or comes pre-painted. The model 715 is a trained machine learned model in this embodiment.

The output 720 of the blending assessment model 715 is a binary output per part as to whether blending is required for each part that is considered by each of the multiple per part blending assessment models 715. In other embodiments, more detailed outputs can be produced.

Figure 8:
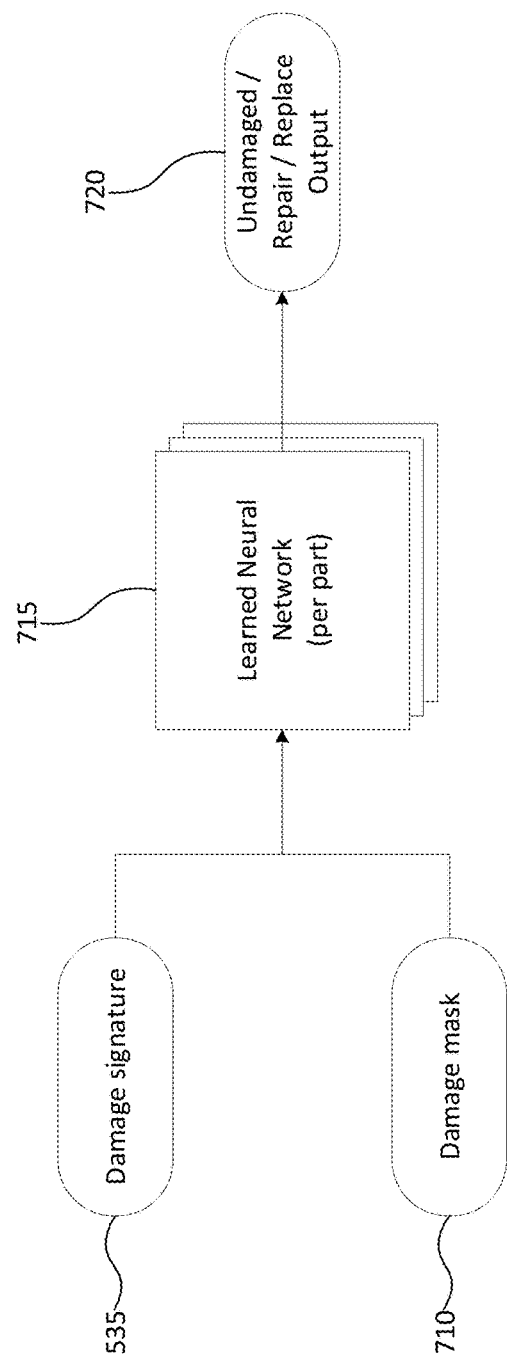
FIG. 8 shows a flowchart outlining a process of determining whether a part is undamaged, in need of repair or in need of replacement according to an embodiment.

Referring to FIG. 8, an example embodiment 800 of a repair or replace model (per part) 715 will now be described.

The repair or replace model (per part) 715 works on a per part basis, so is trained to assess whether a repair to each part is possible or whether a replacement part is required for a specific part of a vehicle. The repair or replace model (per part) 715 uses information in the damage signature 535 on what damage there is to the part being considered to assess whether a part is undamaged or whether a part can be repaired or requires replacing with a new part. The model 715 in this embodiment is a trained machine learned model.

The output 720 of the repair or replace model (per part) 715 is an output per part indicating whether each part is considered by each of the multiple per part estimation models 715 to be undamaged, repairable or need replacing.

Figure 9:
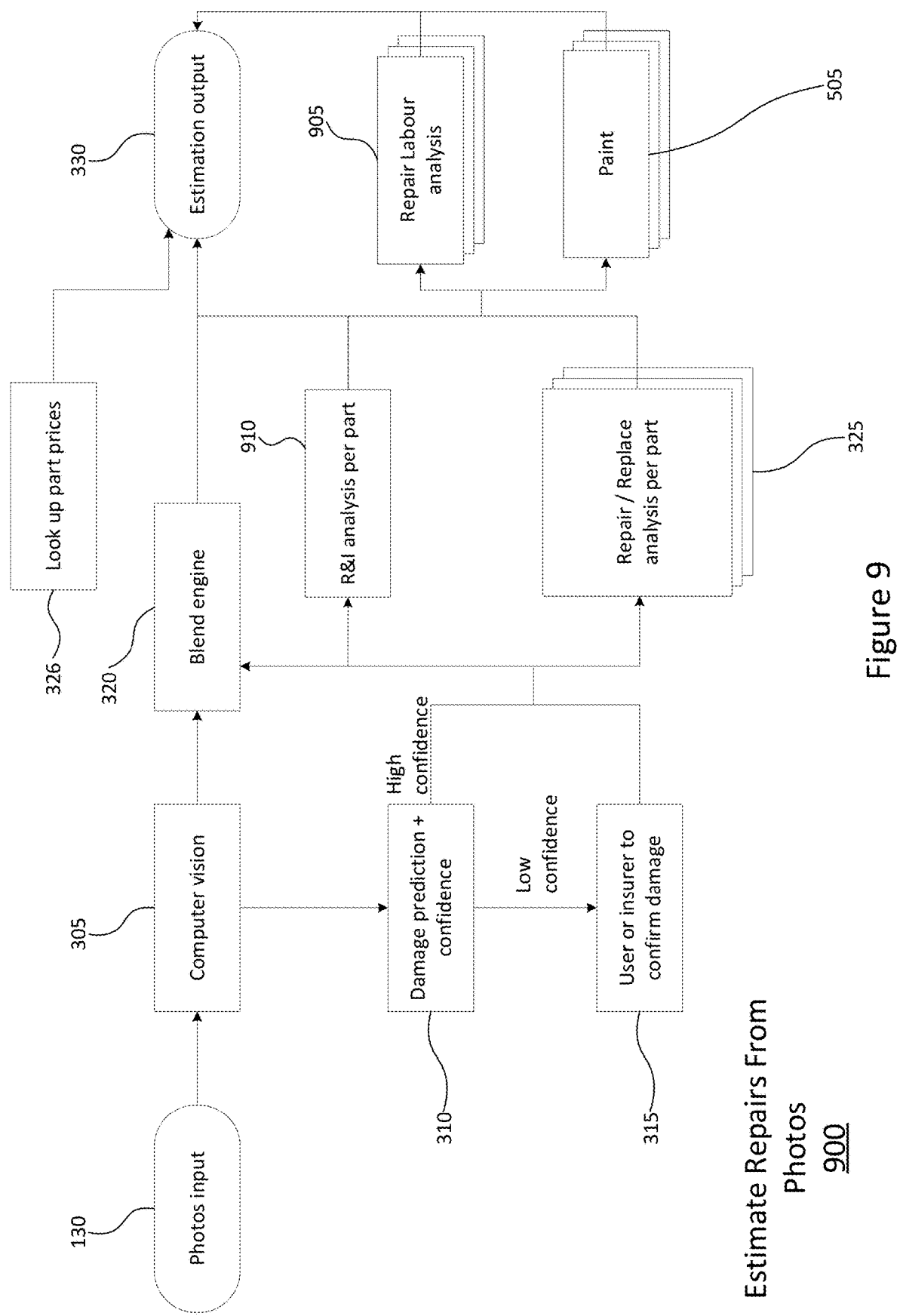
FIG. 9 shows a flowchart of a process for creating an estimate of repairs from photos input to the estimation method according to an embodiment.

Referring to FIG. 9, an example embodiment 900 of a variant of the method of producing a repair estimate from photos 130 of a damaged vehicle will now be described.

One or more photos of a damaged vehicle 130, typically in the region of ten to twenty photos, are provided by the caller to the insurer representative. These are provided to the damage estimation process shown in this embodiment. The photos 130 will be of the damaged area of the vehicle primarily, but perhaps from a few viewing angles and from different distances (for example, to show a close-up photo of any damage as well as a more contextual photo showing the damaged area and the surrounding undamaged portions of the vehicle).

The damage estimation process first uses the photos 130 in a computer vision analysis process 305. The computer vision analysis process 305 identifies the parts/regions of the vehicle shown in the photos 130 using of a set of multiple trained models, each of which trained models has been trained to recognise a specific vehicle part/region (e.g. a front bumper, or a hood, or left hand front door). The output of each of these models is combined by the computer vision analysis process 305 into a damage vector 310. The damage vector 310 combines the prediction output by each trained model for each part/region indicating a prediction of whether each part/region is damaged, and an indication for each part/region how damaged that part/region is, along with a confidence value for each part/region representing the certainty of the prediction made for each part/region.

The damage vector 310 is output by the computer vision process 305 into (a) a representative/caller confirmation process 315 and to (b) a blend engine 320 and (c) a repair/replace analysis process 325 and (d) a remove and install (R&I) process 910. In some embodiments, the damage vector 310 is also provided to a paint analysis process 505 and to a labour analysis process. In this embodiment, the outputs of the other processes 320, 910, 325 are provided as inputs to the repair labour analysis process 905 and paint analysis process 505.

The representative/caller confirmation process 315 displays to the representative if there are any low confidence predictions within the damage vector 310, as to whether a part/region is predicted to be damaged or not, to allow the representative to guide the caller to take additional photos 130 of the one or more parts for which there are low confidence predictions. Alternatively, or in addition, the representative can be prompted by the representative/caller confirmation process 315 to ask certain questions, depending on which part has a low confidence prediction, and the representative can input the answers to the representative/caller confirmation process 315 in order to increase the prediction confidence above an acceptable threshold. The questions that are provided to the representative by the representative/caller confirmation process 315 can be obtained from a database (not shown) of questions that can be asked per part. The output from this process is provided to the representative/caller confirmation process 315 and the revised output of the computer vision process 305, once the new information obtained during the confirmation process 315 has also been obtained, is a revised damage vector 310 which is provided to the blend engine 320, the repair/replace analysis process 325, the paint analysis process 505, and to the labour analysis process (via the blend engine 320). Alternatively, the output from this process is provided along with the original damage vector 310 to the representative/caller confirmation process 315, the blend engine 320, the repair/replace analysis process 325, the paint analysis process 505, and to the labour analysis process (via the blend engine 320).

The blend engine 320 (or blend analysis process) includes a set of multiple trained models, each trained to perform blend analysis per part/region of the vehicle using the damage vector 310 and the photos 130, along with any further information from the representative/caller confirmation process 315. Specifically, the blend analysis process 320 assesses whether any neighbouring parts/regions are damaged and will be repainted or replaced with a pre-painted part in order to determine whether the part/region under consideration will need to have a paint blending operation performed in order to blend the paint on the part under consideration with the paint applied to the repaired or replaced part/region(s) neighbouring the part/region under consideration.

The paint estimation process 505 uses multiple trained models to assess, per part/region, whether any painting is required for each part/region of the damaged vehicle. In some embodiments, the input to the paint estimation process 505 can be the damage vector 310 and the photos 130, along with any further information from the representative/caller confirmation process 315 and/or a revised damage vector 310. In this embodiment, the input is the outputs per part from the blend engine 320, the R&I analysis 910 and the repair/replace analysis 325. The output of these models is provided to the output estimation process 330. The paint estimation process 505 determines whether, for each part, no paint is needed, a "spot" paint job is needed, or more or less than 50% of the part needs to be painted. To obtain an estimate of the hours of labour needed to perform the determined level or painting, and to obtain a price for the paint required, one or more queries are sent to one or more third party databases to obtain data or an estimate.

The repair/replace analysis process 325 again includes a set of multiple trained models, each trained to perform an assessment of a specific part/region of a vehicle. Specifically, each model assesses, based on the input damage vector 310 and the photos 130, along with any further information from the representative/caller confirmation process 315, whether the part/region under consideration needs to be replaced or repaired.

The repair labour analysis module 905 takes input from the blend engine 320 and the repair/replace assessment module 325 and the paint analysis module 505 and makes a determination of the required labour time/amount needed to make the determined/estimated repairs/replacements and any paint application, and this determination is output to the estimation output process 305 for incorporation into the predicted repair cost.

In some embodiments, there is also an optional remove and installation estimation process 910 as part of the process of estimating a repair cost for the damaged vehicle. This estimation process 910 estimates the amount of time that is necessary to perform all of the tasks required for replacing a damaged part/region of a vehicle. These estimates are obtained from a rule set for each part or group of parts/type of part that has been built up by an expert based on knowledge of repairs to vehicles, or are obtained from a third party data provider to which a query specifying the part in question and the vehicle information and some damage information is transmitted and an estimate returned by the data provider. The output from the rule set or the returned estimate from the data provider is then used as the output from the remove and installation process.

In other embodiments, there is also an optional overlap calculation performed. The overlap that can be identified is the overlap in repair work to be performed when considering repairs to neighbouring parts that are damaged, as repairs to multiple neighbouring parts will involve common components that only need to be replaced/handled or tasks that can be performed once and do not need to be repeated for each part. Thus, a modifier can be determined based on the number and degree of overlap between repair tasks and components to take into account the overlap between repairs to neighbouring damaged parts of a vehicle. In this embodiment, calculation of any modifications to values due to any overlap is performed by the repair labour analysis module 905.

To produce an output estimation of damage and the predicted repair cost for the vehicle, the outputs of the blend analysis process 320 and the repair/replace analysis process 325 and the paint analysis process 505 and the repair labour analysis module 905 are combined by the output estimation process 330 and any modified calculation is applied. The output estimation process 330 combines the predictions for damage to each part of the vehicle, whether each damaged part needs to be repaired or replaced, any painting/blending cost and the labour cost (all of some of which having had a modifier, if calculated, applied to reflect a reduction due to overlap). The output of the output estimation process 330 is the prediction for the repair cost for the damaged vehicle.

In some embodiments, a overlap engine is used to perform an overlap calculation, to determine one or more reductions to be applied, for example where two neighbouring parts require repair operations to be performed, a reduction in labour time due to efficiencies from performing the repair operations/labour at the same time for both neighbouring parts can be applied to the overall total repair cost/operations/materials.

The photos 130 may be all of the photos provided to the insurer by a caller or may be a selection of those images either selected automatically (e.g. based on quality of image, image content, image metadata, a provided image description or caption from the representative or caller, or insurer rules) or manually (i.e. selected for use by the representative or other personnel of the insurer, or highlighted by the representative or user as relevant).

Different trained models and trained model arrangements can be used in the computer vision analysis process 305, and different arrangements for these models can be implemented such as to train one or a plurality of models that can recognise two or more parts rather than just one specific part as per the above described embodiment.

During the representative/caller confirmation process, the information on low confidence predictions from the damage vector 310 can be presented to either the representative or directly to the caller via the web app in order to obtain either further photos from the caller or information to increase the confidence of the predictions for which there is low confidence output from the computer vision process 305.

In some embodiments, vehicle information 131 can also be provided to the damage estimation process shown in this embodiment. Vehicle information can include model information, specifics of the vehicle (including condition, colour, optional features chosen when manufactured, modifications made to the vehicle compared to the standard). The vehicle information 130 can be only a very limited amount of information such as the make and model of the vehicle, its age and government registration details, and its paint colour, or it can be a richer dataset including comprehensive details about the vehicle specification and condition as well as caller-provided and insurer-collected information about the vehicle. The vehicle information can be used by any of the computer vision module 305, the blend engine 320, the paint estimation module 505, the repair/replace analysis module 325 and the repair labour analysis module 905 as well as for producing the final estimation output 330. A part lookup process 326 can use the input vehicle information 131 to determine the current market prices for each part for the vehicle under consideration and provide this to the output estimation process 330.

Figure 10:
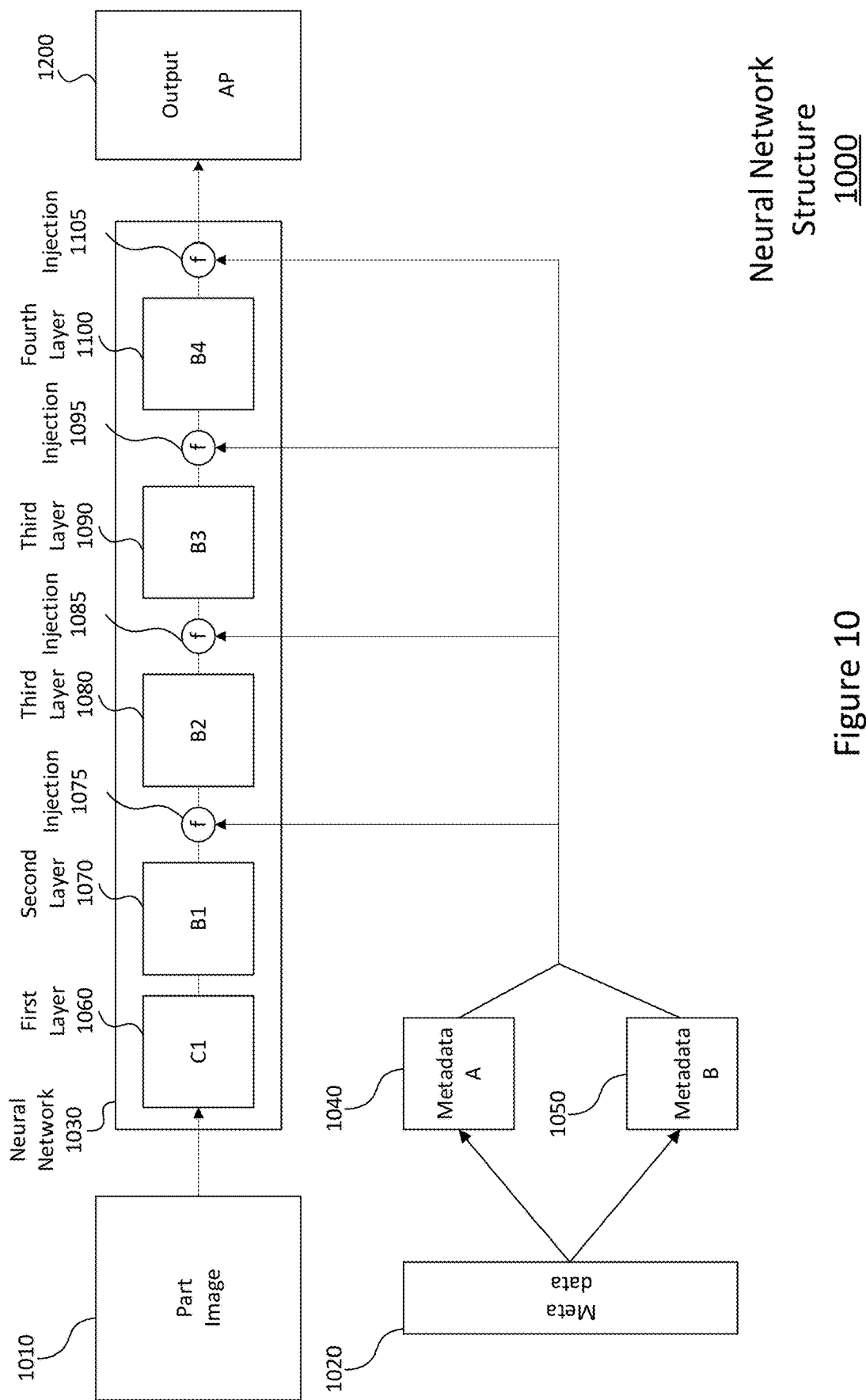
FIG. 10 shows the structure of a neural network which can be used to process the input images and metadata according to an embodiment.

Referring to FIG. 10, an example embodiment 1000 of a trained model architecture 1030 will now be described.

The trained model architecture 1030 is a neural network with a series of layers 1060, 1070, 1080, 1090, 1100 between most of which layers there are injection points 1075, 1085, 1095, 1105.

The input to the neural network 1030 is an image of a part 1010. The neural network 1030 is also provided with metadata 1020, which is split into two groups of metadata 1040, 1050, and which metadata 1040, 1050 is injected into the neural network 1030 between layers 1070, 1080, 1090, 1100 at injection points 1075, 1085, 1095, 1105.

The metadata 1020, 1040, 1050 can include (i) the repair/replace scores predicted for the part/region in question; (ii) the repair/replace scores predicted for any, multiple or all nearby parts/regions (iii) the undamaged/damaged values of the part/region in question (iv) the undamaged/damaged values of any, multiple or all nearby parts/regions; (v) the type of vehicle (e.g. whether the vehicle is a pick-up truck, car, van, etc); (vi) the number of doors the 975 vehicle has (e.g. whether the vehicle has two, three or four doors); and (vii) the colour of the vehicle (e.g. whether the vehicle is white, or where there are specific colours to types of vehicle, more precise colours or colour metadata can be captured). Other metadata can be injected in other embodiments, for example details about the vehicle (make, model and year; options selected, etc), damage (for example, the output of any classifiers/models), and 980 accident circumstances (for example, prior damage, circumstances of the cause of the damage, etc).

In an embodiment where the neural network 1030 is being used as a blending assessment model per part/region, only items (ii), (iv), (v) (vi) and (vii) of metadata 1020, 1040, 1050 will be used.

Each of items (ii), (iv), (v) (vi) and (vii) of metadata 1020, 1040, 1050 are injected separately at each of the injection points 1075, 1085, 1095, 1105.

The output 1200 of the neural network 1030 depends on how it has been configured. In an embodiment where the neural network 1030 is configured as a blending assessment model, the output will be a binary yes or no answer as to whether the part in question requires a paint blending operation to be performed thereupon.

Alternatively, instead of the neural network being constructed from a series of single layers 1060, 1070, 1080, 1090, 1100, the neural network can be constructed from one or more groups of layers.

In other embodiments the neural network 1030 can be configured to be a blend engine, a repair/replace analysis process, a remove and install process, a modifier calculation process, a paint analysis process, or a labour analysis process. Different metadata 1020 will be used in each of these embodiments.

Figure 11:
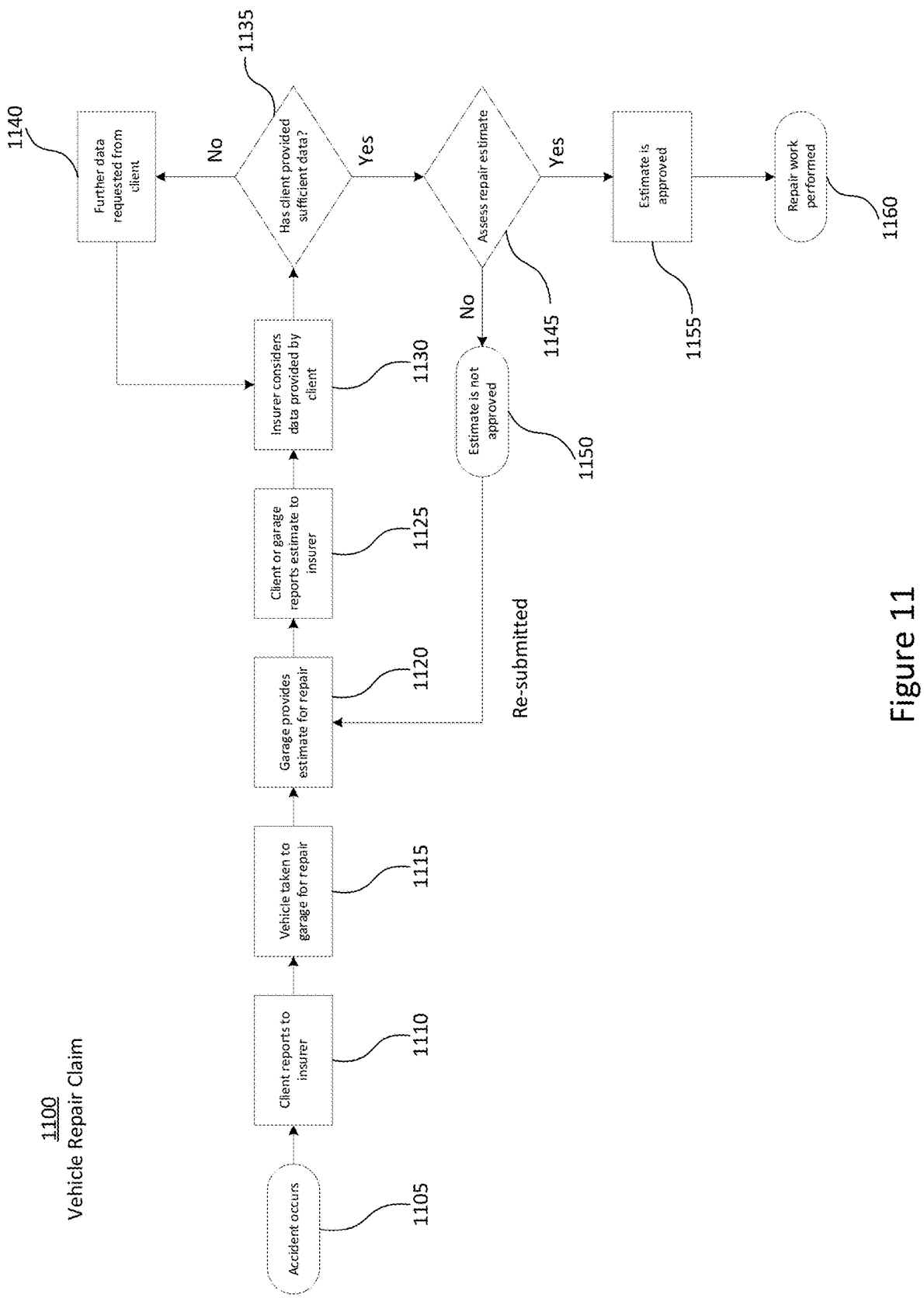
FIG. 11 shows a typical sequence of an insurance claim for vehicle damage, where the damage to the vehicle is repaired.

As shown in FIG. 11, which will be described in more detail below, conventionally vehicle repair cost estimates (or "claim estimates") are generated at a body shop (i.e. a garage or workshop where vehicles are serviced and/or repaired and which has been proposed by either a customer or insurer as the repairer of the insured damaged vehicle) when a customer brings in a damaged vehicle that is insured. The estimates are then reviewed by the insurer (this is typically known as the "claim review process"). Insurers, specifically a specialist team of people or representatives working for the insurer, when reviewing claim estimates, may be tasked to follow pre-defined procedures or workflows. Such procedures or workflows may require the relevant people/representatives to routinely challenge claim estimates where statistical anomalies are identified, for example. However, insurers face issues in reviewing claims accurately and efficiently as the task when performed manually is time-intensive and prone to human error. Inefficient processes in reviewing claims can result in a backlog of claims to be reviewed manually and can accumulate high costs associated with the inefficient processes. Providing an automated or semi-automated claim review system can help triage claims, and can help to identify leakage (i.e. proposed repairs that are either not covered by the relevant insurance policy or are unnecessary, incorrectly priced or even fraudulent) in claims, using automated assessments of the data and information provided to the insurer by both the insured party and the proposed repairer.

With reference to FIGS. 12 to 17, example embodiments relating to assessing claim input data using an automated assessment platform for verifying the claim input data, by generating estimates of damages and determining whether claim input data can be approved or is anomalous or whether further assessment may be required, will now be described.

Example embodiments provide an automated system to assess or review whether vehicle repair estimates are acceptable and legitimate. The system can be used to flag repair operations that are likely to be irregular in some way (i.e. potential leakage), which can then be further reviewed by the insurer (usually manually, by a specialist claims reviewer or loss adjuster).

In some embodiments, where no irregular operations are identified, or the number (or value) of irregular operations are below a pre-determined threshold, the repair operations can be automatically approved on behalf of the insurer, or allocated to a queue or workflow of the insurer.

As shown in FIG. 11, which shows a traditional vehicle repair claim process 1100, in cases of vehicle damage or following accidents 1105, the insured party will typically either take the insured vehicle to a repair shop or body shop for repair 1115 and will contact their insurer to report the accident 1110.

The repair shop or body shop may be chosen by the insured party or by the insurer, depending on various factors such as but not limited to the terms of the relevant insurance policy and the preference of the insured party.

If the insured party takes the damaged vehicle to the repair shop 1115 first, the damage is assessed by the repair shop in order for them to prepare a quote for, or an estimated cost of, the repair 1120 that is required to the damaged vehicle. Depending on the various factors, such as the procedures of the repair shop, the policy of the insurer and the severity of the damage or accident, the estimate from the repair shop is sent to the insurer 1125 for authorisation by the insurer as typically insurers scrutinise any repair estimates received 1130. The repair shop may transmit their estimated repair cost along with supporting details (e.g. repair labour proposed, parts required, materials required such as paint) to the insurer 1125. In addition to the repair estimate 1120 being sent to the insurer by the repair shop, the party that is insured (or a party reporting the damage/accident on behalf of an insured entity or in respect of an insured vehicle) will contact their insurer 1110 to report the accident or damage that has occurred and provide details to the insurer about the accident or damage 1125 including providing images of the damaged vehicle (which are provided either by the driver or the repair shop).

The insurer will then review the claim, optionally requesting further details from the insured party and/or the repair shop as necessary to verify the claimed amounts before approving the repair work or sending payment to either the insured party or the repair shop.

Specifically, the representative taking the telephone call on behalf of the insurer, when the client reports the accident 1105 to the insurer 1110, may run through a standard set of questions, or a decision tree of questions, to obtain a standard required set of information about the accident (e.g. the name of the insured person/vehicle; details of the vehicle including make, model and condition; details of any insurance policy; standard security questions; details of what happened to cause the accident; etc). In this way the insurer can be provided with information, for example a standard checklist of information requested by the insurer representative by following script, that will ensure that comprehensive details of the insured party and vehicle will be provided to the insurer as well as comprehensive accident and damage details. Additionally, photographs of the damaged vehicle may also be provided to the insurer.

As the details of the insured person, accident details and photographic images of any damage are provided by the party to the insurer, the insurer can consider 1130 and scrutinise the details provided typically to assess, but not limited to, the following (a) whether there is a valid insurance policy in place; (b) whether the reported damage is likely to have occurred in a way and timeframe covered by the insurance policy; (c) whether the proposed repairs are acceptable under the insurance policy or the criteria of the insurer; (d) whether the part prices quoted are within an acceptable threshold pricing for each part; (e) whether the proposed labour costs and time for repairs and/or painting are appropriate for the determined damage to the vehicle; (f) whether each decision to repair or replace a part was correct; (g) whether the paint work on parts should be blended; (h) whether the part is an OEM or non-OEM part (i) whether a pre-painted part should or shouldn't be used; and (j) whether the correct option for a part has been specified. Sometimes, the report to the insurer 1110 or the repair estimate provided to the insurer 1125 does not include sufficient information or detail when it is considered by the insurer 1130 and so, if the insurer determines that insufficient information or detail has been provided 1135, the insurer requests further information

1140. The insurer can then reconsider the data provided 1130 again, make a similar determination 1135 until sufficient detail is provided and then assess the repair estimate 1145 and then reject the estimate 1150 or approve the estimate 1155 so that the repair work can be performed 1160 by the garage. If the estimate is rejected 1150, then the process is repeated when the garage re-submits a revised repair estimate from step 1120.

Figure 12:
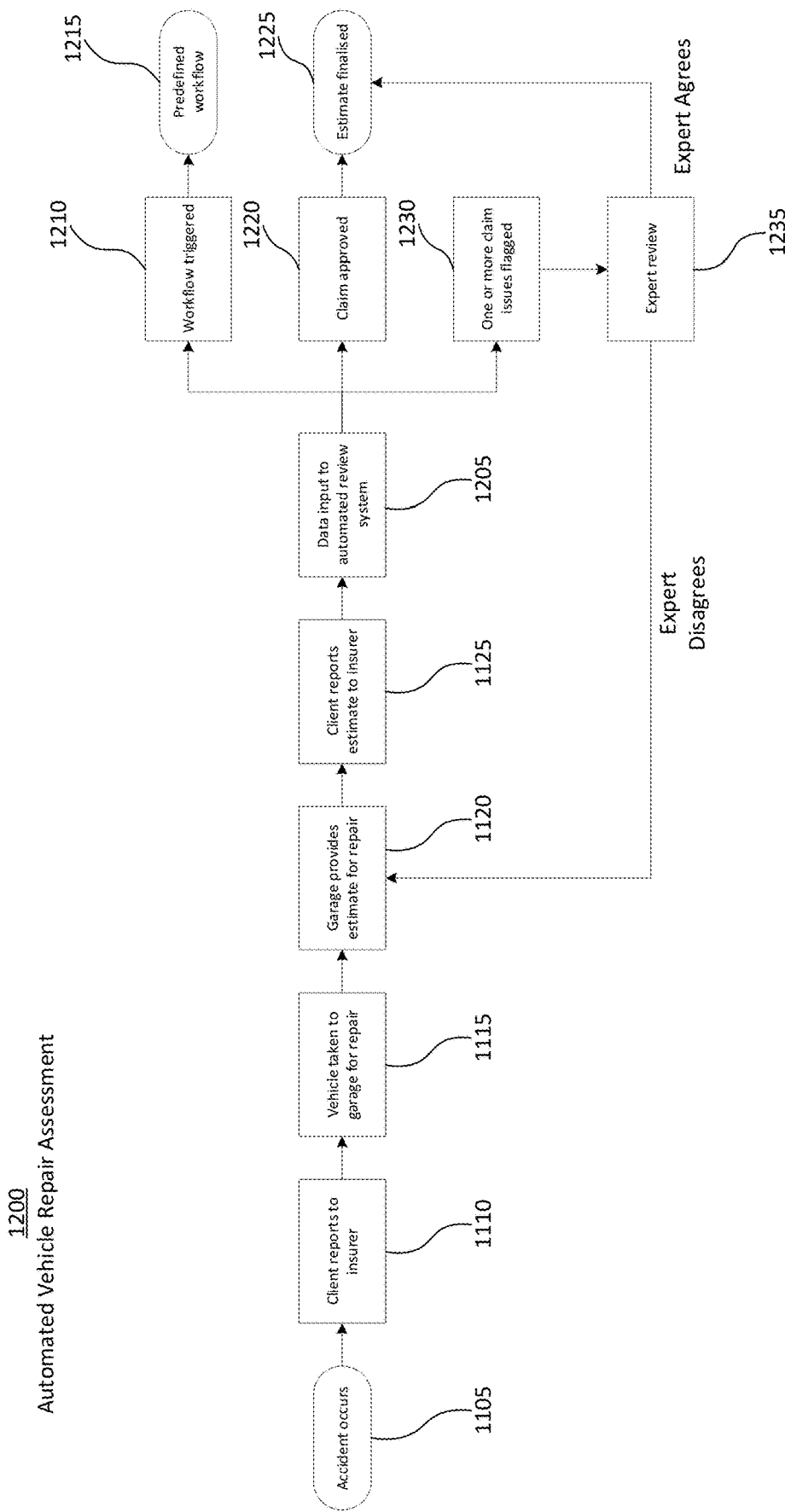
FIG. 12 shows the sequence of an insurance claim process including automated verification of proposed repair costs according to a described embodiment.

Referring to FIG. 12, an example embodiment of a claim process 1200 with an incorporated automated repair cost estimate review process will now be described.

Following an accident or damage to a vehicle 1105, the insured party/client reports the accident to their insurer 1110 following the accident 1105 and takes the vehicle to the body shop for a repair assessment 1115. The body shop prepares a repair estimate 1120 for the damage to the vehicle and reports this estimate to the insurer 1125.

The data or information in relation to a particular claim is input into an automated review system 1205, either manually by personnel at the insurer entering it into the front end of the review system or automatically by passing data received from the client and repair shop directly into the automated review system 1205.

In some embodiments the automated review system 1205 can carry out different or a combination of tasks depending on the type of data input into the automated system 1205. For example, in the embodiment shown in FIG. 12, the automated review system 1205 triggers one of three review processes: a pre-defined workflow to be completed by a user 1210, the automatic approval of claims with no determined anomalies 1220; or the flagging of cases where the automated system 1205 does not agree with the repair estimate produced by the body shop 1230 so triggers a manual (i.e. human expert) or further review of such flagged cases 1235—and the expert either agrees and the estimate is finalised 1225 or the expert disagrees and the garage is required to prepare a revised estimate 1120. Thus, in this example embodiment, the automated review system 1205 can approve, query or reject the body shop repair estimate in order to finalise the repair estimate 1225 for approval.

In the example embodiment, of the automated review system 1205 is able to perform a review by determining an independent repair estimate for the claim being reviewed based on the claim inputs and using estimates providers to determine an independent repair estimate using a computer-generated damage estimate (generated from the claim inputs) and comparing this independent repair estimate to the provided repair estimate from the garage 1125.

In example embodiments, workflows such as checking the VIN, checking if required photos are missing, and checking that invoices match repair estimates can be performed. For example, one workflow can be triggered when it is determined that there is an error or inconsistency with the VIN provided for the vehicle, or if the VIN hasn't been provided for the vehicle—the workflow can, instead of requiring the claim to be reviewed manually, automatically return the repair estimate to the garage and request the VIN details for the vehicle before the repair estimate is considered for approval. Another example workflow would be triggered should it be determined that insufficient photos have been provided of the damage to the vehicle, and requesting further or better quality photos of the vehicle or specific areas of damage to the vehicle from the garage before the repair estimate is considered for approval. A further example workflow would be triggered should an invoice be submitted for repair costs that do not match what was approved in a previous repair estimate, either triggering a manual (human) review or sending an automatic rejection of the invoice to the garage providing details of the inconsistency with a previously submitted repair estimate.

In embodiments, the damage to the vehicle is determined from the photos of the damaged vehicle to determine the extent of the damage and the severity of each piece of damage to the vehicle so it is important to have sufficient image data of the vehicle and that this image data is of sufficient quality. Some damage to a vehicle, such as structural damage cannot be determined from photos of the damaged vehicle, however.

Figure 13:
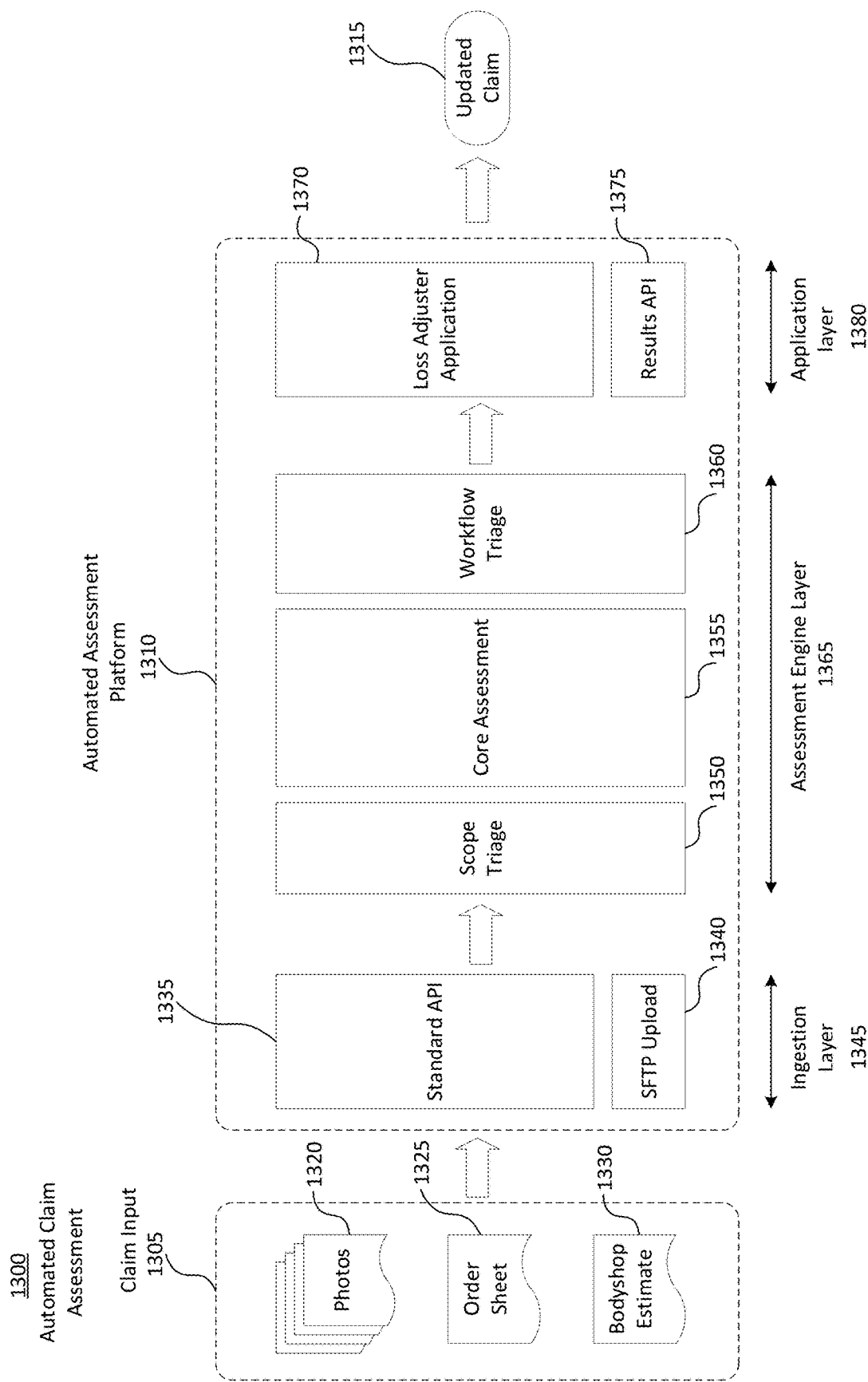
FIG. 13 shows a more detailed overview of the automated verification of proposed repair costs used in the embodiment shown in FIG. 12.

With reference to FIG. 13, an overview of process 1300 performed by the automated review system 1205 shown in FIG. 12 will now be described in further detail.

The inputs 1305 provided to the automated assessment platform 1310 include the information provided to the insurer by the client 1110 and the repair estimate 1125 from the garage. In the example embodiment, the automated assessment platform 1210 is provided with photographs 1320 relevant to the claim (i.e. photographs of the vehicle, including for example photographs of the vehicle from a few different angles around the vehicle as well as close up photographs, generally of the damaged portions and parts of the vehicle), an order sheet 1325 prepared by the insurer (i.e. details of the accident and/or damage prepared by the insurer having spoken to the client) and the financial estimate provided by the repair shop 1330 (i.e. a list of the parts needing replacement, the materials required such as paint and a list of the labour required to remove and replace parts or repair parts and then perform finishing actions such as painting the repaired portions of the vehicle, the prices for the parts listed, the prices for any materials listed and the prices for any labour listed).

The automated assessment platform 1310 of the example embodiment has three layers: an ingestion layer 1345; an assessment engine layer 1365; and an application layer 1380. In example embodiments, the automated assessment platform 1310 can assess the claim input through these layers 1345, 1365, 1380 in sequence.

In the example embodiment, the ingestion layer 1345 handles the input of data into the automated assessment platform 1320. The ingestion layer 1345 includes a standard application programming interface (API) 1335 and a secure file transfer protocol upload module 1340. The standard API 1335 provides a mechanism to input the claim input data 1305 into the platform 1310, in this embodiment by being connected to an in communication with the insurer systems into which the data has been input by a combination of the insured party, the garage and the insurer personnel. In the example embodiment, the insured party is provided with a web application on their mobile phone to take photographs of the damage to their vehicle by the insurer and the image data captured using this web application is stored on the insurer computer systems and provided by the standard API 1335 to the assessment platform 1310. Further, in the example embodiment, the body shop estimate 1330 are provided to the insurer by the garage using standardised third party software that captures the inputs from the garage personnel and prepares the body shop estimate 1330 in a standardised 1160 format for the insurer and uploads this directly into the insurer computer systems using the insurer's computer system API, which in turn provides this data to the assessment platform 1310 using the standard API 1335.

In the example embodiment, the assessment engine layer 1365 comprises a scope 1165 triage module 1350, a core assessment module 1355 and a workflow triage module

1360. More detail on the assessment engine later 1365 will be provided below with reference to FIG. 14.

In the example embodiment, the application layer 1380 comprises a loss adjuster application 1370 and a results API 1375. The loss adjuster application 1370 allows the insurer personnel to review the detailed independent repair estimate that has been generated by the assessment engine layer 1365 against the supplied garage repair estimate 1120, 1330 to enable the insurer personnel to compare the details of each estimate, and to assist with efficient comparison the loss adjusted application 1370 highlights any differences between the two estimates and provides an indication of the potential problems identified in the garage provided body shop estimate 1330. For example, the body shop estimate 1330 might list an additional labour operation that has not been determined to be required by the independent repair estimate generated by the assessment engine layer 1365, and this would be highlighted via the loss adjuster application 1370. The Results API 1375 allows for the output of the assessment engine layer 1365 to be sent to the relevant insurer computer systems and personnel, for example to enable approval of a repair estimate 1330 in the case where the independent repair estimate generated by the assessment engine layer 1365 concurs or matches within a predetermined approval threshold set by the insurer personnel.

In an alternative embodiment, the supplied garage repair estimate 1120, 1330 is used as an additional input by the assessment engine layer 1365 which then outputs one or more determinations of incorrect, potentially fraudulent or inconsistent portions of the supplied garage repair estimate 1120, 1330.

In the example embodiment, in order to output an updated insurance claim 1315 that can be or is approved by the insurer, the independently generated repair estimate from the assessment engine layer is output along with the claim input data 1305 and any result output as well as any adjustments made via the loss adjuster application 1330.

In some embodiments, the automated review (or assessment platform) 1310 can include, however is not limited to, one or more layers, modules, platforms, interfaces and/or tools. For example, the automated review may incorporate a platform 1310 to perform comprehensive automated assessments of claims using models, standard APIs to integrate with claims systems in the claim lifecycle and tools to help stakeholders use these assessments in their workflows. In some embodiments, the assessment platform 1310 can have two layers: an ingestion layer 1345 and an assessment engine layer 1365. In some embodiments, the ingestion layer 1345 can comprise a standard Application Programming Interface (API) 1335 and an SSH File Transfer Protocol (SFTP) upload 1340 or any other network protocol that may be used for secure file transfers. In some embodiments, the assessment engine layer 1365 can comprise a scope triage module 1350, a core assessment module 1355 and a workflow triage module 1360.

Figure 14:
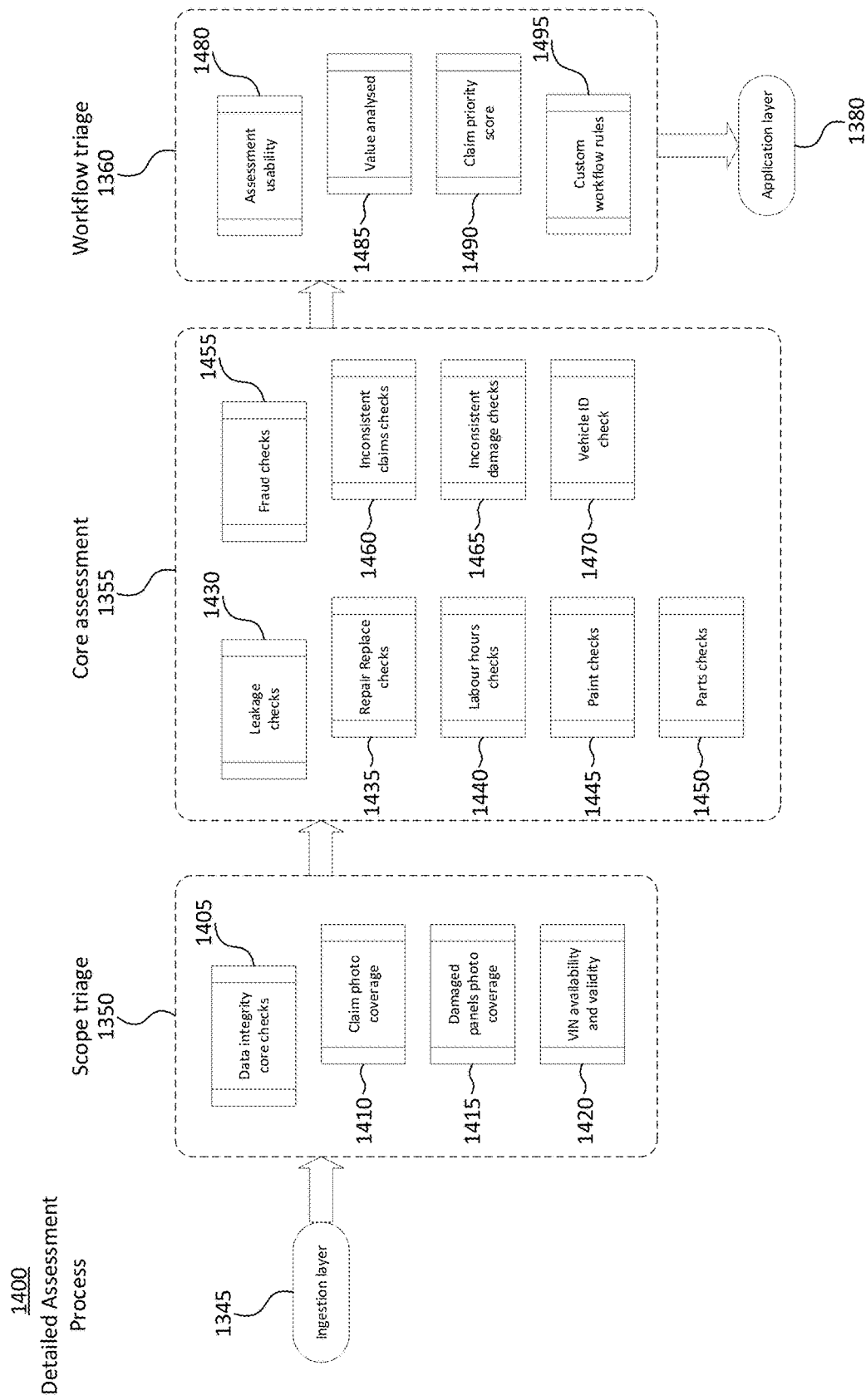
FIG. 14 shows an overview of an automated assessment platform according to an embodiment.

FIG. 14 shows a more detailed diagram 1400 of the assessment engine layer 1365 shown in FIG. 13 of the example embodiment which will now be described in more detail.

The claim data that is provided is assessed automatically using the automated assessment platform 1310. As mentioned above, in the example embodiment, the assessment engine layer 1365 of the automated assessment platform 1310 comprises three major modules: the scope triage module 1350, the core assessment module 1355 and the workflow triage module 1360.

In the example embodiment, the scope triage module 1350 performs data integrity checks 1405 on the data received from the ingestion layer 1345 by assessing claim photo coverage 1410, damaged panels photo coverage 1415, and vehicle identification number (VIN) availability and validity 1420.

The assessment of claim photo coverage 1410 determines, for the photographs 1320 that have been provided to the insurer, what part/region of the vehicle is shown in each photograph. This allows an assessment of whether sufficient photos have been taken of the vehicle.

The assessment of damaged panels photo coverage 1415 then performs verification against the order sheet 1325 and the body shop estimate 1330 that the photographs 1320 show all of the visible damage for which repairs, or replacements, are necessary in order for the automated assessment platform 1310 to make an independent assessment of the damage to the vehicle and the likely repair work required using the photographs 1320 in order to input these into estimates platforms to generate an estimate. In some embodiments, if a predetermined threshold of coverage of the vehicle with the photographs 1320 provided is not met, then the process can terminate and a request be provided to provide additional images of the damaged vehicle, optionally indicating the parts/regions for which images are required. In other embodiments, the process continues and an assessment is made by the system 1400 for the coverage possible with the images 1320 provided.

The determination of VIN (vehicle identification number) availability and validity 1420 checks that data is available for lookup for the supplied VIN and that the VIN matches either the detected or provided features of the vehicle.

In the example embodiment, the core assessment module 1355 is used to create an independent estimate of the repair work needed for the damaged vehicle based on the provided photographs 1320 that can then be used to verify the provided order sheet 1325 and body shop estimate 1330. The independent estimate of the repair work needed is generated by the core assessment module 1355 and checked using a series of checking modules 1430, 1435, 1440, 1445, 1450, 1455, 1460, 1465, 1470.

In the example embodiment, a leakage check module 1430 performs a check to identify any aspects of the body shop estimate 1330 that seems either unnecessary or superfluous; or to identify any decisions of the body shop estimate 1330 that seem to be incorrect (e.g. an incorrect repair versus replace decision) using data from the insurer's records of previous approved and rejected claims. The leakage check module 1430 in the present embodiment uses a repair replace check module 1435, a labour hours check module 1440, a paint check module 1445 and a parts check module 1450 to check respective aspects of the order sheet 1325 and the body shop estimate 1330.

The repair replace module 1435 checks that the repair and replace (i.e. that parts needing replacement and the parts needing repair rather than replacement) aspects of the order sheet 1325 and the body shop estimate 1330 match the equivalent aspects of the generated independent estimate of the repair work needed for the damaged vehicle.

The labour hours module 1440 checks that the labour (i.e. the amount of labour time and the labour operations/tasks to be carried out) aspects of the order sheet 1325 and the body shop estimate 1330 match the equivalent aspects of the generated independent estimate of the repair work needed for the damaged vehicle.

The paint module 1445 checks that the paint (i.e. the paint operations and materials cost) aspects of the order sheet 1325 and the body shop estimate 1330 match the equivalent aspects of the generated independent estimate of the repair work needed for the damaged vehicle.

The parts module 1450 checks that the parts (i.e. the list of parts needed) aspects of the order sheet 1325 and the body shop estimate 1330 match the equivalent aspects of the generated independent estimate of the repair work needed for the damaged vehicle and that these aspects are priced in line with data obtained from live data sources that can be queried for part prices.

In the example embodiment, a fraud check module 1455 performs a check to identify any aspects of the order sheet 1325 or the body shop estimate 1330 that seem fraudulent. The fraud check module 1455 in the example embodiment uses an inconsistent claims check module 1460, an inconsistent damage check module 1465 and a vehicle ID check module 1470.

The inconsistent claims check module 1460 checks for whether the order sheet 1325 or the body shop estimate 1330 list repair work that has not been predicted from the input data in the generated independent estimate of the repair work needed for the damaged vehicle. For example, a claim might be inconsistent if the reported point of impact is at the front of a vehicle then small paint scratches to the rear of the vehicle are unlikely to have been caused by the impact and are more likely to have already been present on the vehicle as damage prior to the impact.

The inconsistent damage check module 465 checks for whether the order sheet 325 or the body shop estimate 330 list repair work that is excessive compared to the repair work predicted to be necessary from the input data in the generated independent estimate of the repair work needed for the damaged vehicle. For example, damage might be inconsistent if a claim is made that a car had accidental damage occur overnight when it was parked but the assessed or reported damage has most or all of the characteristics of a vehicle that has been 1280 crashed by its driver.

The vehicle ID check module 1470 checks whether the VIN indicates the vehicle is the insured vehicle, that the vehicle is the correct make and model, and that the parts proposed to be used in the body shop estimate 1330 are consistent with the make and model of vehicle retrieved from looking up the VIN in a third party database.

In some embodiments, for example, the checks may be implemented to check against an independently generated repair estimate within higher and lower estimate thresholds for each of the modules 1430, 1435, 1440, 1445, 1450, 1455, 1460, 1465, 1470. In other embodiments, only some of the check modules 1430, 1435, 1440, 1445, 1450, 1455, 1460, 1465, 1470 are used to perform checks on the order sheet 1325 and body shop estimate 1330 against the independently generated repair estimate.

In the example embodiment, following the core assessment module 1355, the workflow triage module 1360 is then used to determine the output of the assessment engine layer 1365 or to determine what workflow is triggered as a result of the output of the assessment engine layer 1365.

The workflow triage module (or phase) 1460 in the example embodiment include assessment of usability of the output 1480, assessment of the value analysed 1485, determining a claim priority score 1490, and the application of any custom workflow rules 1495.

According to the example embodiment, the assessment of usability of the output 1480 is performed to assess whether the extent to which the output of the core assessment module (or phase) 1355 is of use. This assessment is performed using two modules: the value analysed assessment module 1485 and the claim priority score module 1490.

According to the example embodiment, the value analysed assessment module 1485 assesses what proportion of the body shop estimate 1330 have been checked against the independently generated repair estimate, as due to the use of photos to generate the independent repair estimate it is not possible to check all aspects of the repairs proposed to, for example, internal structural damage not captured or detectable from photos of the damaged vehicle.

According to the example embodiment, the claim priority score module 1490 assigns a priority to the claim based on the level of leakage determined 1430 and the level of fraud determined 1455. This can be determined using a predetermined scoring system or a relative scoring system versus other claims being processed substantially concurrently.

Further, according to the example embodiment, the is application of any custom workflow rules 1495 that have been preconfigured by the insurer in order for the system to work with their internal policies, procedures and systems.

In other embodiments, the output of the core assessment module 1355 is used to trigger certain workflows or actions. For example, should there be no determined incorrect, potentially fraudulent, or inconsistent portions of the input claim then the input claim is automatically approved. In other embodiments automatic approval is made if only a portion of the input claim under a predetermined threshold amount (for example 20%, or 10% or 1% depending on insurer preferences) that is determined to be incorrect, potentially fraudulent, or inconsistent. In some embodiments, if an incorrect VIN is detected in an input claim then a workflow can be triggered to avoid manual review of the claim and return the claim to enable the repair shop with a prompt to resubmit the claim with the correct VIN data. In other embodiments, where insufficient data is determined to have been supplied by the repair shop (e.g. no VIN, a lack of photos of the vehicle or of one or more portions of the vehicle) then a workflow can be triggered to again avoid manual (human) review and require the repair shop to submit the claim again with the determined missing data. These automatically triggered workflows or actions can improve efficiency in processing claims by avoiding the needed for 1330 manual (human) review.

In some embodiments, incorporating the described automated review process can improve process of assessing proposed repair work in a variety of ways including improved damage assessment, the automation of damage assessment, the more efficient and/or prompt authorisation of repair work, and faster and more efficient settlement assessment. Damage can be assessed more efficiently and accurately by triaging claims that need to be processed in different ways, based on for example the value of the claim that can be analysed by the system automatically and/or the priority of the claim. The use of automated assessment can accelerate finding leakage in claims while allowing the quick approve claims with no anomalies automatically. The automated review process of other embodiments can be used to assess and flag post-repair leakage by reviewing approved invoices and performing post repair audits. In some embodiments, the various assessments can be used for triaging claims to determine whether the best way to process a claim is to send an expert on-site if structural damage has been identified, partial processing to quickly identify leakage or fraud on a claim for insurer personnel to review and challenge, and automation to automate approval of low damage claims or high certainty claims based on insurer predetermined statistical or absolute thresholds set for damage or leakage for example.

Figure 15:
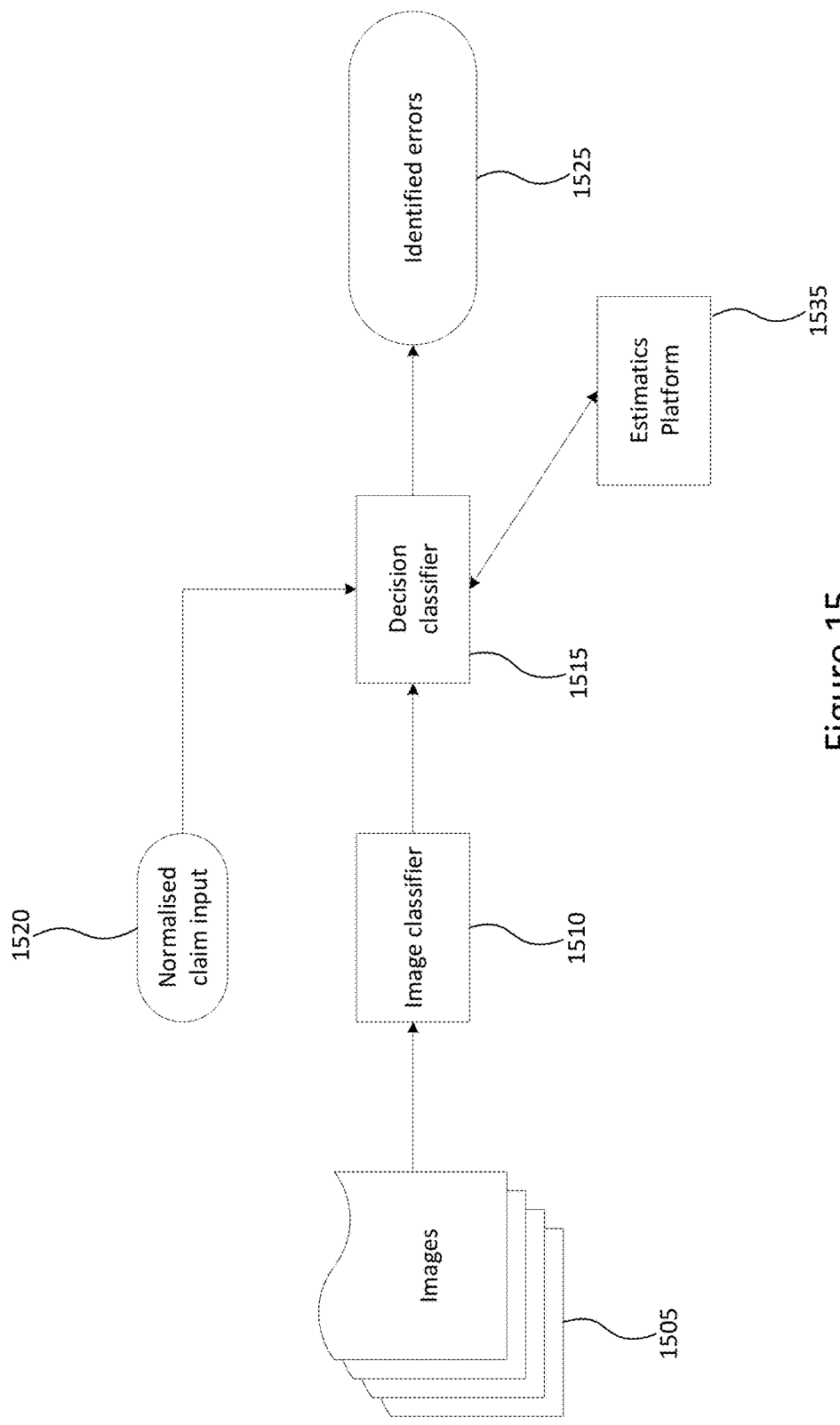
FIG. 15 shows an overview of a comparison analysis process that can be used in an embodiment.

FIG. 15 shows a comparison analysis process 1500 as implemented in one example embodiment where the process is used to perform the checking of the images of the damage to the vehicle and the repair estimate submitted by the repair shop using a model trained on historical data.

Specifically, FIG. 15 shows a flowchart depicting a method 1500 for assessing proposed vehicle repair estimate data against historical data and predetermined approval criteria by processing image input 1505 of the damage to the vehicle to be repaired using an image classifier 1510. In this embodiment, the vehicle repair estimate data is analysed using a (decision) classifier 1515, which has been trained using historical vehicle repair data and works in conjunction with an estimates platform 1535 by determining the damage to the vehicle and uses the estimates platform to determine repair data for the determined damage in order to verify the input vehicle estimate data 1520, to output any identified errors or anomalies 1525 in the input vehicle estimate data 1520. In some embodiments, the input vehicle estimate data 1520 along with any errors or anomalies 1525 can be displayed to a user in a user interface on a computer for review, for example in a loss adjuster application.

Figure 16:
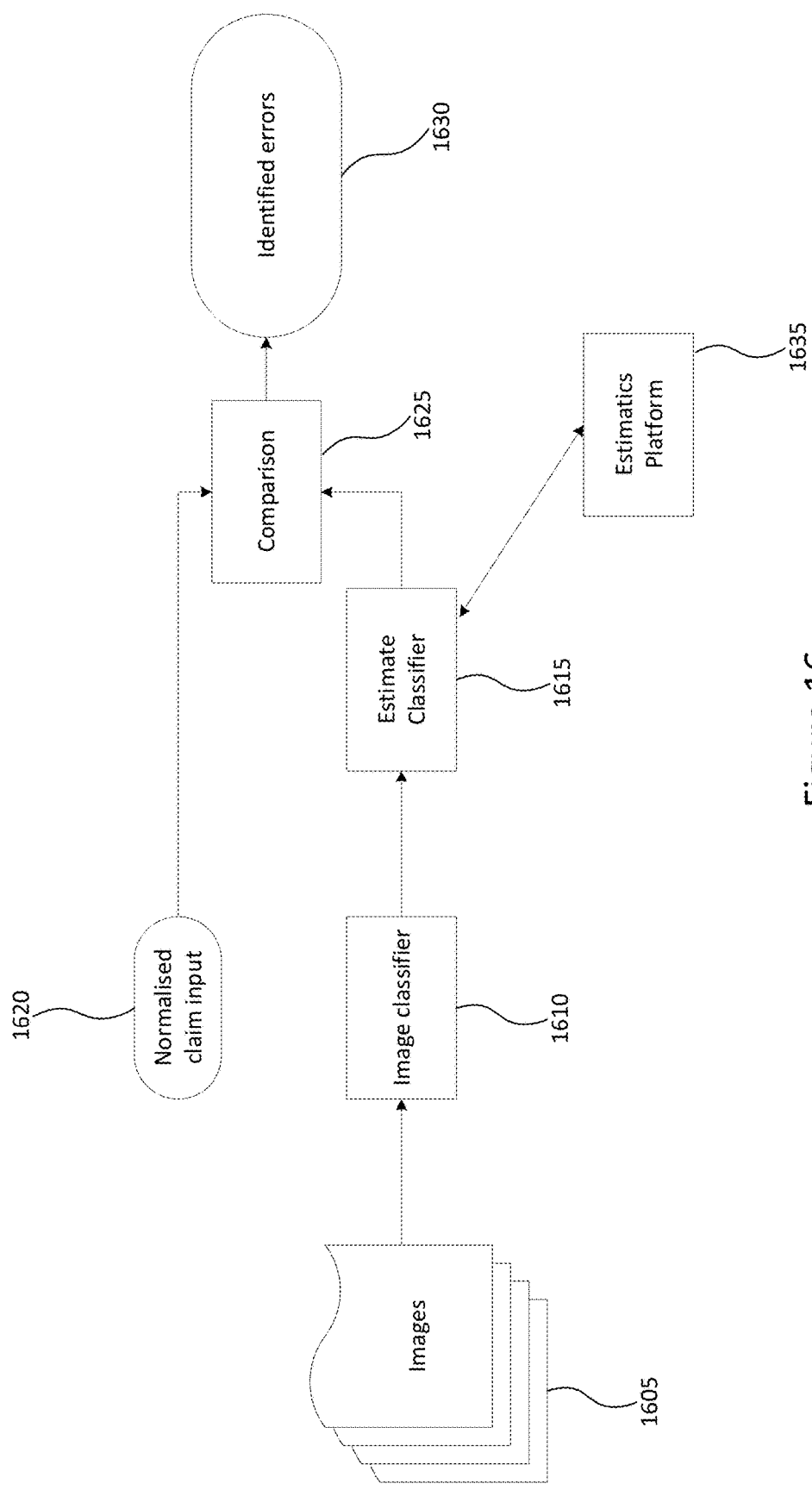
FIG. 16 shows an illustration of a comparison analysis process that can be used in an alternative embodiment.

FIG. 16 shows a comparison analysis process 1600 as implemented in another example embodiment where the process is used to perform the checking of the images of the damage of the vehicle against historical data by generating an independent repair estimate 1615 and comparing this to the submitted repair estimate 1620 from the repair shop.

Specifically, FIG. 16 shows a flowchart depicting a method 1600 for assessing proposed vehicle repair estimate data 1620 against historical data and predetermined approval criteria by processing images of the damage to the vehicle 1605 using an image classifier 1510. In this example embodiment, an independent repair estimate is generated by the (estimate) classifier 1615 in conjunction with lookups made to an estimates platform 1635, where the image and classifiers 1610, 1615 have been trained using historical vehicle repair data and work in conjunction with an estimates platform 1635, to output an independent repair estimate. The independent repair estimate and the repair estimate 1620 provided by the repair shop are compared 1625 to identify errors or anomalies 1630 in the input vehicle estimate data 1620. In some embodiments, the independent repair estimate and input vehicle estimate data 1620 along with any errors or anomalies 1630 can be displayed side-by-side to a user in a user interface on a computer for review, for example in a loss adjuster application.

Figure 17:
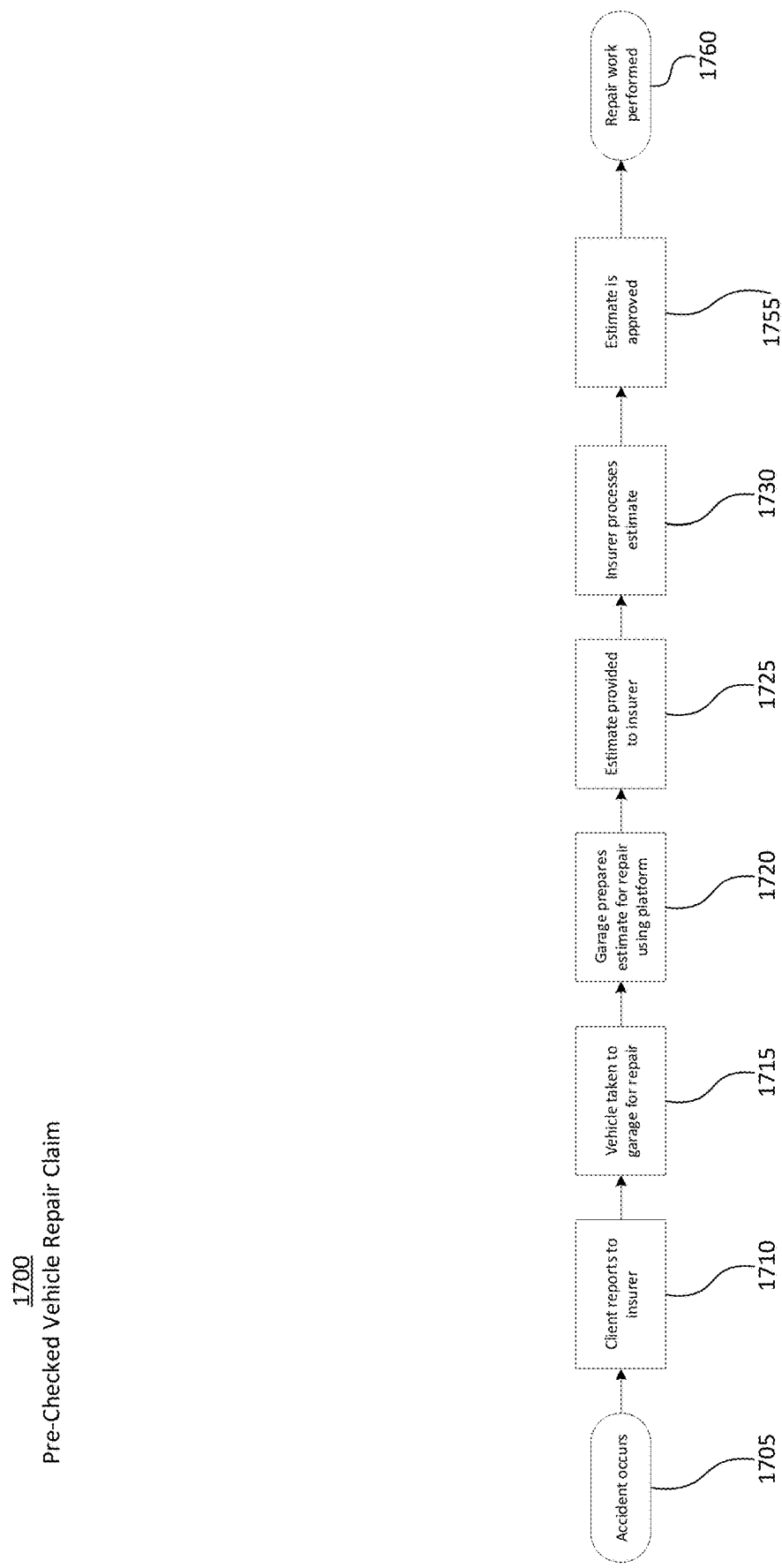
FIG. 17 show how a pre-checked vehicle repair claim can be prepared and approved according to an embodiment.

Example embodiments, such as the example embodiment process 1700 shown in FIG. 17, can be used by body shops to enable them to check their proposed repair estimate and, if any irregular operations are identified, change their proposed repair estimate to remove any irregular operations or improve the supporting evidence for necessary operations flagged as irregular before the repair estimate is sent to the insurer, in order to comply with the requirements of automated assessment of their repair estimate by the insurer using the automated assessment platform.

By previewing the claim estimate, and the associated automated assessment of the claim estimate, the body shop can be made aware of potentially incorrect decisions used to generate their repair estimate or whether they will be required to submit more information (such as photographs to support their proposed repairs, for example). In some embodiments, the system/platform can be used to produce an estimate automatically for the body shop by analysing photographic images of the damaged vehicle obtained by the body shop and obtaining repair data using estimates providers.

In the embodiment shown in FIG. 17, a process for pre-checking a repair estimate 1700 is shown and will now be described. When an accident occurs 1705, the client reports the accident and details of the accident and the damage to the insurer 1710. The client takes their damaged vehicle to a garage for repair 1715. The garage surveys the damage and takes photographs of the damaged vehicle, and inputs these photographs and some details of the vehicle and damage/accident into the estimate platform 1720. The estimate platform used a model trained on car damage data to prepare a determination of the damage to the vehicle and the severity of this damage, including for example whether to replace or repair parts that have been damaged. This determination is submitted to an estimates platform to determine for example the parts list required and the labour hours and costs in order to prepare the repair estimate. The repair estimate is then provided to the insurer 1725. Since the platform has already prepared the repair estimate using the verified process for assessing the damage to the vehicle, the repair estimate can either be pre-approved or can be verified by the insurer 1405 software in the way used for manually prepared repair estimates. Once approved, the garage can begin work.

Optionally, should the estimate have been prepared incorrectly, or a warning message is overridden or ignored by the user and so a claim is submitted that isn't pre-approved, it is possible for the insurer to process the estimate 1730 and reject it, returning the process to the step of the garage preparing an estimate 1720 for resubmission 1725.

Figure 18:
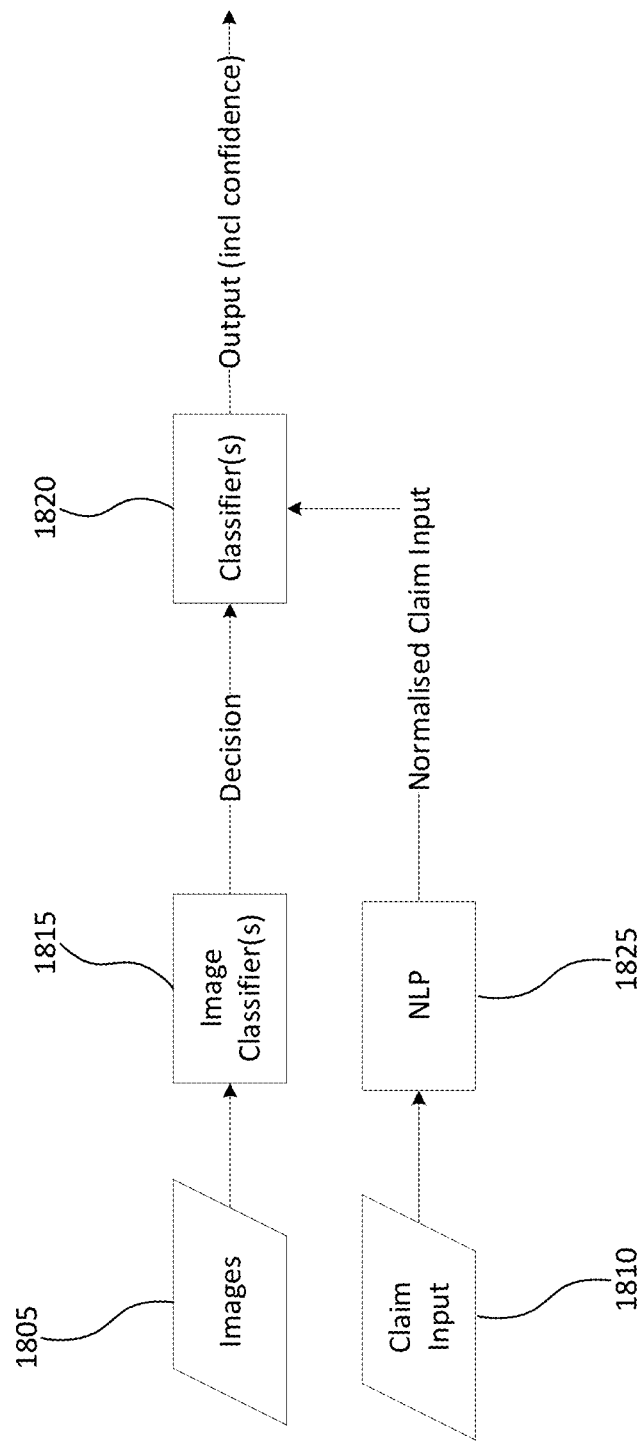
FIG. 18 shows an illustration of a generalised method of verifying a claim input according to an example embodiment.
Figure 19:
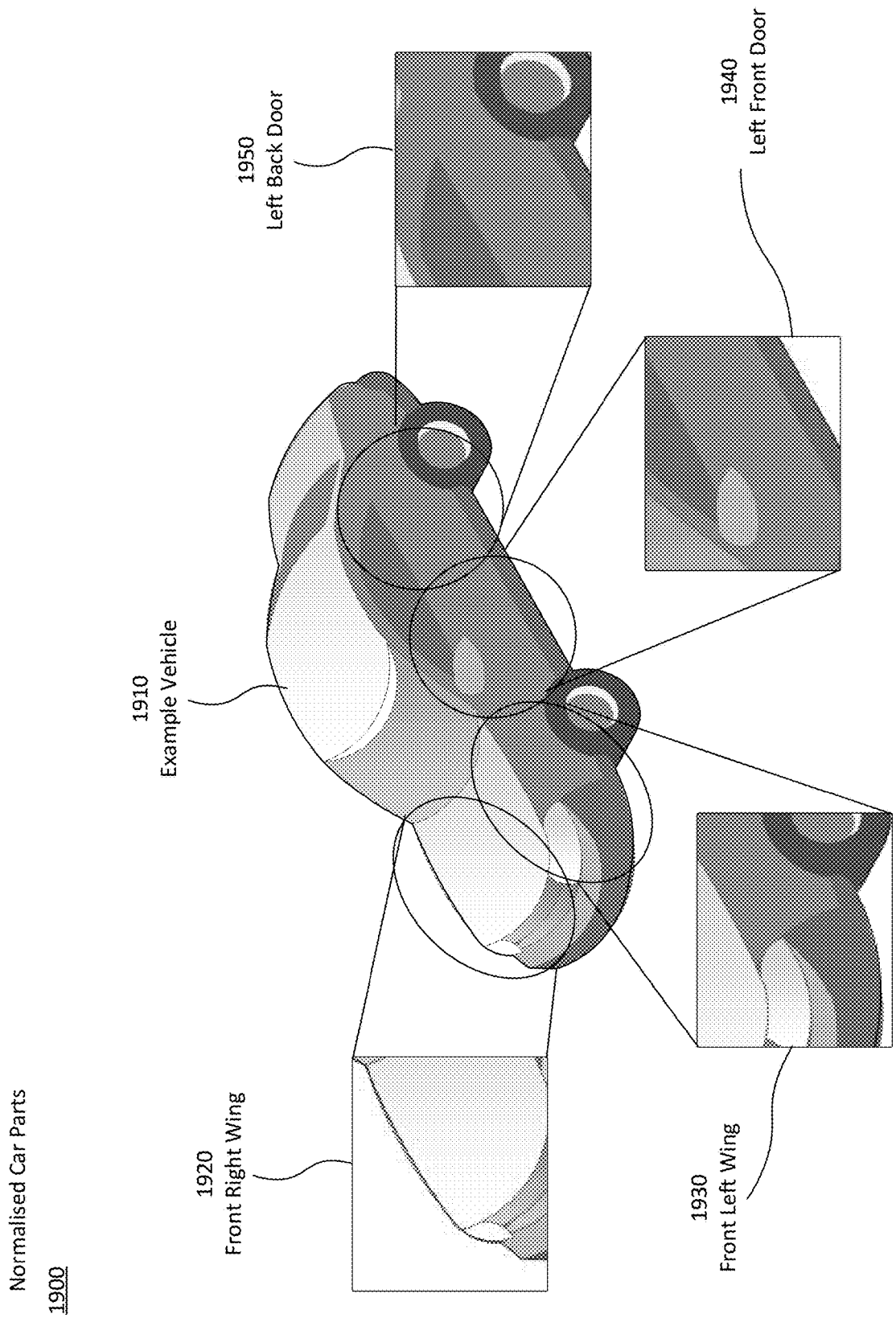
FIG. 19 shows an illustration of an embodiment of an approach to normalise parts of vehicles to assist with the verification process of the embodiments described herein.
Figure 20:
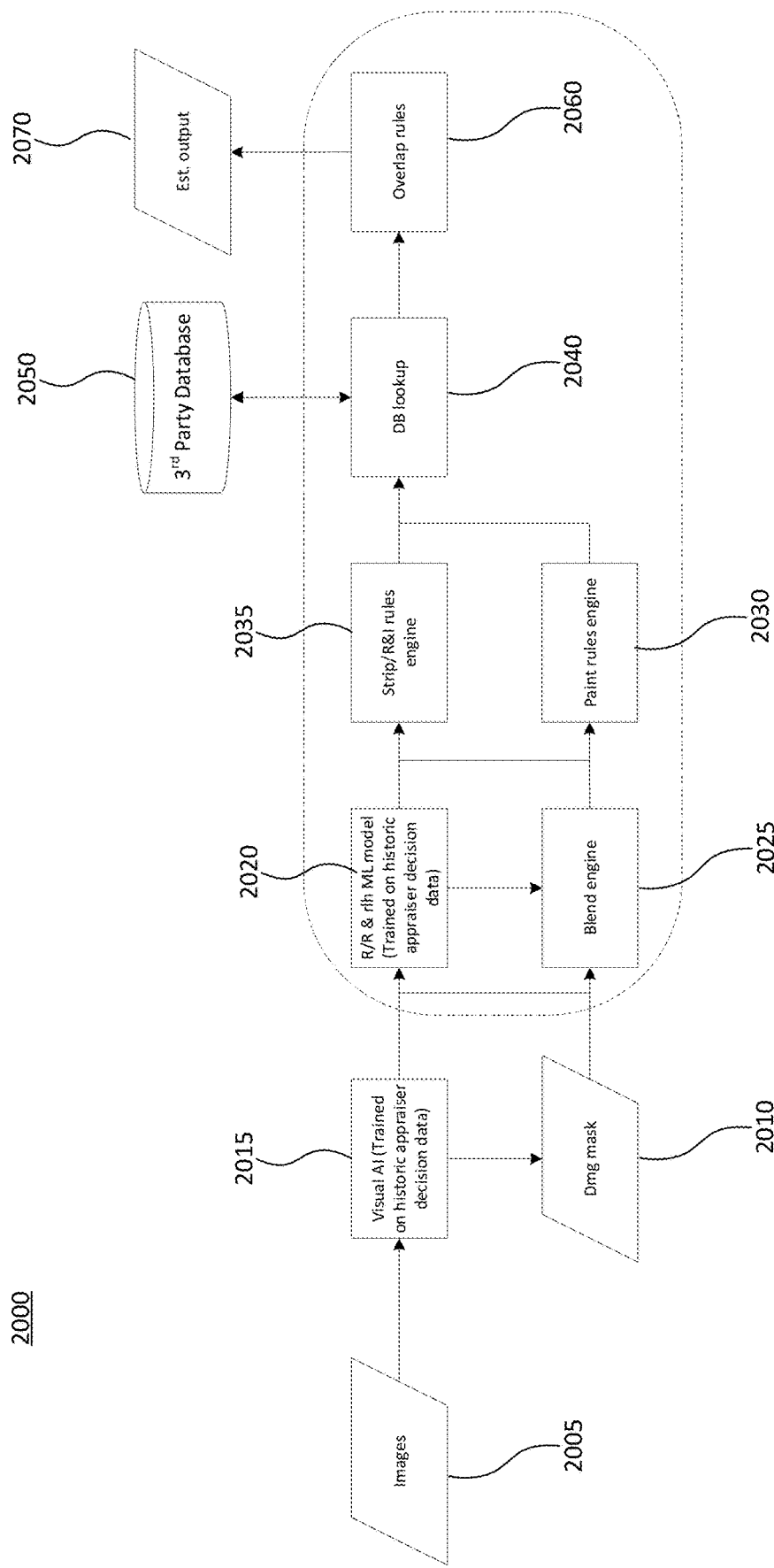
FIG. 20 shows a more detailed process of preparing an estimated repair schedule and/or repair cost according to another example embodiment.

Referring now to FIGS. 18 to 20, several embodiments illustrating one or more further aspects will now be described.

Referring first to FIG. 18, a generalised embodiment 1800 will now be described in more detail to provide an overview of the approach taken by the methods of various aspect/embodiments.

Images 1805 are captured of a damaged vehicle, typically these are a plurality of images of the vehicle from a variety of viewpoints of the vehicle and typically these show the damage to the vehicle both close-up and also in context with undamaged portions of the 1420 vehicle. These images are typically captured as part of the process of making an insurance claim, but may also be captured by an occupant or owner of the vehicle shortly after the damage occurs or by a vehicle repair business as part of documenting their damage assessment.

The images 1805 are provided to a plurality of image classifiers 1815, each classifier 1815 outputting a decision on whether each of the images 1805 is classified as containing any damage to a specific normalised portion of the vehicle (e.g. the front wing; the front left door; the rear bumper; etc). In other embodiments, a single classifier 1815 may be used to determine damage classifications to more than one portion of the vehicle or the entire vehicle.

The output of the image classifiers 1815 can be used a set of decisions (or in some embodiments classifications, optionally with confidence values), each being a decision per portion of the vehicle, as to whether there is damage to that portion of the vehicle. In some embodiments, a level of damage is also indicated in the decision that is output from the image classifiers 1815 (e.g. minor or major; or damage categories such as retouch, repair or replace). In some embodiments, one or more locations of damage are indicated in the decision that is output from the image classifiers 1815. In some embodiments, other features are also output from the image classifiers 1815.

In addition to the images 1805, a claim input 1810 is provided in the form of an electronically generated detailed list of parts and labour operations to perform a repair to the damaged vehicle. The claim input 1810 is previously generated using a third party database, provided with inputs by vehicle repair personnel based on their assessment of the damage to the vehicle, which generates an output list of parts for the specific model of vehicle and repair operations required to repair or replace each of the damaged components of the vehicle for the vehicle repair personnel.

The claim input 1810 is provided to a NLP (natural language processing) model 1825 which reads the human readable text in the claim model 1810 and converts the claim input 1810 into normalised data for each portion of the vehicle (for example, converting a portion of the claim input comprising a detailed list of ten parts and corresponding list of manual operations and associated labour times into normalised data such as "replace front left wing, three hours total labour time, requires X parts" where X could be a financial value, a list of specific parts or a number of parts). In some embodiments, any associated photos from the claim input 1810 are included in the normalised claim input generated by the NLP model 1825. In embodiments, the NLP model 1825 comprises a plurality of NLP models.

Natural Language Processing (NLP) is a field of machine learning where a computer is able to understand, analyse, manipulate and generate human language. The NLP model 1825 uses techniques from this field to understand the human readable text in the claim model 1810 and convert this into a standardised set of information that is used to train and at runtime with the machine learned models of the embodiment. Building a mapping and parsing system using NLP can allow the method of this and other embodiments to correctly ingest estimates from third party estimates systems, being known or new estimates systems, with zero training data, even in new markets/jurisdictions. In some embodiments, a character-level language model is used to predict based on a part description which can then be mapped to a normalised portion of the vehicle (or normalised part), for example a front bumper. In embodiments, the language model is trained on historical unlabelled estimate data and/or across different languages—this can make the learning process more efficient and/or increase 1465 performance at inference and/or allow the model(s) to work better when applied to new geographies/markets/jurisdictions.

The decision(s)/classification(s) from the image classifiers 1815 and the normalised claim input from the NLP model(s) 1825 are provided to a classifier 1820. The classifier is a trained model or models that assesses the output from the NLP model(s) 1825, which represents the repair estimate generated by the vehicle repair personnel, to the output from the image classifier(s) 1815, which represents an independently generated damage estimate (and in some embodiments the method can use one or more third party databases to generate a detailed list of parts and labour operations based on the independent generated damage estimate output from the image classifier(s) 1815), in order to classify whether the claim input 1810 (in whole or in part) is correct.

The output of the classifier(s) 1820 can be used to verify a repair estimate generated by the vehicle repair personnel, for example by the vehicle repair personnel before it is submitted for approval by a customer or an insurer (to ensure it is correct) or by an insurer (to ensure it is correct to approve or reject a claim for the correct repair work from an insured customer, for example as part of an insurance claim approval process).

To provide more detail on the concept of normalised car parts 1900, as used in above described example embodiment, the following detail is provided with reference to FIG. 19.

In FIG. 19, there is shown a generic model of an example vehicle 1910. The example vehicle 1910 shows a selection of normalised parts/regions 1900 that are common to most if not all vehicles, which common normalised parts 1900 can be used to describe in generic terms the typical parts found of most vehicles that might need to be considered by the method for assessing or verifying estimates for repair work.

For example, the example vehicle 1910 has shown a front right wing 1920, a front left wing 1930, a left front door 1940 and a left back door 1950. Other possible normalised vehicle parts 1900 might include (non-exhaustively): bumpers, wings, wheel arches, roofs, windows, wheels, lights, grills, vents, radiators, mirrors, windscreens, and convertible roofs.

Using this normalised part schema allows the conversion of detailed repair estimates provided by vehicle repair personnel into normalised repair inputs, for example to covert a detailed part list and detailed labour times and operations into a normalised indication, for each normalised portion of the vehicle, of what damage is to the vehicle of interest and a summary of the parts and labour required to repair each normalised portion of the vehicle.

Similarity, using the normalised part schema, an analysis can be performed on the image data of the vehicle to assess which of the normalised parts of the vehicle exhibit damage in the photos of the vehicle and, in some embodiments, the extent (e.g. entire part/majority of part/minority of part) and/or severity (e.g. high/medium/low) and/or classification (e.g. replace/repair/paint) and/or location (e.g. position or positions on the vehicle) and/or other features of the damage to each normalised portion.

With reference now to FIG. 20, a more detailed example embodiment of the independent damage generation process 2000 will now be described more fully.

The input to the process are a plurality of images 2005, which comprises a set of images of the damaged vehicle from different viewpoints and including image data of the vehicle as a whole and image data pertaining to the damage to the vehicle.

The images 2005 are provided to a Visual AI model 2015, in this example embodiment a machine learned model trained on historic appraiser decision data which includes image data of the damaged vehicles and the corresponding appraiser decisions for the damage on these damaged vehicles. Other machine learned and artificial intelligence approaches can be employed in other embodiments to provide a Visual AI model 2015. The Visual AI model 2015 outputs a damage mask 2010 and a damage classification for each normalised portion of the damaged vehicle.

In some embodiments, using the normalised part schema/arrangement, and determining the extent, severity, location and type of damage can allow for the use of models or look-up tables (e.g. using third party databases or by generating look-up tables) to determine a more detailed level of granularity in output determinations (e.g. specifying the exact part number for a damage bumper for the make, model and year of vehicle being considered and how long it will take to replace the part). Thus the benefit of a normalised part schema can be that it allows a generalised visual assessment across many types of vehicles and/or geographies (allowing the visual modelling to be performed more easily and/or robustly) without losing the ability to determine a detailed output (e.g. specific parts and/or operations and/or labour time requirement).

The damage mask 2010 comprises a damage classification for all normalised parts of the damaged vehicle.

The damage classification for each normalised portion of the damaged vehicle is output from the Visual AI model to the repair model 2020.

The repair model 2020 comprises a set of models including a set of repair/replace models and a repair labour hours model, all of which are machine learned models trained on historic appraiser decision data which includes image data of the damaged vehicles and the corresponding appraiser decisions for the damage to these damaged vehicles. Other machine learned and artificial intelligence approaches can be employed in other embodiments to provide a repair model 2020 and/or repair/replace models and/or one or more repair labour hours models. The output of the repair model 2020 is a classification, for each of the normalised parts of the vehicle, of whether the normalised portion of the vehicle requires repairing or replacing and the labour operation category (e.g. minimal/straightforward/complex or a rough estimate of time required).

A blend engine 2025 receives both the damage mask 2010 and the output of the repair model 2020. The blend engine 2025 then assesses whether any paint blending will be required for each of the normalised ports of the vehicle. Paint blending is the process of ensuring a smooth transition in paint colour between neighbouring parts of a vehicle, thus may be required (for either a repaired/replaced part and/or at one or more neighbouring undamaged parts) to ensure a contiguous finish to the paint colour if a pre-painted replacement part is used to replace a damaged part or if a damaged part is painted following repair or replacement.

The output of the blend engine 2025 is provided to the paint rules engine 2030 and the remove and install (R&I) rules engine 2035.

The paint rules engine 2035 comprises a set of rules used to assess the output of the blend engine and the damage mask 2010 to estimate the likely materials and labour required to paint the repaired vehicle. The set of rules in the example embodiment are hand crafted but in other embodiments a machine learned approach can be used.

The R&I rules engine 2035 determines which parts need to be removed from the vehicle so that the physical repair operations can be carried out and then re-fitted. In some embodiments, the output from the R&I rules engine 2035 is an aggregate amount of time that needs to be spent on removing these parts from the vehicle and re-fitting these parts once repairs have been made, per normalised part of the vehicle.

Based on the outputs of the Visual AI model 2015, the repair model 2020, the blend engine 2025, the paint rules engine 2030 and the R&I rules engine a database lookup 2040 is performed at a 3rd party databased 2050 to generate an electronically generated detailed list of parts and labour operations to perform a repair to the damaged vehicle, using the assessment generated of the damage to the vehicle and details about the vehicle (e.g. make, model, year, etc if any or all of this data is available).

The output of the damage assessment process 2000, once the detailed list has been prepared using the database lookup 2040, is reviewed by a set of overlap rules at an overlap rules engine 2060 to determine if any duplicate parts or labour operations are listed in the detailed list, which can then be removed from the detailed list by the overlap rules engine 360 and an output produced 2070.

The output 2070 can then be compared to an electronically generated detailed list of parts and labour operations to perform a repair to the damaged vehicle prepared by vehicle 1570 repair personnel.

By breaking up the process of generating a repair estimate into human decisions and software-assisted decisions, and building machine learned models to predict the human decisions, a completely automated approach to generating a repair estimate can be adopted.

In some embodiments, some of the models used can have a limited capacity to prevent overfitting to the training data, for example by applying a rule-based system or using a shallow, capacity constrained machine learning model/approach.

In some embodiments, one or more of the models are trained in a manner agnostic to the make, model and year of the vehicles being considered. This can allow the training of a universal set of one or more models, or even a universal approach, to generating classifications of damage/damage estimates for vehicles or a generalisable damage representation (from, for example, just image data of the damaged vehicle). In embodiments, some or all of the models comprise a final shallow layer which takes the generalisable damage representation and adds the make, model and year information for the vehicle being considered in order to make the final prediction/classification. In these embodiments using the final shallow layer to add the make, model and year information, the approach can require much less training data to train the model(s) that a full convolutional neural network.

In some embodiments, the model(s) are trained using data from multiple geographies, such that the first layers of the neural networks in the model(s) processes the input data in a universal way across all geographies in order to extract generalisable features for vehicles, then each geography is refined using only training data from that geography in order to learn the specific repair methodologies for each geography. In embodiments, the training dataset can be pseudo-labelled with geography specific labels so that the geography specific branches of the model can be treated as branches in a multi-task learning technique. In other embodiments, one or more models can be trained to re-weigh the loss function to account for the proportion of repair/replace decisions in each geography. In other embodiments, one or more models can additionally have a confusion loss layer present in substantially the middle of the network, which can be used to enforce that at that point in the network it doesn't differentiate between images coming from different geographies.

In some embodiments, the method normalises the point or impact (e.g. the front left of the vehicle) and/or the object involved in the collision (e.g. a tree, or another car) and includes a further step of checking that the damage prediction/classification is consistent with either or both of the point of impact and the object involved in the collision.

An alternative embodiment with now be described in more detail where no previous data has been acquired in respect of a new situation, for example where a new make, model and year of a vehicle is encountered.

In this embodiment, upon encountering a new make, model and year of a vehicle, the system reverts to using a "default" vehicle type (or, in other embodiments, the system may try to determine a generic car type such as a "sedan", "pick-up" or "van" and use pre-determined or pre-learned data for that vehicle type). The system uses either the "default" or the selected "generic" vehicle type at every subsequent step where otherwise a specific make, model and year is used (for example as input to a final layer of the visual models, or as an input to the blend engine and/or paint rules and/or R&I rules and as input when querying the third party database).

By training a generic model that uses normalised parts per vehicle, new models of vehicle can be analysed immediately (using the new make/model as an input) and the machine learned models can learn correlations with existing learned parameters for other make/models. In this embodiment, a default setting for the make and model of a vehicle is used, having been trained on training data lacking make, model or year information, allowing "zero-shot" prediction for the damage representation for a vehicle of unknown make, model and year (but with an expected lower accuracy than if at least some training had been performed specifically for the make, model and year).

Another embodiment will now be described in more detail where a trained approach in one jurisdiction is adapted to a different unseen jurisdiction.

In such an embodiment, the system is configured as in the previous embodiment described in relation to FIG. 20, but the design decisions made allow the method to be adapted to a new geography with little data. A relatively small amount of data is collected in respect of the different unseen jurisdiction (i.e. new data for the new jurisdiction). In particular, by finetuning just the last layers of the visual models (which requires a lot less data than training a new visual model, hence the small amount of data collected for the new jurisdiction), using this new data and by adjusting the blend, paint and R&I engines based on the new data (which also requires much less data than training machine learning models from scratch to perform these operations), the previously-described approach(es) can be adapted to a new domain (i.e. to the different unseen jurisdiction).

By using domain adaption, a model can be trained to work universally but then adapted to be used with different markets/jurisdictions/models. In some embodiments, a model is generated for one market (for example, the insurance repairs market in France) and then, using domain adaption, fine-tuned for use in another market (for example, the insurance repairs market in Japan). For example, the initial dataset used to train the models may have a very large amount of data compared to the following dataset (using the previous example, there might be one hundred times the data that can be used to train the model for France than for Japan). The differences between markets/jurisdictions/models may be any number of factors, for example in some jurisdictions it is typical to replace parts rather than repair them. This approach can also allow a high level of performance when adapting to local changes (e.g. a hailstorm or other natural disaster has caused widespread damage) by adjusting the prior distribution of labels. In some embodiments of this approach, live key metrics are tracked, including for example metrics such as the proportion of normalised parts that are repaired vs those which are replaced. When a drastic shift in distribution of tracked metrics occurs, it would indicate something significant has changed in how vehicles are getting damaged and/or are being repaired or proposed to be repaired (for example, a hail storm or natural disaster). Using thresholding, the approach embodied in the system can be adjusted accordingly (i.e. when the distribution has changed by over a predetermined amount) by tuning any one or more of the blend/paint/R&I engines or by fine-tuning the top layers of the visual classifiers in order to allow adaption to changes in repair methodologies quickly.

In some embodiments, an efficient categorial feature encoding is used for the make and model in order to further reduce the amount of training data needed.

Figure 21:
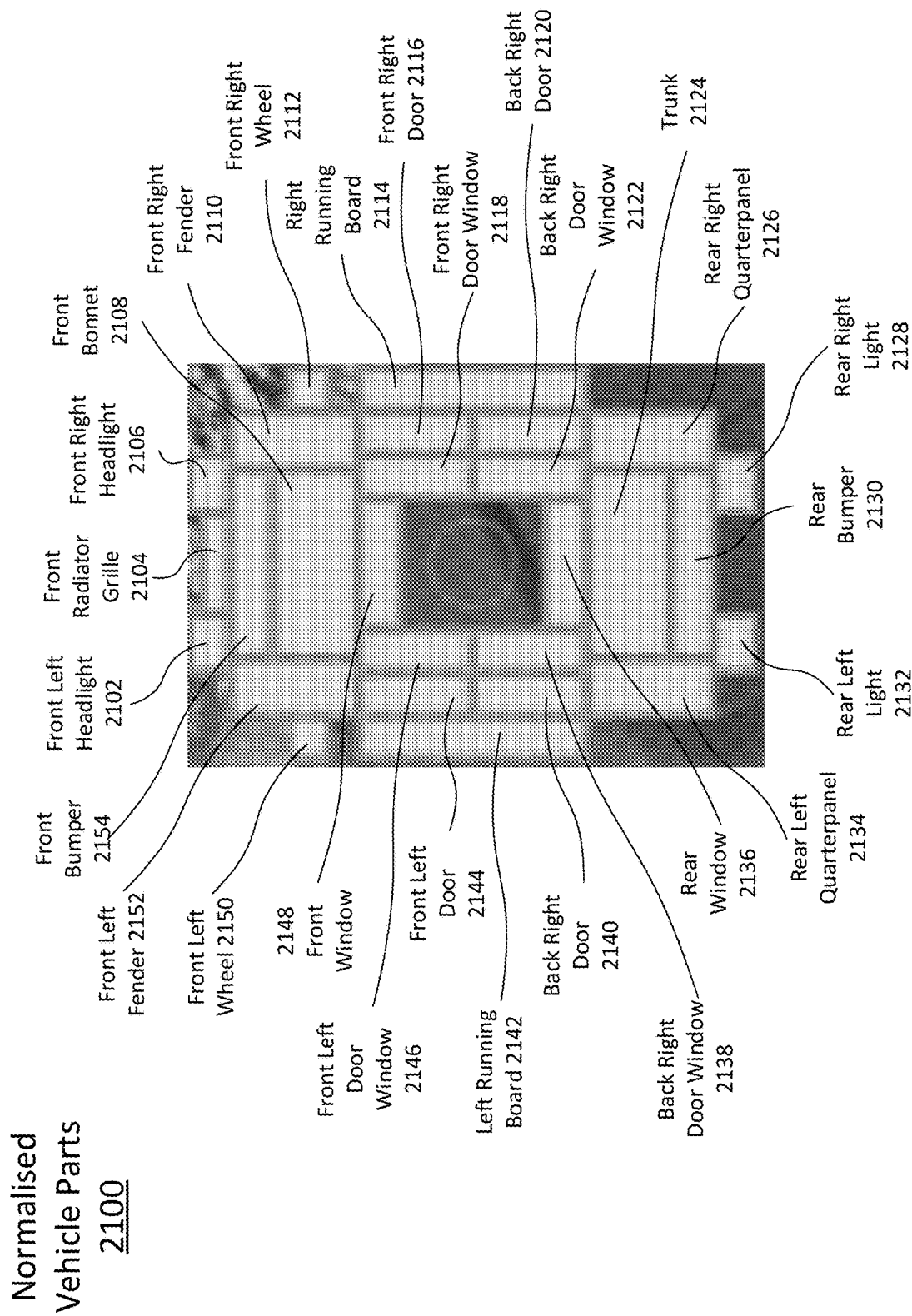
FIG. 21 shows an alternative representation of normalised parts for a vehicle according to an embodiment.

Referring now to FIG. 21, an alternative embodiment implementing a more detailed set of normalised vehicle parts 2100 (or normalised/standardised vehicle parts or regions) will now be described in more detail. This more detailed set of normalised vehicle parts 2100 can be used with any of the other described aspects and/or embodiments herein.

Shown in FIG. 21 is a generic vehicle diagram according to an embodiment, where the parts/regions of the vehicle are broken up into a plurality of normalised/standardised parts, zones or regions 2100. In FIG. 21, there are shown the following normalised/standardised parts: a front left headlight 2102; a front radiator grille 2104; a front right headlight 2106; a front bonnet 2108; a front right fender 2110; a front right wheel 2112; a right running board 2114; a front right door 2116; a front right door window 2118; a back right door 2120, a back right door window 2122; a trunk 2124; a rear right quarter panel 2126; a rear right light 2128; a rear bumper 2130; a rear left light 2132; a read left quarter panel 2134; a rear window 2136; a back right door window 2138; a back right door 2140; a left running board 2142; a front left door 2144; a front left door window 2146; a front window 2148; a front left wheel 2150; a front left fender 2152; and a front bumper 2154. In other embodiments only some of these normalised parts may be used and/or some other normalised parts may be exchanged for those used in the example embodiment.

Figure 22:
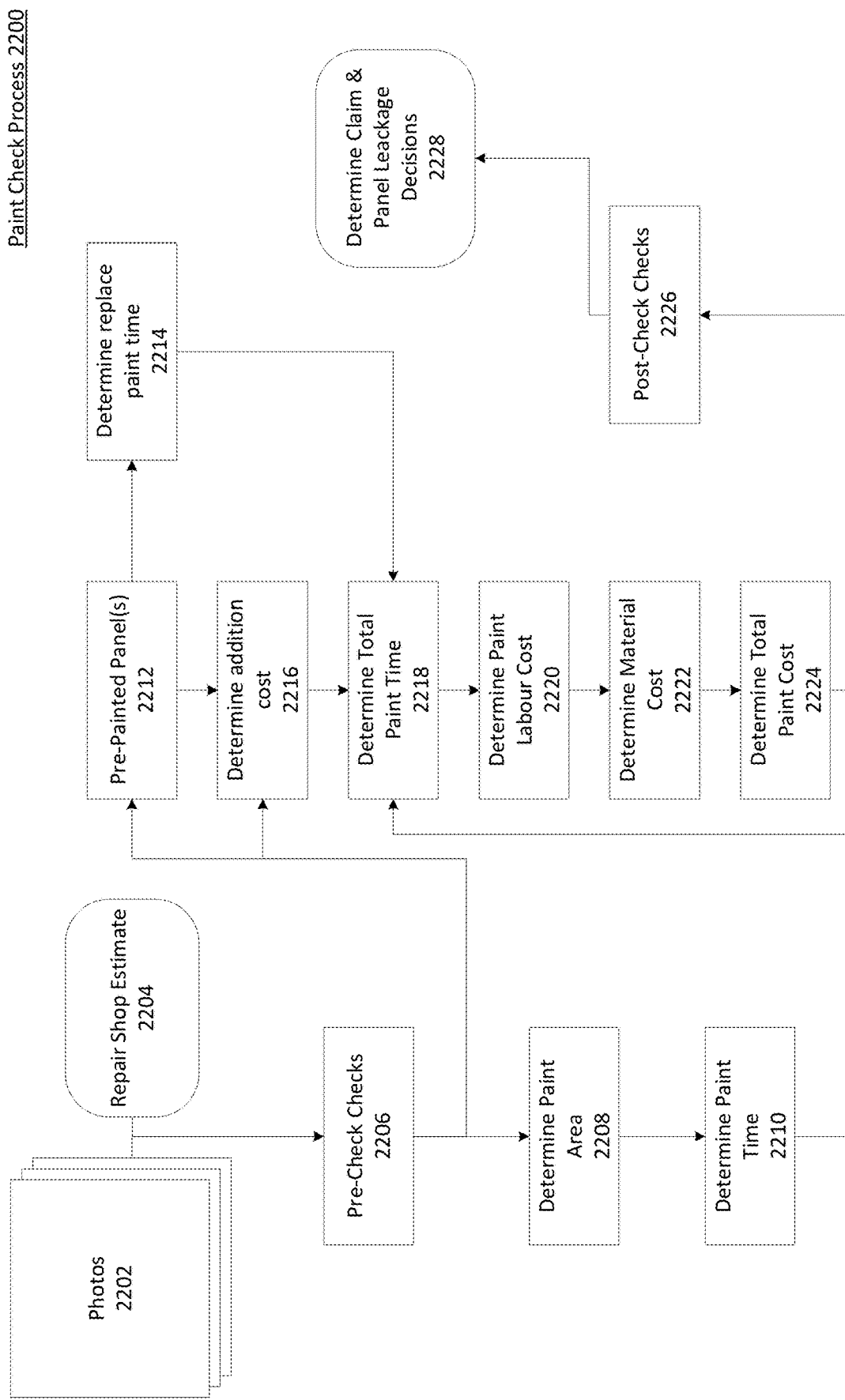
FIG. 22 shows a paint check process according to an embodiment.

Referring now to FIG. 22, a paint check process 2200 according to an example embodiment is shown and will now be described in more detail.

In this embodiment, the input data is a plurality of photos 2202 of the damaged vehicle and a repair shop estimate 2204 which includes details of the proposed repair operations and/or materials required to repair the damage to the damaged vehicle (typically along with the proposed cost for the proposed repair operations and/or materials).

Initially, some pre-check checks 2206 are performed. The pre-check checks 2206 include (a) determining whether the claim is eligible, i.e. determining whether the proposed repair operations and/or materials are covered by an insurance policy; (b) determining whether the proposed repair operations including proposed painting of an in-scope and/or out-of-scope panels of the damaged vehicle; and (c) to determine whether there are look-up tables for the specific make, model and year of the damaged vehicle in order for the system to be able to retrieve the relevant data required to determine the paint requirements for the damaged vehicle. In other embodiments, only some of these checks are performed and/or alternative or modified checks may be performed.

Following the pre-check checks 2206, the paint area is determined 2208. Specifically, the areas of the damaged vehicle that require painting are determined. To do this, per-part models are used to determine whether each of the parts of the vehicle require painting and to what extent—i.e. does only a spot on a panel need to be painted, or does a portion of the panel need to be painted, or does most/all of the panel need to be painted. This is described in more detail below in relation to FIG. 23 and the underlying models used in the process 2200 can be adapted to different jurisdictions by for example applying different training weights. Adapting models to new jurisdictions can be done in various ways. In one embodiment, it can be done by using domain adaption methods with data from the new jurisdiction. In another embodiment, it can be done by adjusting the weight of each class (e.g. spot vs minor vs major, as described elsewhere) based on the prevalence in that jurisdiction. In a further embodiment, it can be done by setting different thresholds on the output of the classifier to determine what level of damage corresponds to each class class (e.g. spot vs minor vs major, as described elsewhere).

Once the paint area has been determined, the paint time is determined 2210 —specifically an estimate for the time it will take to paint the determined paint area is generated. To do this, in this embodiment, a look up is performed (i.e. a query sent) to a third party database is performed for all of the parts/panels determined to require painting, including details of the extent to which each of the panels require painting, and the third party database returns a time value based on the query, typically the time value based on the specific make, model and year of vehicle.

In parallel with the paint area determination process 2208, a pre-painted panel check 2212 is performed. The pre-painted panel check 2212 determines whether the damage to the damaged vehicle will require any pre-painted panels to be used to repair the damaged vehicle, thus removing the need to paint one or more parts of the vehicle due to the parts used to repair the vehicle being pre-painted.

For the pre-painted panels determined to be required by the pre-painted panel check 2212, two further processes are performed: a determination of the replace paint time 2214; and a determination of the addition cost 2216.

The determination of the replace paint time process 2214 comprises determining the time required to perform the replacement of the damaged panel(s) with the pre-painted panel(s). To do this, in this embodiment, a look up is performed (i.e. one or more queries are sent) to a third party database for all of the parts/panels determined to require replacement with a pre-painted panel, and the third party database returns a time value based on the query, typically the time value based on the specific make, model and year of vehicle.

The determination of the addition cost process 2216 comprises determining the requires auxiliary task that need to be performed in order to replace any parts with pre-painted parts or prepare the damaged vehicle for painting the areas determined to require painting, including: determining the time required to apply masking tape to prevent paint coating areas of the car not to be painted; and to prepare the paint to be applied (e.g. to mix the paint).

A total paint time is then determined by combining the determined repair paint time from the paint time determination process 2210, the addition cost process 2216 and the determine replace paint time process 2214. In some embodiments, overlap between the times can be subtracted from the total time determined by the process 2218.

Following this, a paint labour cost is determined 2220, using the total time determined 2218 and a lookup performed using a third-party database to obtain appropriate labour rates for the time required to perform the painting operations.

Following this, a material cost is determined 2222. Specifically, the cost of the paint required for the paint areas 2208 is determined from by adding together the materials cost of the paint and the pre-painted panels required. The cost of the materials can be determined for the make, model and year of the damaged vehicle by performing a third party database lookup to retrieve the values required.

A total paint cost is then determined 2224 by combining the labour cost 2220 and the material cost 2224.

Then some post-check checks 2226 are performed, including in this embodiment: checking that unnecessary parts of the vehicle aren't being proposed to be painted (e.g. the door frame or the inside of a panel), and/or including items inconsistently (e.g. as materials but not labour proposed), in the proposed repair operations and/or materials.

Finally, one or more decisions as to whether the proposed repair shop estimate 2204 contains any unnecessary or anomalous proposed repair operations and/or materials is generated based on the pre-check checks 2206, the post-check checks 2226 and a comparison of the determined total paint cost 2224, the determined material cost 2222, and the paint labour cost 2220 to the proposed repair operations and/or materials in the repair shop estimate 2204.

As shown in FIG. 23, it should be noted that different jurisdictions/geographies have different thresholds, preferences, schema and rules that impact what is acceptable in proposed repair operations and/or materials used to repair damaged vehicle—an example of potential differences between jurisdictions 2320 is shown in table 2300 and will now be described in more detail below.

In table 2300, there are shown five generic example jurisdictions A, B, C, D and E. Each of the jurisdictions have different rules 2322, 2324, 2326, 2328, 2330 for what to do per assessment of paint requirements 2330. The "AI decision", i.e. the decision/classification of the per-part model assessing whether a part of a damaged vehicle requires repainting in this example embodiment can output four classifications: none; spot; minor and major. However, to adapt these classifications to the relevant jurisdictions, the jurisdiction specific rules 2300 need to be selected as appropriate. So for example, in jurisdiction A the rules 2322 specify that a spot paint job requires a fifth of the panel to be painted while a minor paint job requires half of the panel to be painted and a major paint job requires the whole panel to be painted. In contrast, in jurisdiction B the rules 2324 specify that a spot paint job requires just the spot of the panel to be painted while a minor paint job requires less than fifty percent of the panel to be painted and a major paint job requires more than fifty percent of panel to be painted. Further, in jurisdiction C the rules 2326 specify that a spot paint job requires just the spot of the panel to be painted while a minor paint job requires twenty percent or less of the panel to be painted and a major paint job requires more than twenty percent of the panel to be painted. In further contrast, in jurisdiction D the rules 2328 specify that a spot paint job requires just the spot of the panel to be painted while a minor paint job requires the panel to be painted at a cost fifty percent below fully repainting the panel and/or replacing the panel with a pre-painted panel and a major paint job requires the panel to be painted at a cost twenty percent below fully repainting the panel and/or replacing the panel with a pre-painted panel. Finally, in jurisdiction E the rules 2330 specify that a spot paint job requires thirty percent of the panel to be painted while a minor paint job requires sixty percent of the panel to be painted and a major paint job requires ninety percent of the panel to be painted.

Figure 24:
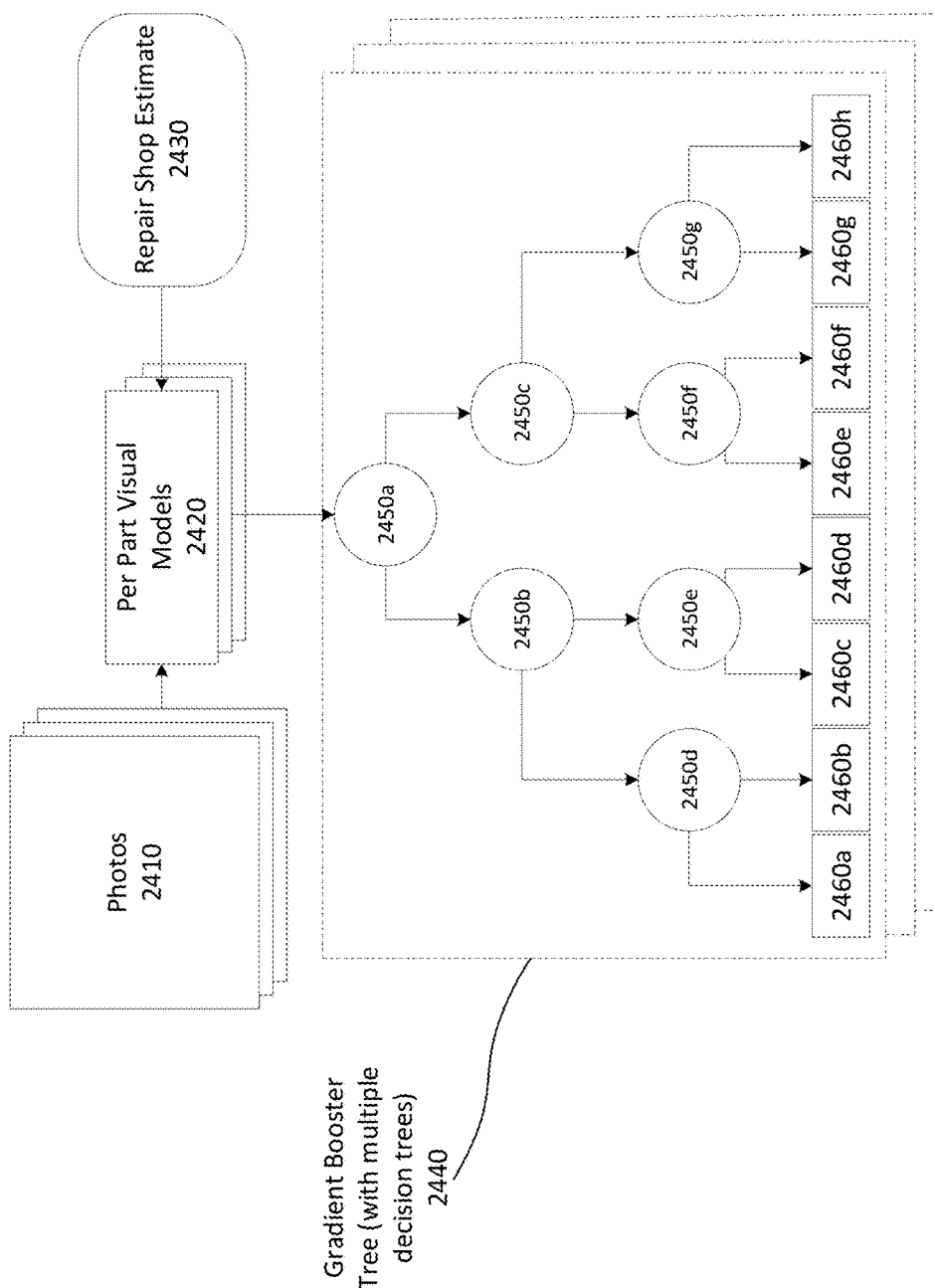
FIG. 24 shows a model architecture using a gradient booster tree with multiple decision trees according to an embodiment.

Referring now to FIG. 24, to implement the models in the above embodiments, in an example embodiment, a model architecture 2400 is used including the use of a plurality of gradient booster trees 2440 which will now be described in more detail below.

Specifically, the model architecture 2400 used is a two-layer architecture using both visual models 2420 and gradient booster trees 2440.

The input to the visual models 2420 are the photos of the damaged vehicle 2410 and the repair shop estimate 2430.

The visual models 2420 are trained on a per-part basis to determine, for each part of the damaged vehicle, whether and what degree of painting is required: none; spot; minor or major. These visual models are run on photos of all parts of the damaged vehicle (as shown in the photos/images). In addition, in this embodiment, visual models are also run to determine: (a) whether a replace or repair operation is required for each panel; (b) the amount of repair labour is required for each panel; (c) whether each part is damaged or undamaged. All of the scores from these visual models (painting; repair/replace; labour; damaged/undamaged) are input into the gradient booster trees 2440, across multiple parts, and the output is a prediction of a final score. The purpose of the gradient booster trees 2440 are to take information from the multiple visual models, and from more than one panel (e.g. just two up to all of the panels on the vehicle) and use this information to make a final paint determination in order to improve on just using a visual model 2420 to determine paint requirements per panel and combine the scores. The gradient booster tree 2440 comprises multiple decision trees having multiple nodes 2450*a, b, c, d, e, f,* g and multiple terminal nodes 2460*a, b, c, d, e, f,* g, h. Each individual decision tree can be quite a weak predictor by itself, but the boosting algorithm used can concentrate each one on a region of the prediction space such that, in aggregate, they form a strong predictor of the damage. In this embodiment, this is done by adding trees in an iterative fashion, using an algorithm such as AdaBoost, details of which are herein incorporated by reference.

Figure 25:
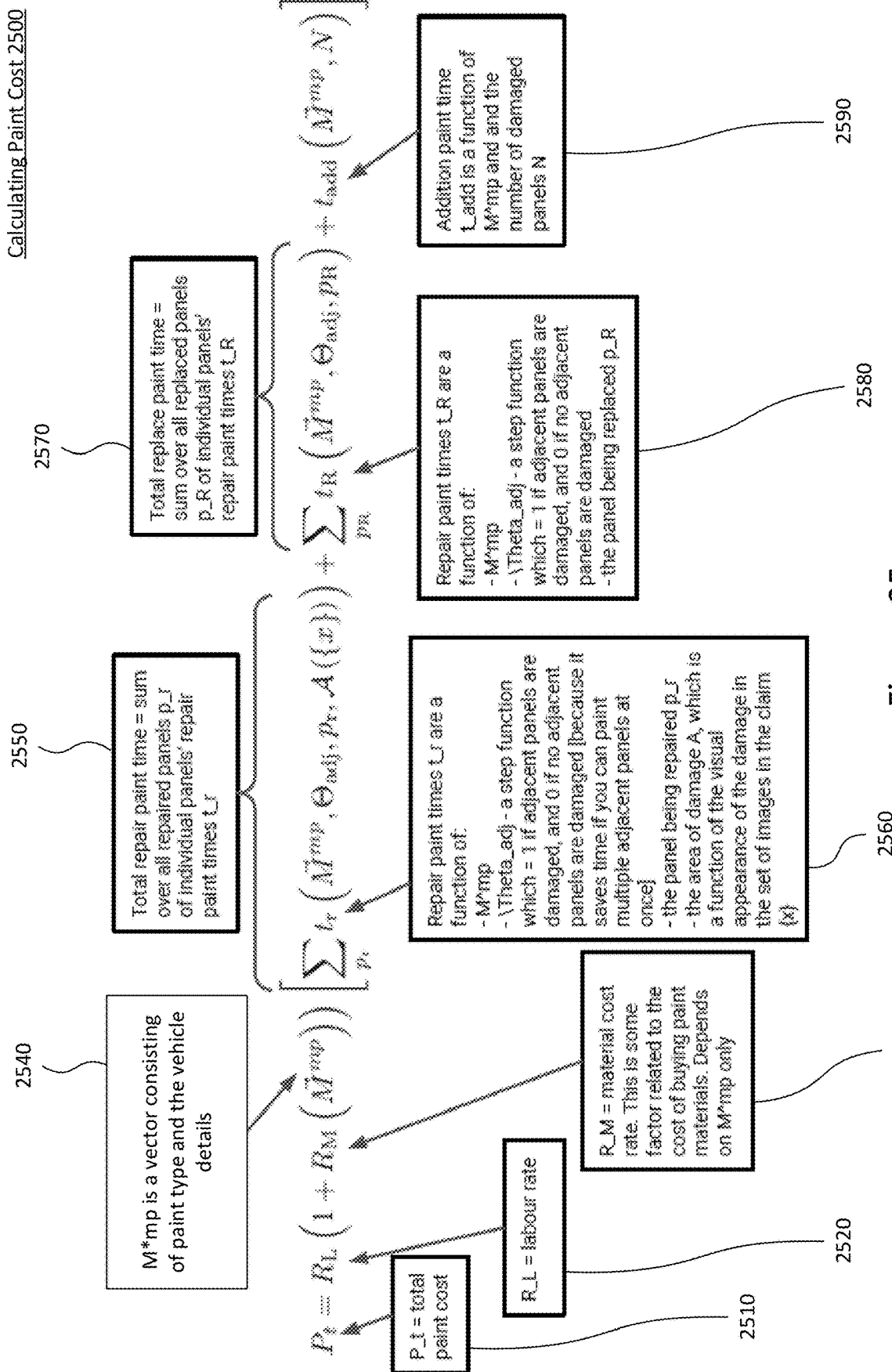
FIG. 25 shows an equation illustrating a method of calculating paint cost according to an embodiment.

Referring now to FIG. 25, an equation for calculating paint cost 2500 according to an embodiment is presented and will now be described in more detail below.

The total paint cost 2510 is shown to comprise the sum of multiple functions including the labour rate 2520, the material cost rate 2530, the paint type and vehicle details 2540, the repair paint times 2560, the total repair paint time 2550, the total replace paint time 2570, the repair paint times 2580 and the addition paint time 2590.

Figure 26:
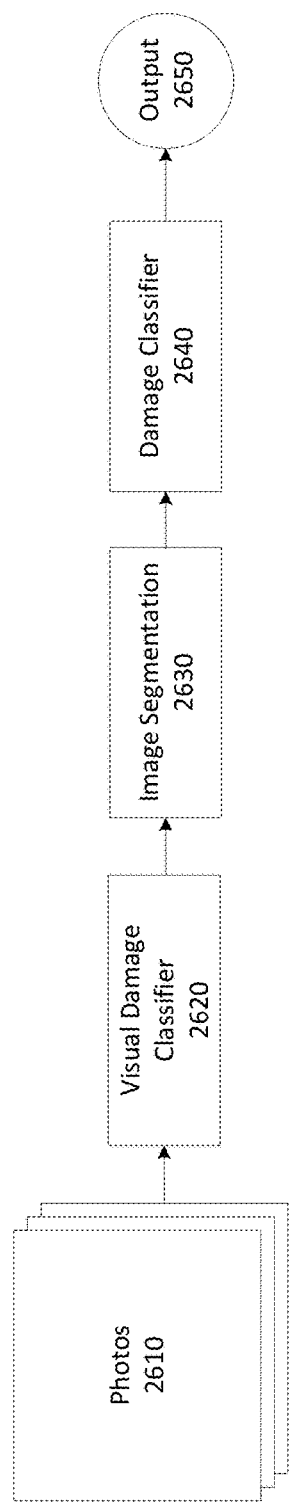
FIG. 26 shows an overview of a damage determination process according to an embodiment.

Referring now to FIG. 26, an overview of the damage determination process 2600 according to an embodiment will now be described in more detail below.

As an input to the damage determination process 2600, the photos of the damaged vehicle 2610 are provided. In this process, there is a need to determine if a normalised panel is undamaged or if there is some damage present. The photos 2610 are provided to a visual damage classifier which provides classification of the damage to each part of the vehicle for each of the photos using classifiers trained per part that classify each of the photos 2610. Following this, a process of image segmentation is performed 2630 to identify segments of interest, or to segment damage within the images. Both the output of the visual damage classifier 2620 and the segmentation 2630, along with the photos 2610, are then used to output a final damage score 2650 using the damage classifier 2650. This can allow the final damage classifier 2640 to use the segmentation mask 2630 with the photos 2610 to better focus on and/or assess the segmented damage shown in the photos. In some embodiments, the segmentation 2630 outputs a segmentation mask indicating where it is most likely damage will be determined to have occurred from the photos 2610. In some embodiments, the visual damage classifier 2620 may output with very low certainty where damage has been determined in the photos 2610.

Figure 27:
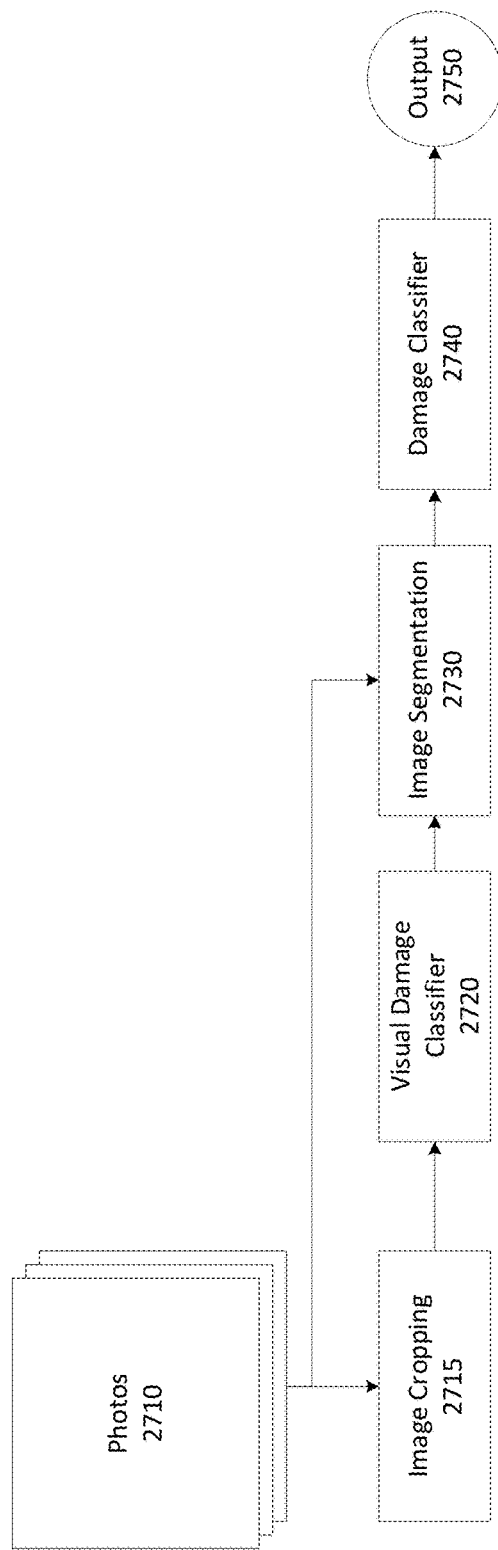
FIG. 27 shows the use of cropping to preserve image resolution in a damage determination process from images according to an embodiment.

Referring now to FIG. 27, an alternative embodiment of a damage determination process 2700 is shown and will now be described in more detail.

Specifically, this embodiment is concerned with damage such as cosmetic damage to a vehicle, which can be very hard to detect in images of the damaged vehicle, especially where for example the vehicle has a very light-coloured paint. Typically, if the images of the damaged vehicle are down-sampled during the inference process by the models, it is possible that such damage becomes difficult or impossible to determine. In the process 2700, the photos 2710 that are input are cropped 2715 in a random fashion to generate multiple cropped images for each image. In other embodiments, a part classifier can be used instead of performing random cropping in order to select particular portions of the vehicle that are likely to contain the part(s) of interest). The cropped images are then processed by the visual damage classifier 2720 to determine any damage on a per-part basis for each cropped image. The cropped images 2715 and the original images 2710 as well as the output of the visual damage classifier 2720 are provided to the image segmentation process 2730 as per the embodiment of FIG. 26 and the damage classifier 2740 outputs a final damage score 2750.

Figure 28:
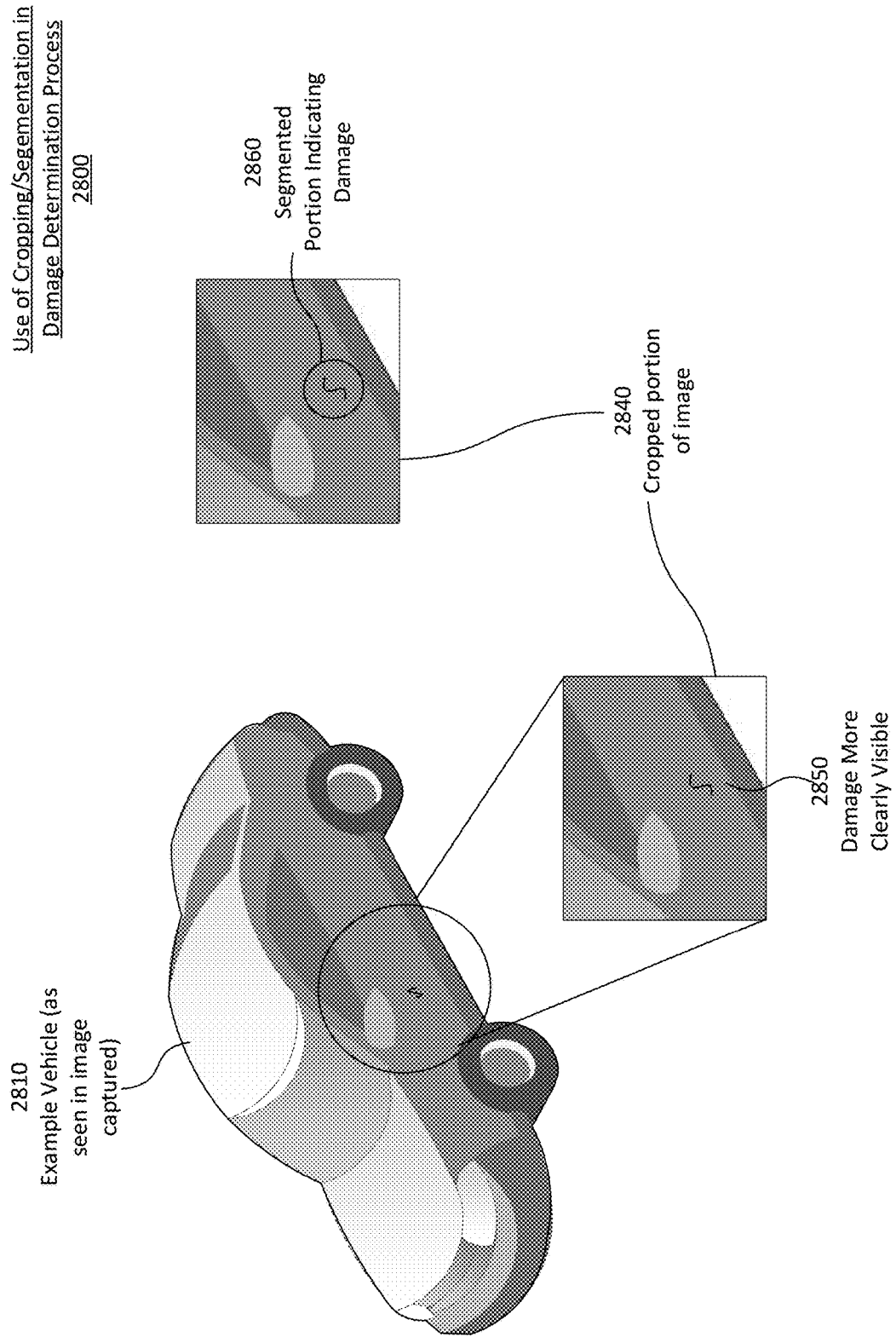
FIG. 28 shows the use of cropping and segmentation in a damage determination process according to an embodiment.

Referring now to FIG. 28, further details of the segmentation 2800 will now be shown and described in more detail.

The figure shows an example vehicle 2810 as might be shown in an image of a damaged vehicle, as well as a cropped portion of the image 2840 in which damage 2850 is more clearly visible and which can be segmented using a bounding box (or similar technique) 2860. Segmentation data can be collected, for example from human labellers creating training data, and a segmentation model trained on this data to perform segmentation of images (cropped or otherwise) to identify damage or regions of interest in the images.

In some situations, the images input will appear to show no damage in most of the images but only in the close-up images can the damage been seen. To output a substantially accurate score, the models need to be able to determine that the part is damaged in spite of the damage not being visible in most of the images of the part and in addition the model needs to be able to locate the damage visible in the close-up images to a location on the vehicle, which can sometimes be difficult as there is limited context to close-up images.

The segmentation performed on the image data can then be used by the damage classifiers to improve the ability to identify otherwise difficult to detect damage to vehicles, for example cosmetic damage that would otherwise only comprise of a very small portion of an uncropped image and which might only be visible in a close-up image. Thus, segmenting the area on the vehicle where the damage is located can assist the models to determine both that the damage is present and also where the damage is on the vehicle, as the damage might be identifiable in a close-up image of the vehicle but due to the close-up nature of the image the model may be unable to locate the damage on the vehicle.

Figure 29:
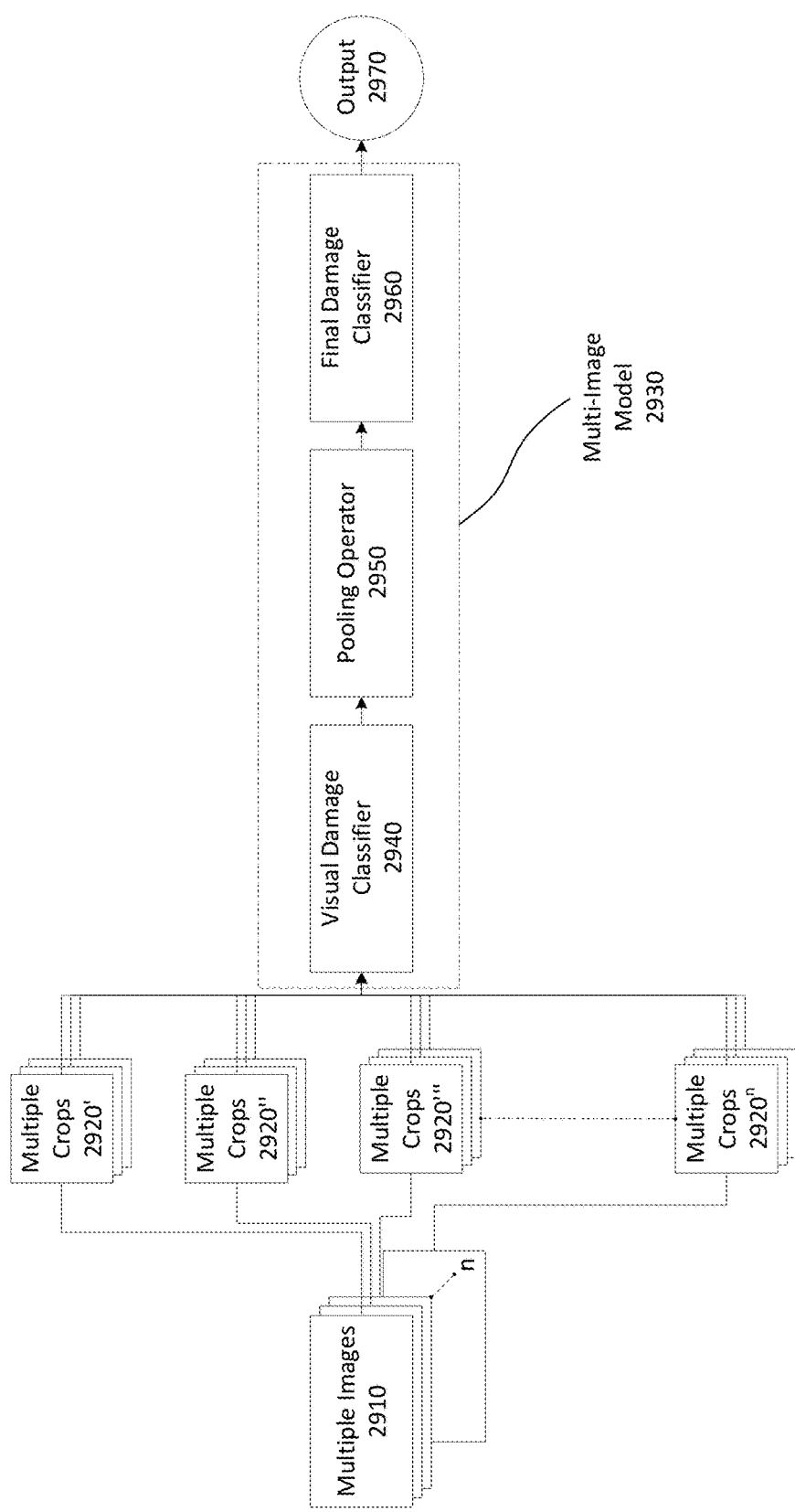
FIG. 29 shows an overview of a damage determination process using a multi-image learning model according to an embodiment.

Referring now to FIG. 29, an overview of the damage determination process 2900 according to an embodiment will now be described in more detail below.

Multiple images 2910 are input into the process 2900, each of which is cropped into multiple crops of each image 2920', 2920", 2920'", 2920". Each of the multiple crops of each image 2920', 2920", 2920'", 2920" are then processed by a multi-image model 2930. In this embodiment, the multi-image model 2930 comprises a visual damage classifier 2940, followed by a pooling operator 2950 then a final damage classifier 2960, which outputs a final damaged/undamaged score 2970 for each part.

By cropping the multiple images 2910, the image resolution of the images are preserved in the cropped images 2920′, 2920″, 2920‴, 2920″ so that the full detail of the 1875 original resolution of the images can be processed by the multi-image model 2930 without needing to down-sample the images 2910. In alternative embodiments, instead of cropping the images 2910, the model 2930 can be trained to work at the original resolution of the input images without down-sampling.

By training and using a multi-image model 2930, which only outputs a prediction score of whether each part is damaged or undamaged 2970 after looking at all of the images 2910, the model 2930 can substantially overcome the limitations in the input data only showing damage clearly in some images of the vehicle and not in others. The multi-image model 2930 achieves this by the visual damage classifier 2940 producing a feature representation for each of the images 2910 and/or multiple cropped images 2920′, 2920″, 2920‴, 2920″ and co-ordinate these representations using the pooling operator 2950 to concatenate the representations across all images and use a final damage classifier model 2960 to make final predictions. In alternative embodiments, the pooling operator 2950 can use a pooling operation, e.g. a mean, max operation, with the representations produced by the visual damage classifier 2940.

In alternative embodiments, the cropping is optional and the multi-image model 2930 can be used with the original images 2910.

Figure 30:
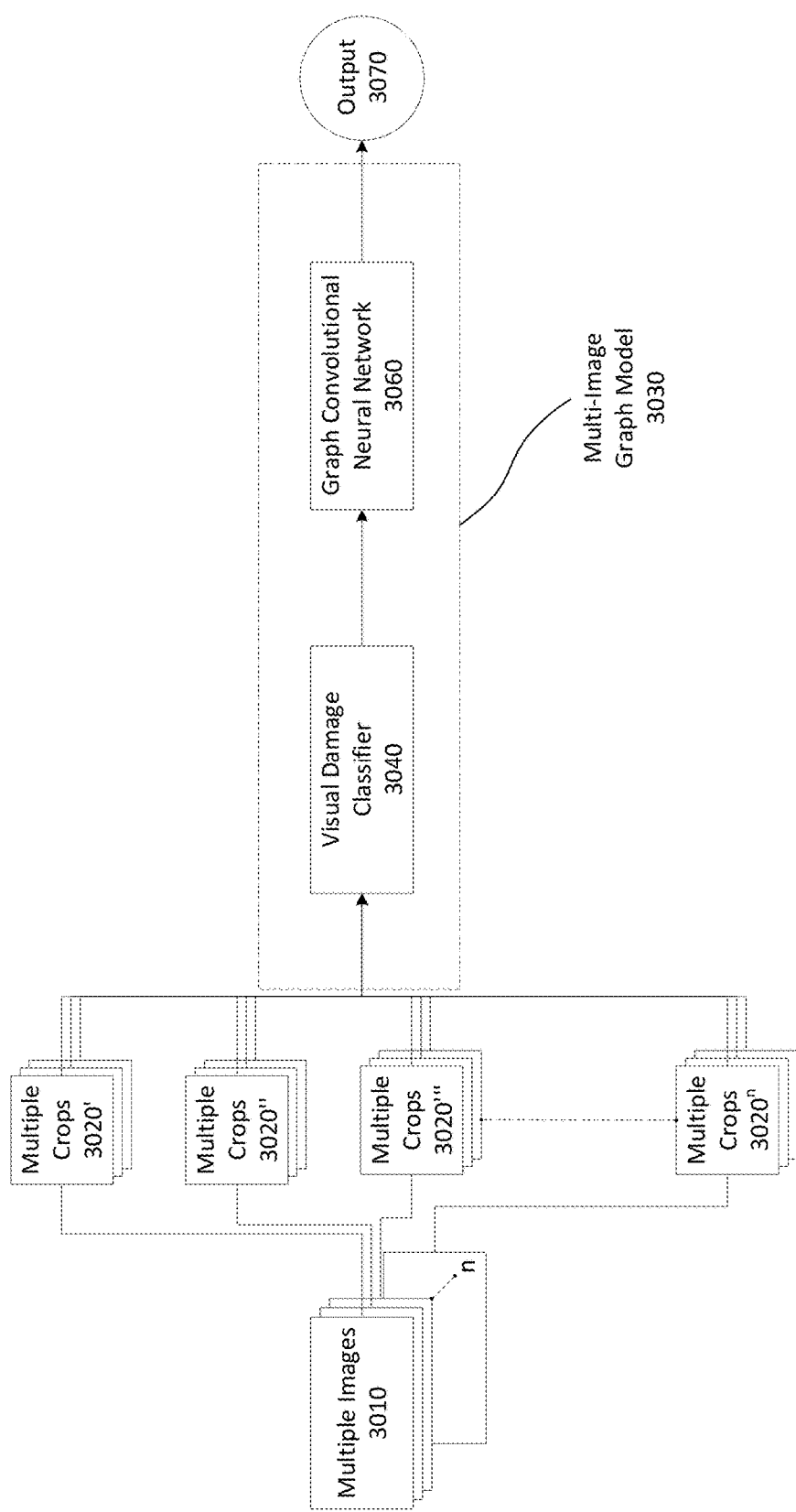
FIG. 30 show an overview of a damage determination process using a multi-image graph model according to an embodiment.

Referring now to FIG. 30, which show an alternative embodiment 3000 to that shown in FIG. 29, the alternative embodiment using a graph neural network, and this alternative embodiment will now be described in more detail.

Multiple images 3010 are input into the process 3000, each of which is cropped into multiple crops of each image 3020′, 3020″, 3020‴, 3020″. Each of the multiple crops of each image 3020′, 3020″, 3020‴, 3020″ are then processed by a multi-image graph model 3030. In this embodiment, the multi-image model 3030 comprises a visual damage classifier 3040, then a graph convolutional neural network 3060, which outputs a final damaged/undamaged score 3070 for each part.

As in the previous embodiment, in this embodiment by cropping the multiple images 3010, the image resolution of the images are preserved in the cropped images 3020′, 3020″, 3020‴, 3020″ so that the full detail of the original resolution of the images can be processed by the multi-image model 3030 without needing to down-sample the images 3010. In alternative embodiments, instead of cropping the images 3010, the model 3030 can be trained to work at the original resolution of the input images without down-sampling.

By training and using a multi-image graph model 3030, all of the images 3010 can be considered when making a prediction 3070, as the graph neural network 3060 treats each feature representation as a node in a graph. The model 3030 can thus also substantially overcome the limitations in the input data only showing damage clearly in some images of the vehicle and not in others, as the model can have arbitrary connections between nodes in the graph to represent this. The multi-image model 3030 achieves this by the visual damage classifier 3040 producing a feature representation for each of the images 3010 and/or multiple cropped images 3020′, 3020″, 3020‴, 3020″ and then using the graph neural network 3060 to make final predictions.

Figure 31:
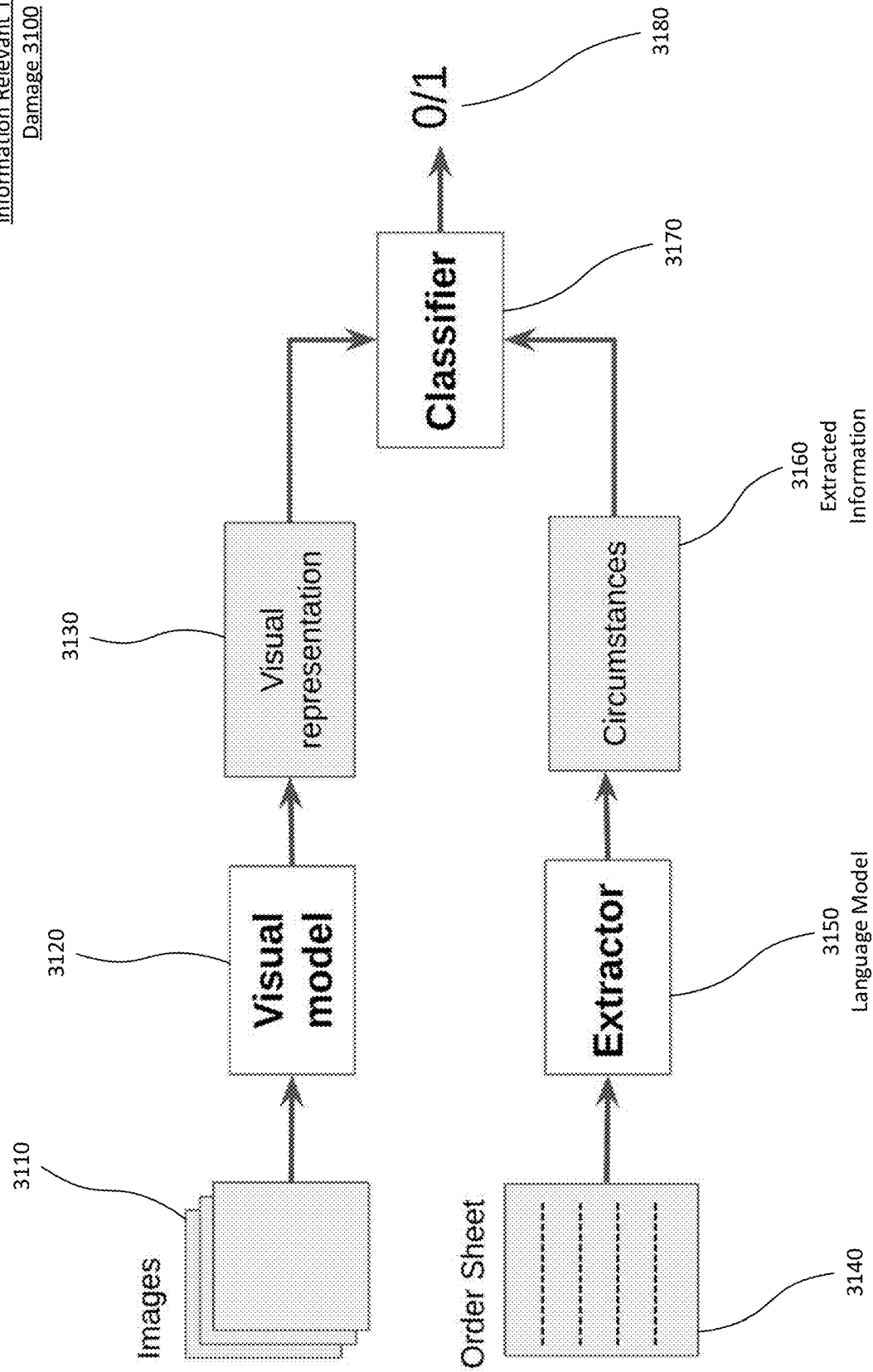
FIG. 31 shows the process of using a language model to extract information relevant to a determination of visual damage from images of the damage according to an embodiment.

Referring now to FIG. 31, there is shown a process using a language model to extract information relevant to visual damage 3100, according to an embodiment, which will now be described in more detail.

To determine whether damage is consistent with the reasons for the damage, one can compare the details of the accident/damage as reported (for example to an insurance company) and the determined damage to the vehicle.

To do this, in this embodiment, images of the damage to the vehicle 3110 are processed by a per-part visual model 3120 to generate a visual representation 3130. In this embodiment, there are multiple visual models 3120, each trained on a normalised part of a vehicle and trained to determine if each part is classified as damaged or undamaged. The output visual representation 3130 comprises classifications of damaged or undamaged for each normalised part of the vehicle based on the images 3110. In some embodiments, the visual models 3120 can predict a rich representation (similar to or the same as that described in relation to other embodiments described herein), so for example can predict any or any combination of checks such as whether to repair or replace a part, the number of labour hours required, paint requirements, blend requirement, etc. and/or can also predict other visual features such as location of damage and/or type of damage. Any or any combination of these predictions can be relevant to determine whether and/or correlate with the vehicle was/being stationary or in movement when the damage occurred.

In parallel, the order sheet 3140 or other text/data containing information relating to how the damage to the vehicle occurred (or is claimed to have occurred) is input into a language model extractor 3150. The language model extractor 3150 is a natural language processing model trained to extract the circumstances of the damage 3160. The circumstances might include, for example, the point of impact, whether the vehicle was stationary or in motion, and the type of object with which the vehicle collided.

A classifier 3170 receives the output visual representation 3130 comprising classifications of damaged or undamaged for each normalised part of the vehicle and the circumstances of the damage 3160 and classifies whether the damage to each normalised part is consistent or not with the extracted circumstances 3160. For example, the location of damage may be inconsistent with the circumstances (e.g. it would be inconsistent to have damage on the front bumper and roof where the damage is not severe enough to indicate the vehicle rolled over) or the type of damage may be inconsistent (e.g. it would be inconsistent to have impact damage on a door and rust on a boot lid both being repaired due to an accident) or the severity of the damage may be inconsistent (e.g. it would be inconsistent to have scratches on the front bumper and a bigger dent on the bonnet, indicating the damage occurred at different times).

To train these models, the language model weights might be frozen while the visual model trains or both networks are trained jointly, end-to-end.

Figure 32:
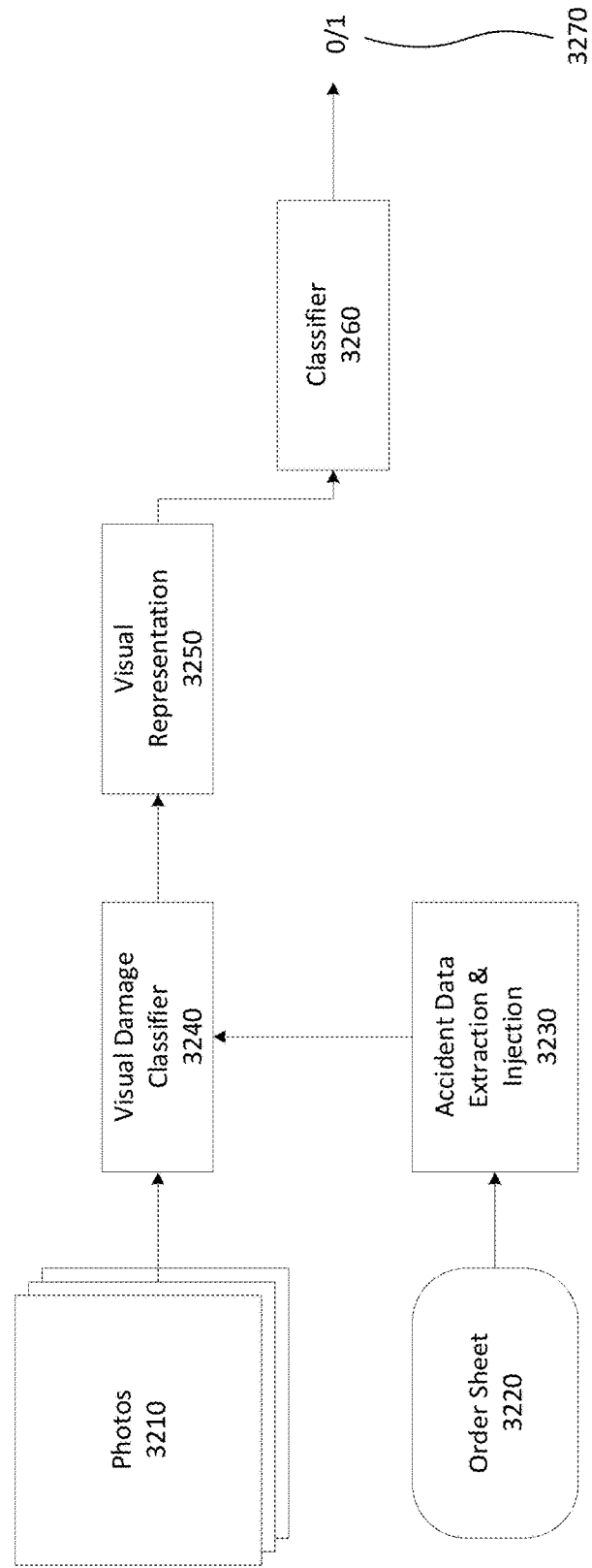
FIG. 32 shows the process of injecting structure accident data into a visual damage determination model according to an embodiment.

Referring now to FIG. 32, an alternative embodiment to that of FIG. 31 is presented in the situation where structure accident data is available, which will now be described in more detail.

As mentioned above, in this embodiment the accident data in the order sheet 3220 is stored (for example by the insurer computer system when an insurance claim is made) in a structured format that allows for direct processing of the structured data (i.e. no natural language processing is required to process the order sheet to extract the pertinent information regarding the circumstances of the damage).

The photos 3210 of the damaged vehicle and the order sheet 3220 including the details of the circumstances of the damage are provided to the model 3200. The circumstances of the damage to the vehicle are extracted from the structured data in an accident data extraction and injection step 3230. The circumstances might include, for example, the point of impact, whether the vehicle was stationary or in motion, and the type of object with which the vehicle collided.

The photos 3210 are processed by a visual damage classifier 3240, into which is also injected the circumstances of the damage to the vehicle, to predict whether there is damage to each part of the vehicle. A visual representation 3250 is output by the classifier 3240 including the classification of which parts are damaged or undamaged along with the circumstances of the damage. The representation can include the location of damage, the type of damage and the severity of damage.

The representation is provided to a further classifier 3260 which outputs a prediction of whether the damage to each part is consistent with the circumstances extracted from the order sheet 3220. For example, the location of damage may be inconsistent with the circumstances (e.g. it would be inconsistent to have damage on the front bumper and roof where the damage is not severe enough to indicate the vehicle rolled over) or the type of damage may be inconsistent (e.g. it would be inconsistent to have impact damage on a door and rust on a boot lid both being repaired due to an accident) or the severity of the damage may be inconsistent (e.g. it would be inconsistent to have scratches on the front bumper and a bigger dent on the bonnet, indicating the damage occurred at different times).

To train these models, the language model weights might be frozen while the visual model trains or both networks are trained jointly, end-to-end.

Figure 33:
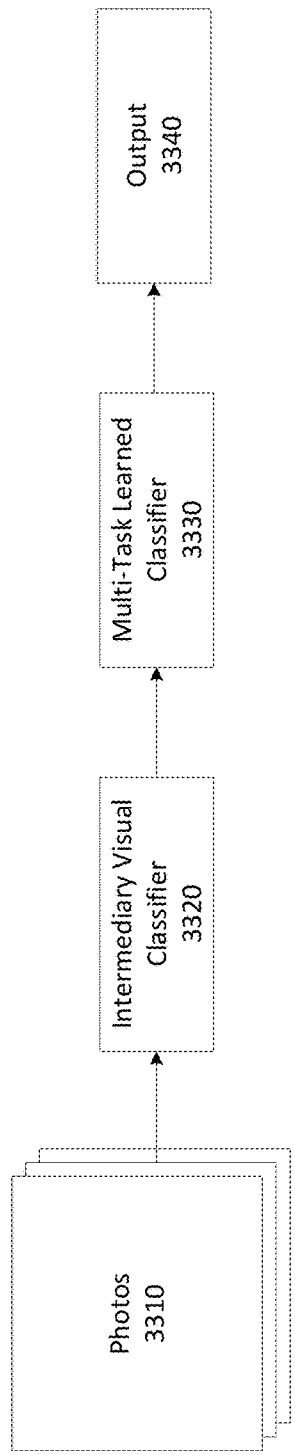
FIG. 33 shows a method of predicting damage to grouped auxiliary parts of a vehicle where the grouped auxiliary parts are associated with a normalised part/panel of the vehicle according to an embodiment.

Referring now to FIG. 33, there is shown a process 3300 for predicting damage to grouped auxiliary parts associated with a normalised panel according to an embodiment, which will now be described in more detail.

Auxiliary parts are parts of a vehicle such as any or any combination of: cameras, headlights, sensors, minor grilles, numberplates, emblems, fuel lids, brackets and such like. Some of these auxiliary parts tend to be difficult to determine accurately in images of a vehicle, and damage to these auxiliary parts can also tent to be difficult to determine from images of a vehicle.

Photos 3310 of the damage to the vehicle are input into the process 3300 and provided to an intermediary visual classifier 3320. The intermediary visual classifier 3320 comprises a plurality of per-part classifiers, each trained to determine a classification of damage to a normalised part of the vehicle for each of the input images 3310 and how severe the damage is. For example, the severity can range from 1 (scratches) to 5 (all areas affected).

In other embodiments, the intermediary visual classifier is trained to predict the location of the damage within the normalised part (for example: left/centre/right).

The output classifications of the intermediary visual classifier 3320 are provided to a multi-task learned classifier 3330, which is trained to simultaneously predict damage to multiple auxiliary parts of the vehicle per normalised part, based on the damage classifications to the normalised parts of the vehicle for the photos 3310.

As auxiliary parts, typically multiple auxiliary parts, can be associated with specific normalised parts (e.g. for a front bumper, auxiliary parts can include minor grilles, fog lamps, numberplates, emblems, parking sensors, impact bars, etc), a trained multi-task classifier can learn common features between all auxiliary parts on each normalised part/panel/region. This avoids training per-part models for auxiliary parts, which can be harder to train as not all vehicles have some auxiliary parts thus training data tends to be unbalanced or minimal.

The multi-task learned classifier 3330 can take the information determined by the visual classifier 3320 and use this to determine the likelihood of damage to one or more of the plurality of auxiliary parts associated with each normalised part based on for example the severity of the damage to each normalised part and whether the damage is present in a region of the normalised part in which the auxiliary part(s) are located.

In alternative embodiments, the visual classifier 3320 can perform a segmentation of the damage to each normalised part to identify more precisely where the damage on the vehicle is located, providing richer data for the multi-task learned classifier 3330 to predict whether damage has occurred to any auxiliary parts using this segmentation data. Further, in other embodiments, the visual classifier 3320 can perform a classification of the category of damage (e.g. scratch, dent, tear, rust, etc). to increase the richness of the data for the multi-task learned classifier 3330 to predict whether damage has occurred to any auxiliary parts.

Finally, an output classification is output 3340 by the multi-task learned classifier 3330 indicating whether any auxiliary parts are determined to be damaged. In some embodiments, the multi-task learned classifier 3330 takes just the output of the intermediary visual classifier 3320 as an input. In other embodiments, the multi-task learned classifier 3330 takes both the input images 3310 and the output of the intermediary visual classifier 3320 as inputs, for example the output of the intermediary visual classifier 3320 might comprise one or more segmentation masks of the images 3310, thus the images will be needed in addition to the segmentation masks to determine the classifications 3340).

In other embodiments, the intermediary visual classifier 3300 may not be required and just a multi-task classifier 3330 is used.

Figure 34:
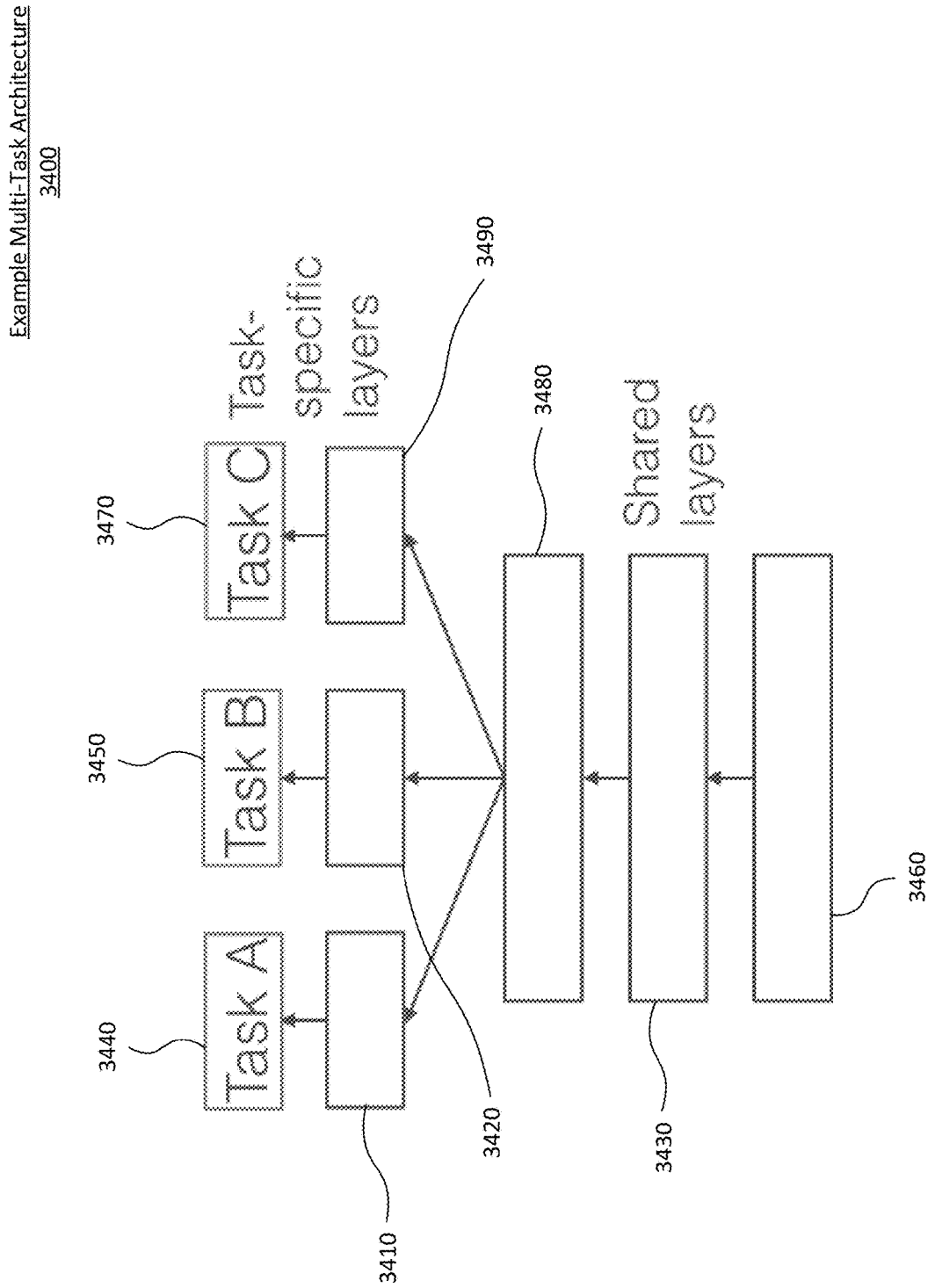
FIG. 34 shows an example multi-task architecture according to an embodiment.

Referring now to FIG. 34, an example multi-task architecture that can be used in the embodiment shown in FIG. 33 is shown, and will now be described in more detail.

The multi-task architecture shown has both shared layers 3460, 3430, 3480 and task specific layers 3410, 3420, 3490, 3440, 3450, 3470. In this example, there are three tasks to be performed by the model, tasks A, B and C. Task A has some task-specific layers 3440, 3410 while similarly task B has some task-specific layers 3450, 3420 and task C has some task-specific layers 3470, 3490.

In the example embodiment of FIG. 33, each of tasks A, B and C might relate to one of three auxiliary parts on one of the normalised parts.

Figure 35:
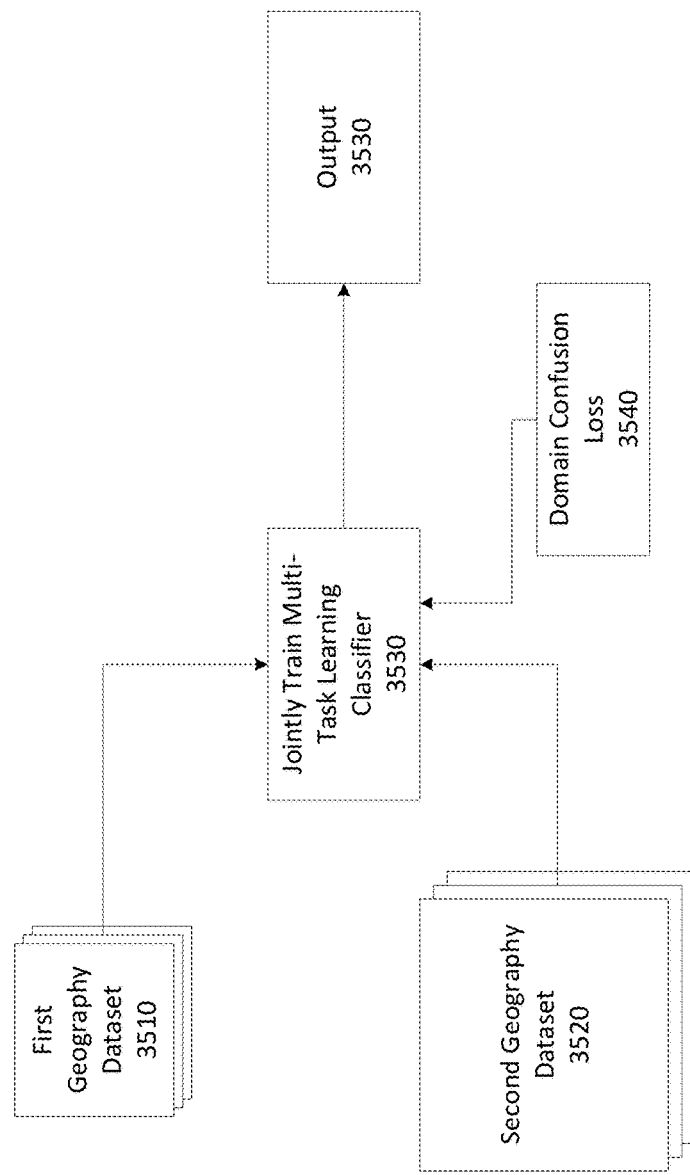
FIG. 35 shows a method of jointly training across variably sized datasets using domain confusion loss according to an embodiment.

Referring now to FIG. 35, there is shown a process 3500 for jointly training across variably sized datasets, according to an embodiment, which will now be described in more detail.

In some cases, models 3530 are required to be used with different datasets 3510, 3520, for example for datasets from different geographies 3510, 3520. Further, where the different datasets 3510, 3520 are significantly different sizes relative to each other, or when one dataset is too small to train a model 3530 to output accurate results, it can prove hard to train a sufficiently accurate model 3530 for both datasets. One option is to train the model 3530 on the larger dataset 3520 and fine tune it on the smaller dataset 3510 in order to be able to output sufficiently accurate predictions for the smaller dataset 3510, but even this might fail if the smaller dataset 3510 is too dissimilar in size relative to the larger dataset 3520.

In this embodiment, a model 3530 is trained jointly on both datasets 3510, 3520 to evaluate the extent of the damage per normalised part, and then to predict a probability as to whether a panel should be replaced and the number of hours it would take to replace it. A multi-learning approach similar to that presented in other embodiments can be used to train the model 3530. The predictions can then be adapted for each dataset/geography to output final predictions 3530 per dataset 3510, 3520.

Further, in this embodiment, a domain confusion loss 3540 is injected into the model 3530 mid-way through the network to ensure that the network can't differentiate between data from the first dataset 3510 and the second dataset 3520, thus training the model 3530 to be generalised across both datasets 3510, 3520 (and therefore, for example, to work across both geographies). In alternative embodiments, no domain confusion loss 3540 is used.

Figure 36:
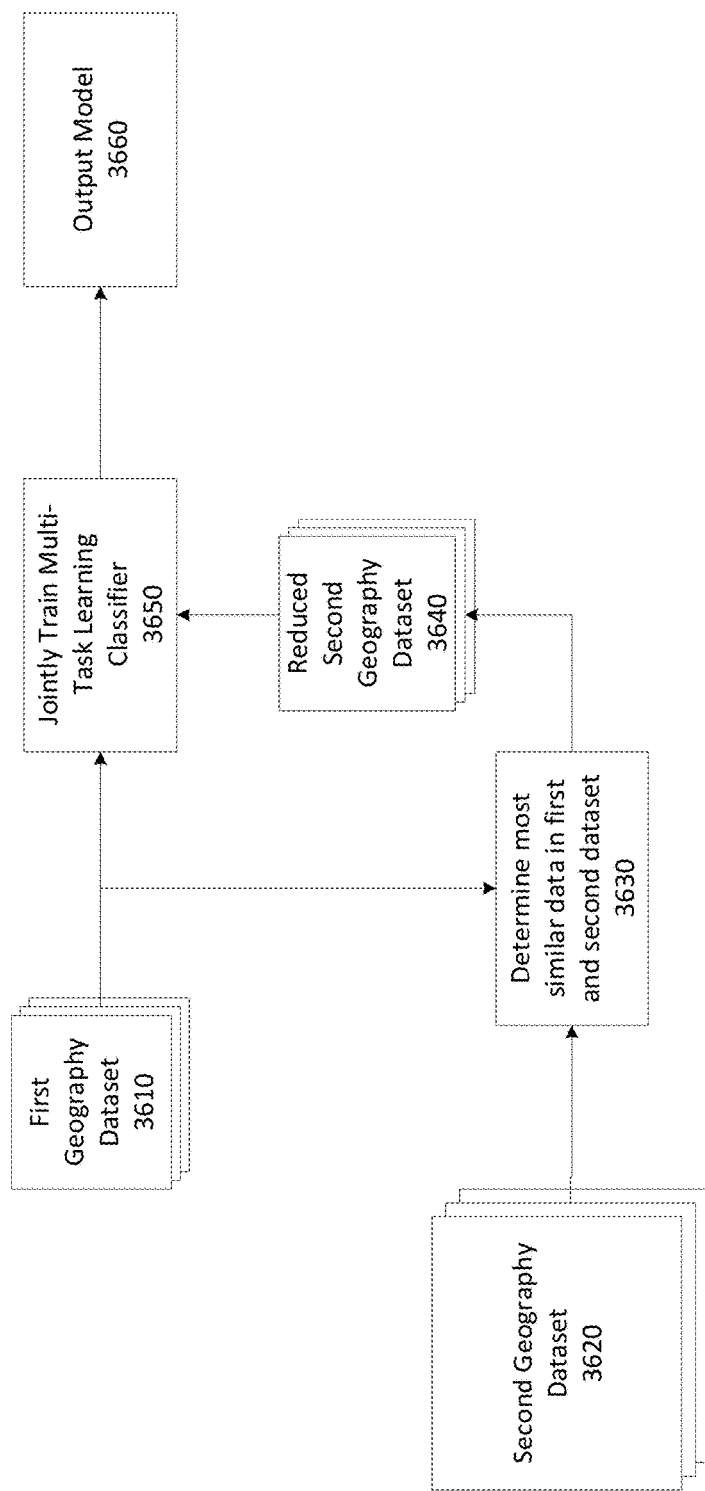
FIG. 36 shows a method of jointly training across variably sized datasets using a subset of the larger dataset representative of the most comparable data according to an embodiment.

Referring now to FIG. 36, an alternative approach to working with multiple different sized datasets 3600 is presented according to another embodiment, which will now be described in more detail.

In this example, there are two datasets 3610, 3620—the first geography dataset 3610 is much smaller than the second geography dataset 3620. If the most relevant data from the larger dataset 3620 can be identified, then it can be used to jointly train a model 3650 on the first dataset 3610 and a subset of the second dataset 3620. To identify the most relevant data from the larger dataset 3620, the most similar data points from the larger dataset 3620 are selected (compared to the smaller dataset 3610) and used to populate a reduced second geography dataset 3640. In this embodiment, classifiers trained on the larger dataset 3620 are used to determine which data points are similar to the data in the smaller dataset 3610. This can be done by creating visual damage vectors for all the data in both the larger and smaller datasets 3610, 3620 and then finding the data points in the vectors/data points created for the larger dataset 3620 that are most similar/close to the vectors/data points created for the smaller dataset 3610. To determine how "close" the vectors/data points are, in terms of visual damage vectors, a simple distance measure can be used (for example Euclidian, Mean Squared, etc.) or a simple classifier can be trained (for example using linear regression or a support vector machine) to separate the two datasets and determine which points in the larger dataset don't get separated from the smaller dataset. If even a small amount of the larger dataset 3620 is selected 3640 to augment the first dataset 3610, then it is possible that a substantially improved model 3660 can be generated following joint training across the first dataset 3610 and second dataset 3640.

Figure 37:
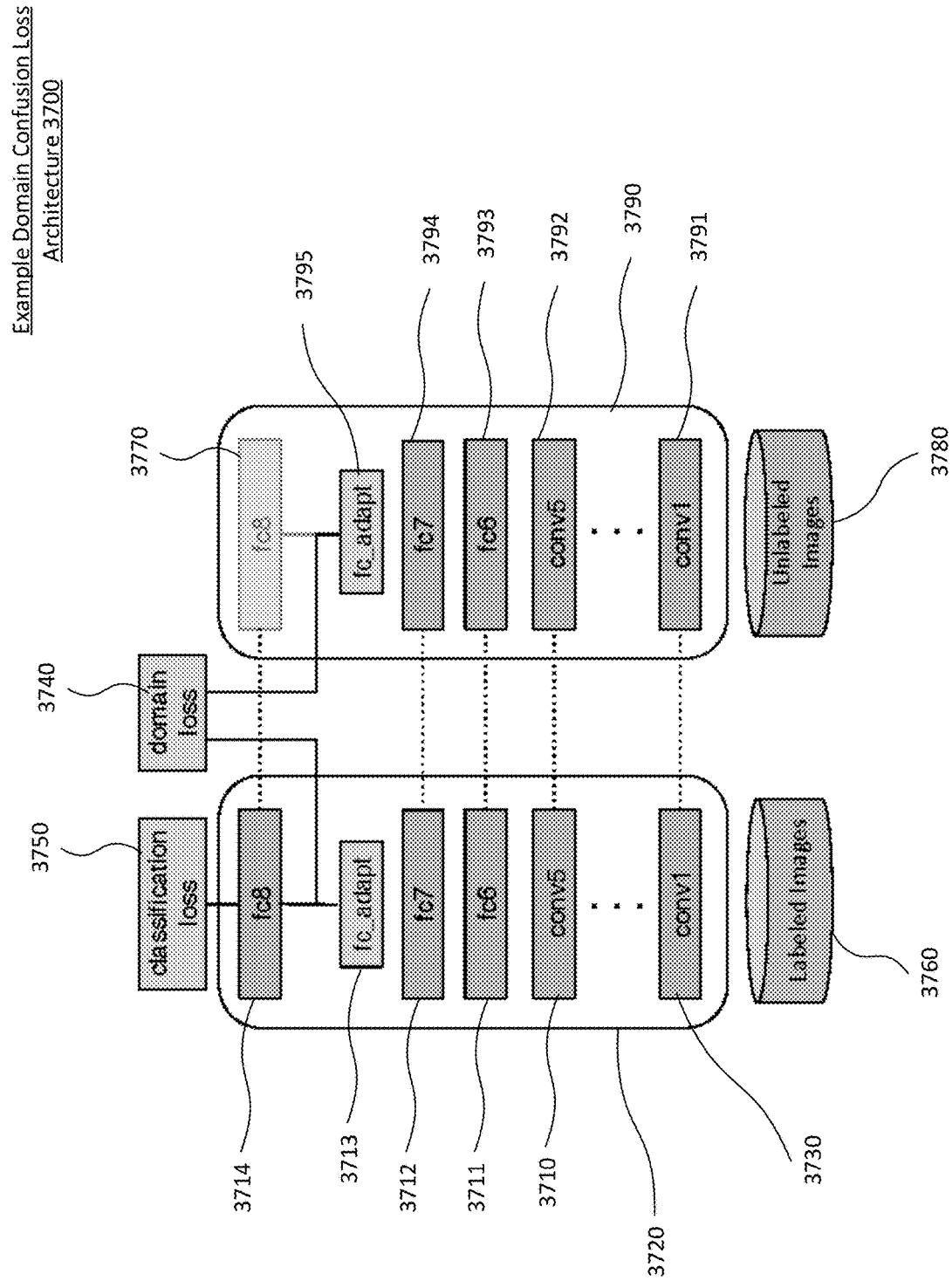
FIG. 37 shows an example domain confusion loss architecture usable with embodiments.

Referring to FIG. 37, there is shown a example domain confusion loss architecture 3700 that can be used with other embodiments, which will now be described in more detail.

Two networks 3720, 3790 are shown, one network 3730 for labelled images 3760 and one network 3790 for unlabelled images 3780. Each network has a number of convolutional layers 3730, 3710, 3792, 3791 and fully connected layers 3714, 3713, 3712, 3711, 3795, 3794, 3793, 3792, 3770 and have a domain loss 3740 injected in between layers 3770, 3794, 3714, 3712. Additionally, there is a classification loss 3750 injected into one of the networks 3720. Additional, there is an adaption layer 3713, 3795 in each network 3720, 3790. In this example, the two domains being considered are labelled and unlabelled images, and the goal of the domain confusion loss 3740 is to make sure that at the fc8 layer 3714, 3770 the network can't differentiate between data that came from the labelled domain 3760 and data that came from the unlabelled domain 3780. It does this by having a small classifier on top of the fc8 layer 3714, 3770 which tried to predict whether a particular image came from the labelled or unlabelled domains. If the small classifier predicts correctly, it penalises the fc8 layer 3714, 3770 in the network. In this way, while training, the network will learn that in the fc8 layer 3714, 3770 it should not be possible to differentiate data from the two domains 3760, 3780, thus 2100 leading to better generalisation across the two domains 3760, 3780.

It should be understood by the reader that the cropping and/or segmentation techniques described in some embodiments herein can be adapted for use in other embodiments and/or aspects described herein, for example in the determination of whether a part is damaged or undamaged and/or the determination of damage to auxiliary parts. It follows that these techniques are thereby disclosed for use in relation with any aspects/embodiments herein.

It should also be understood by the reader that the multi-image learning approaches described in embodiments and/or aspects herein can be incorporated into other aspects/embodiment to substantially improve accuracy for all classification or models across multiple images and/or other input data. It follows that these approaches are thereby disclosed for use in relation with any aspects/embodiments herein.

The above described embodiments will be able to be implemented using a variety of software and hardware, all within the intended scope of the aspects and embodiments set out herein. For example, the software may be written and deployed in a variety of ways using a variety of languages and implementations. The hardware that may be used to deploy the software and methods/systems described herein according to any embodiment and/or aspect may be a variety of different types and configurations of hardware and hardware architecture including the use of any or any combination of: handheld devices, mobile 'phones, smart 'phones, cameras, imaging devices, tablet computers, desktop computers; laptop computers; virtual desktops; servers; distributed servers; distributed computing arrangements; and cloud systems.

By models and neural networks, the use of machine learning and artificial intelligence techniques are intended to be referred to, including the use of deep learning techniques and convolutional and other neural networks.

Machine learning is the field of study where a computer or computers learn to perform classes of tasks using the feedback generated from the experience or data gathered that the machine learning process acquires during computer performance of those tasks.

Typically, machine learning can be broadly classed as supervised and unsupervised approaches, although there are particular approaches such as reinforcement learning and semi-supervised learning which have special rules, techniques and/or approaches. Supervised machine learning is concerned with a computer learning one or more rules or functions to map between example inputs and desired outputs as predetermined by an operator or programmer, usually where a data set containing the inputs is labelled.

Unsupervised learning is concerned with determining a structure for input data, for example when performing pattern recognition, and typically uses unlabelled data sets. Reinforcement learning is concerned with enabling a computer or computers to interact with a dynamic environment, for example when playing a game or driving a vehicle.

Various hybrids of these categories are possible, such as "semi-supervised" machine learning where a training data set has only been partially labelled. For unsupervised machine learning, there is a range of possible applications such as, for example, the application of computer vision techniques to image processing or video enhancement. Unsupervised machine learning is typically applied to solve problems where an unknown data structure might be present in the data. As the data is unlabelled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters (for example using a technique referred to as weighted correlation network analysis, which can be applied to high-dimensional data sets, or using k-means clustering to cluster data by a measure of the Euclidean distance between each datum).

Semi-supervised learning is typically applied to solve problems where there is a partially labelled data set, for example where only a subset of the data is labelled. Semi-supervised machine learning makes use of externally provided labels and objective functions as well as any implicit data relationships. When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values without providing too many features (which can result in too many dimensions being considered by the machine learning process during training and could also mean that the machine learning process does not converge to good solutions for all or specific examples). The user must also determine the desired structure of the learned or generalised function, for example whether to use support vector machines or decision trees.

The use of unsupervised or semi-supervised machine learning approaches are sometimes used when labelled data is not readily available, or where the system generates new labelled data from unknown data given some initial seed labels.

Machine learning may be performed through the use of one or more of: a non-linear hierarchical algorithm; neural network; convolutional neural network; recurrent neural network; long short-term memory network; multi-dimensional convolutional network; a memory network; fully convolutional network or a gated recurrent network allows a flexible approach when generating the predicted block of visual data. The use of an algorithm with a memory unit such as a long short-term memory network (LSTM), a memory network or a gated recurrent network can keep the state of the predicted blocks from motion compensation processes performed on the same original input frame. The use of these networks can improve computational efficiency and also improve temporal consistency in the motion compensation process across a number of frames, as the algorithm maintains some sort of state or memory of the changes in motion. This can additionally result in a reduction of error rates.

Developing a machine learning system typically consists of two stages: (1) training and (2) production. During training, the parameters of the machine learning model are iteratively changed to optimise a particular learning objective, known as the objective function or the loss. Once the model is trained, it can be used in production, where the model takes in an input and produces an output using the trained parameters.

During the training stage of neural networks, verified inputs are provided, and hence it is possible to compare the neural network's calculated output to then the correct the network is need be. An error term or loss function for each node in neural network can be established, and the weights adjusted, so that future outputs are closer to an expected result. Backpropagation techniques can also be used in the training schedule for the or each neural network.

The model can be trained using backpropagation and forward pass through the network. The loss function is an objective that can be minimised, it is a measurement between the target value and the model's output.

The cross-entropy loss may be used. The cross-entropy loss is defined as $$L_{CE} = -\sum_{c=1}^{c} y * \log(s)$$

where C is the number of classes, $y \in \{0,1\}$ is the binary indicator for class c, and s is the score for class c.

In the multitask learning setting, the loss will consist of multiple parts. A loss term for each task.

$$L(x) = \lambda_1 L_1 + \lambda_2 L_2$$

where $L_1$, $L_2$ are the loss terms for two different tasks and $\lambda_1$, $\lambda_2$ are weighting terms.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some, and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A method for determining requirements for painting a vehicle, comprising:
  receiving a plurality of images of the vehicle;
  determining, using a plurality of classifiers, one or more classifications for each of a plurality of parts of the vehicle based on at least the plurality of images, wherein each classifier of the plurality of classifiers processes a same plurality of images and is trained to identify damage to only one part of the plurality of parts of the vehicle, wherein each classifier is trained to identify a different part of the vehicle and be generic with respect to a make and model and year of the vehicle;

determining, for at least one of the parts of the vehicle, one or more paint areas, wherein each paint area is an area of damage to the vehicle requiring painting;

determining one or more operations and materials required to paint at least one of the one or more paint areas; and outputting the determined one or more operations and materials required.

2. The method of claim 1, further comprising receiving proposed vehicle repair estimate data, wherein the vehicle repair estimate data comprises one or more proposed vehicle repairs operations and materials.

3. The method of claim 2, wherein the proposed vehicle repair estimate data comprises data in relation to a vehicle.

4. The method of claim 3, wherein the data in relation to the vehicle comprises cost data in relation to one or more vehicle parts, vehicle materials or labor operations.

5. The method of claim 1, wherein each of the plurality of classifiers comprise one or more of: a neural network; a convolutional neural network; or a recurrent neural network.

6. The method of claim 1, wherein the determining one or more operations and materials required to paint at least one of the one or more paint areas comprises determining whether one or more pre-painted vehicle parts should be used.

7. The method of claim 6, wherein the determining whether one or more pre-painted vehicle parts should be used comprises determining any of: replace paint time for a pre-painted part; additional cost for a pre-painted part; or total paint time for a pre-painted part.

8. The method of claim 1, wherein the determining one or more operations and materials required to paint at least one of the one or more paint areas comprises determining any of: paint labor cost; material cost; or total paint cost.

9. The method of claim 1, further comprising querying one or more databases to determine any of: pre-painted vehicle part costs; additional cost for a pre-painted part; total paint time for a pre-painted part; paint labor cost; material cost; or total paint cost.

10. The method of claim 1, wherein the determining one or more operations and materials required to paint at least one of the one or more paint areas comprises any of: a replacement of the one or more paint areas using one or more pre-painted vehicle parts; a replacement of the one or more paint areas using one or more vehicle parts which require painting or repainting the one or more paint areas.

11. The method of claim 1, wherein the outputting the determined one or more operations and/or materials required comprises one or more jurisdictional constraints.

12. The method of claim 1, further comprising determining the relevant images showing the paint areas.

13. The method of claim 1, wherein the paint area comprises any or any combination of: normalized parts of the vehicle; normalized regions of the vehicle; normalized zones of the vehicle; standardized parts of the vehicle; standardized regions of the vehicle; standardized zones of the vehicle.

14. The method of claim 2, further comprising determining whether any of the proposed vehicle repairs in the proposed vehicle repairs operations and materials are unnecessary based on the determined one or more operations or materials required.

* * * * *